(12) United States Patent
Choi et al.

(10) Patent No.: US 11,533,131 B2
(45) Date of Patent: Dec. 20, 2022

(54) METHOD, APPARATUS, AND SYSTEM FOR TRANSMITTING OR RECEIVING DATA CHANNEL AND CONTROL CHANNEL IN WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Seoul (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 16/781,934

(22) Filed: Feb. 4, 2020

(65) Prior Publication Data
US 2020/0295878 A1   Sep. 17, 2020

Related U.S. Application Data

(63) Continuation of application No. PCT/KR2018/008917, filed on Aug. 6, 2018.

(30) Foreign Application Priority Data

Aug. 4, 2017   (KR) ................. 10-2017-0099004
Sep. 12, 2017  (KR) ................. 10-2017-0116441
Nov. 3, 2017   (KR) ................. 10-2017-0145993

(51) Int. Cl.
*H04L 1/16*   (2006.01)
*H04L 1/18*   (2006.01)
(Continued)

(52) U.S. Cl.
CPC .......... *H04L 1/1614* (2013.01); *H04L 1/1864* (2013.01); *H04W 28/04* (2013.01);
(Continued)

(58) Field of Classification Search
CPC ... H04L 1/1614; H04L 1/1864; H04L 1/1861; H04L 1/1896; H04W 72/1273; H04W 72/1289
See application file for complete search history.

(56) References Cited

U.S. PATENT DOCUMENTS 11,246,117 B2 *  2/2022   Ying .................. H04L 1/004
2013/0294357 A1  11/2013  Shimanuki et al.
(Continued)

FOREIGN PATENT DOCUMENTS

CN   103109484   5/2013
CN   104054291   9/2014
(Continued)

OTHER PUBLICATIONS

International Preliminary Report on Patentability (Chapter I) for PCT/KR2018/008917 dated Feb. 4, 2020 and its English translation from WIPO (now published as WO 2019/027308).
(Continued)

*Primary Examiner* — Min Jung
(74) *Attorney, Agent, or Firm* — Ladas & Parry, LLP

(57) ABSTRACT

Disclosed are a user equipment of a wireless communication system and a wireless communication method using the same. More specifically, disclosed are a user equipment including a processor configured to receive DCI through a PDCCH indicating PDSCH scheduling information of each cell in one or more cell(s), identify a transmission scheme in each cell based on a DCI format of the DCI, receive a PDSCH of each cell in the one or more cell(s) based on the scheduling information of the PDCCH, generate a hybrid
(Continued)

automatic repeat request acknowledgment (HARQ-ACK) bit sequence for the one or more cell(s) based on the identified transmission scheme of each cell in response to receiving the PDSCH of each cell, and transmit the generated HARQ-ACK bit sequence and a wireless communication method using the same.

17 Claims, 36 Drawing Sheets

(51) Int. Cl.
  *H04W 28/04* (2009.01)
  *H04W 72/12* (2009.01)
  *H04L 5/00* (2006.01)
(52) U.S. Cl.
  CPC ... *H04W 72/1273* (2013.01); *H04W 72/1289* (2013.01); *H04L 5/001* (2013.01); *H04L 5/0023* (2013.01)

(56) References Cited

U.S. PATENT DOCUMENTS

| | | | |
|---|---|---|---|
| 2014/0307596 | A1 | 10/2014 | He et al. |
| 2017/0142593 | A1 | 5/2017 | Seo et al. |
| 2018/0199376 | A1 | 7/2018 | Kim et al. |
| 2018/0367259 | A1* | 12/2018 | Hsieh ............... H04L 1/1614 |
| 2019/0045489 | A1 | 2/2019 | He et al. |
| 2019/0089494 | A1 | 3/2019 | Park et al. |
| 2019/0334664 | A1* | 10/2019 | Guan ............... H04L 5/0055 |
| 2019/0335536 | A1* | 10/2019 | Kwon ............... H04W 80/02 |
| 2020/0059327 | A1* | 2/2020 | Kini ............... H04W 72/042 |
| 2020/0145142 | A1* | 5/2020 | Yoshimura ........... H04L 1/1887 |
| 2020/0195386 | A1* | 6/2020 | Marinier ............. H04L 1/1896 |
| 2020/0213044 | A1* | 7/2020 | Peng ............... H04L 1/1864 |
| 2020/0236587 | A1* | 7/2020 | Kim ............... H04L 1/1864 |
| 2021/0135791 | A1* | 5/2021 | Wang ............... H04L 1/0075 |
| 2021/0143945 | A1* | 5/2021 | Park ............... H04L 1/1861 |
| 2021/0167894 | A1* | 6/2021 | Park ............... H04L 1/1614 |

FOREIGN PATENT DOCUMENTS

| | | |
|---|---|---|
| CN | 106953718 | 7/2017 |
| CN | 107852299 | 3/2018 |
| JP | 2018-523438 | 8/2018 |
| KR | 10-1975341 | 5/2019 |
| WO | 2011/159121 | 12/2011 |
| WO | 2012/064153 | 5/2012 |
| WO | 2017/010764 | 1/2017 |
| WO | 2018/203612 | 11/2018 |
| WO | 2019/027308 | 2/2019 |
| WO | 2019/066630 | 4/2019 |
| WO | 2019/072074 | 4/2019 |

OTHER PUBLICATIONS

Extended European Search Report dated Apr. 1, 2021 for European Patent Application No. 18840506.2.
Office Action dated Apr. 14, 2021 for Korean Patent Application No. 10-2020-7003579 and its English translation provided by Applicant's foreign counsel.
NTT Docomo, Inc., "HARQ-ACK multiplexing", R1-1711116, 3GPP TSG RAN WG1 NR Ad-Hoc#2, Qingdao, P.R. China, Jun. 27-30, 2017, pp. 1-3.
Vivo, "DAI indication for CBG", R1-1707241, 3GPP TSG RAN WG1 89 Meeting, Hangzhou, China, May 15-19, 2017, pp. 1-3.
Huawei, HiSilicon, "On HARQ-ACK multiplexing and/or bundling", R1-1710462, 3GPP TSG RAN WG1 NR Ad Hoc Meeting, Qingdao, China, Jun. 27-30, 2017, pp. 1-4.
Lenovo et al., "HARQ-ACK codebook design for CBG-based transmission", R1-1710605, 3GPP TSG RAN WG1 NR Ad-hoc#2, Qingdao, P.R. China, Jun. 27-30, 2017, pp. 1-3.
International Search Report for PCT/KR2018/008917 dated Dec. 18, 2018 and its English translation from WIPO (now published as WO 2019/027308).
Written Opinion of the International Searching Authority for PCT/KR2018/008917 dated Dec. 18, 2018 and its English translation by Google Translate (now published as WO 2018/027308).
Huawei et al., "Discussion on CBG-based Feedback", R1-1706964, 3GPP TSG RAN WG1 Meeting #89, Hangzhou, P.R. China, May 6, 2017, See sections 2-4.
Guangdong Oppo Mobile Telecom, "Discussion on CBG-based Transmission", R1-1707725, 3GPP TSG RAN WG1 Meeting #89, Hangzhou, P.R. China, May 6, 2017, See sections 2.1-2.2.
Lenovo et al., "Discussion on Enhanced HARQ Feedback and CBG-based Partial Retransmission", R1-1705653, 3GPP TSG RAN WG1 Meeting #88bis, Spokane, USA, Mar. 25, 2017. See sections 1-2.
Office Action dated Sep. 6, 2021 for Japanese Patent Application No. 2020-505807 and its English translation provided by Applicant's foreign counsel.
Office Action dated Jul. 13, 2021 for Indian Patent Application No. 202027006830.
Fujitsu, "Discussion on HARQ-ACK codebook", R1-1710242, 3GPP TSG RAN WG1 NR Ad-Hoc#2, Qingdao, P.R. China, Jun. 27-30, 2017, pp. 1-4.
Office Action dated Oct. 15, 2021 for Korean Patent Application No. 10-2020-7003579 and its English translation provided by Applicant's foreign counsel.
Notice of Allowance dated Dec. 8, 2021 for Korean Patent Application No. 10-2020-7003579 and its English translation provided by Applicant's foreign counsel.
ZTE: "DCI considerations for CBG transmission from two TBs", 3GPP TSG RAN WG1 Meeting #89, R1-1708217, Hangzhou, P.R. China, May 15-19, 2017, pp. 1-5.
Notice of Allowance dated Feb. 24, 2022 for European Patent Application No. 18 840 506.2.
Office Action dated Feb. 21, 2022 for Chinese Patent Application No. 201880057581.9 and its English translation provided by Applicant's foreign counsel.
Decision of Rejection dated Apr. 4, 2022 for Japanese Patent Application No. 2020-505807 and its English translation provided by Applicant's foreign counsel.
Decision to Reject the Amendments dated Apr. 4, 2022 for Japanese Patent Application No. 2020-505807 and its English translation provided by Applicant's foreign counsel.
Office Action dated Feb. 1, 2021 for Japanese Patent Application No. 2020-505807 and its English translation provided by Applicant's foreign counsel.
Wilus Inc.: "Discussion on HARQ-ACK multiplexing for NR", 3GPP TSG RAN WG1 Meeting 90bis, R1-1718279, Prague, CZ, Oct. 9-13, 2017, pp. 1-5,.
Notice of Allowance dated Jun. 13, 2022 for Korean Patent Application No. 10-2022-7007908 and its English translation provided by Applicant's foreign counsel.
Office Action dated Jun. 21, 2022 for Korean Patent Application No. 10-2022-7007910 and its English translation provided by Applicant's foreign counsel.
Notice of Allowance dated Aug. 3, 2022 for Chinese Patent Application No. 201880057581,9 and its English translation provided by Applicant's foreign counsel.
Office Action dated Oct. 3, 2022 for Japanese Patent Application No. 2020-505807 and its English translation provided by Applicant's foreign counsel.

* cited by examiner (a)

METHOD, APPARATUS, AND SYSTEM FOR TRANSMITTING OR RECEIVING DATA CHANNEL AND CONTROL CHANNEL IN WIRELESS COMMUNICATION SYSTEM

TECHNICAL FIELD

The present invention relates to a wireless communication system. In particular, the present invention relates to a wireless communication method, apparatus, and system for transmitting and receiving data channels and control channels.

BACKGROUND ART

Since the commercialization of the 4th generation (4G) communication system, efforts have been made to develop a new 5th generation (5G) communication system to meet the increasing demand for wireless data traffic. The 5G communication system is called as a beyond 4G network communication system, a post LTE system, or a new radio (NR) system. In order to achieve high data rates, 5G communication systems include systems that operate using ultra-high frequency (e.g., mmWave) bands above 6 GHz, and include communication systems that operate using frequency bands below 6 GHz in terms of ensuring coverage, so that the implementation in the base station and the terminal is being considered.

The 3rd generation partnership project (3GPP) NR system improves the spectral efficiency of the network, enabling operators to provide more data and voice services over a given bandwidth. As a result, the 3GPP NR system is designed to meet the demands for high-speed data and media transmissions in addition to supporting large volumes of voice. The advantages of the NR system are supports of high processing amount, low latency, frequency division duplex (FDD) and time division duplex (TDD) on the same platform, improved end user experience, and a simple architecture with low operating costs.

For more efficient data processing, a dynamic TDD of the NR system may use a method of varying the number of orthogonal frequency division multiplexing (OFDM) symbols that can be used for uplink/downlink according to data traffic directions of users of a cell. For example, the base station may allocate a plurality of downlink OFDM symbols to a slot (or subframe) when a downlink traffic of the cell is larger than an uplink traffic. The information on the slot configuration should be transmitted to the terminals.

In order to alleviate the path loss of the radio wave and increase the transmission distance of the radio wave in the ultra-high frequency band, technologies such as beamforming, massive array multiple input/output (massive MIMO), full dimensional MIMO (FD-MIMO), array antenna, analog beamforming, hybrid beamforming combining an analog beamforming and a digital beamforming, and large scale antenna are discussed in the 5G communication system. In addition, in order to improve the network of the system, technologies such as evolved small cell, advanced small cell, cloud radio access network (cloud RAN), ultra-dense network, device to device communication (D2D), vehicle to everything communication (V2X), wireless backhaul, non-terrestrial network communication (NTN), mobile networks, moving networks, cooperative communication, coordinated multi-points (CoMP), and interference cancellation are being developed in the 5G communication system. In addition, in the 5G system, advanced coding modulation (ACM) schemes such as hybrid FSK and QAM modulation (FQAM) and sliding window superposition coding (SWSC), and advanced access technologies such as filter bank multi-carrier (FBMC), non-orthogonal multiple access (NOMA), and sparse code multiple access (SCMA), and the like are being developed.

Meanwhile, the internet is evolving from a human-centered connection network that humans create and consume information, to an internet of things (IoT) network that distributed components such as objects exchange and process information. An internet of everything (IoE) technology, in which big data processing technology through connection with cloud servers and the like is combined to the IoT, is emerging. In order to implement the IoT, technical elements such as sensing technology, wired/wireless communication and network infrastructure, service interface technology, and security technology are required, and recently, technologies such as a sensor network, a machine to machine communication (M2M), machine type communication (MTC) for connection between objects have been studied. In the IoT environment, intelligent internet technology (IT) services that collect and analyze data generated from connected objects and create new value in human life may be provided. The IoT may be applied to the fields of smart home, smart building, smart city, smart car or connected car, smart grid, health care, smart home appliances, advanced medical services, and the like, through convergence and combination of existing information technology (IT) and various industries.

Accordingly, various attempts have been made to apply the 5G communication system to the IoT network. For example, technologies such as sensor networks, machine to machine communication (M2M), and machine type communication (MTC) have been implemented by schemes such as beamforming, MIMO, and array antennas, which are 5G communication technologies. As the big data processing technology described above, the cloud radio access network (cloud RAN) is an example of the convergence of 5G technology and IoT technology. In general, mobile communication systems have been developed to provide voice services while guaranteeing user activity.

However, mobile communication systems are gradually expanding to not only voice but also data services, and now they have been developed to the extent that they can provide high-speed data services. However, in the mobile communication system in which a service is currently provided, a more advanced mobile communication system is required due to a shortage of resources and high-speed service demands of users.

DISCLOSURE

Technical Problem

An object of the present invention is to provide a method and apparatus for transmitting signals efficiently in a wireless communication system, in particular a cellular wireless communication system. It is also an object of the present invention to provide a method for transmitting and receiving a downlink control channel, an apparatus and a system therefor.

The present invention has an object to provide a method for generating a HARQ-ACK bit sequence when it is configured that a code block group (CBG)-based transmission is enabled to the user equipment.

In addition, the present invention has an object to provide a method capable of performing efficient retransmission when it is configured that CBG-based transmission is enabled to the user equipment.

In addition, the present invention has an object to provide a method for generating a HARQ-ACK bit sequence when a user equipment configured to enable CBG-based transmission fails to receive at least one PDCCH.

Technical Solution

In order to solve the above problems, the present invention provides a user equipment and a wireless communication method of a wireless communication system as below.

First, an exemplary embodiment of the present invention provides a user equipment of a wireless communication system, including a communication module; and a processor configured to control the communication module, wherein the processor receives downlink control information (DCI) through a physical downlink control channel (PDCCH) indicating physical downlink shared channel (PDSCH) scheduling information of each cell in one or more cell(s), wherein a code block group (CBG)-based transmission is configured in at least one cell among the one or more cell(s), identifies a transmission scheme in each cell based on a DCI format of the DCI, wherein the transmission scheme is either a transport block (TB)-based transmission or the CBG-based transmission, receives a PDSCH of each cell in the one or more cell(s) based on the scheduling information of the PDCCH, generates a hybrid automatic repeat request acknowledgment (HARQ-ACK) bit sequence for the one or more cell(s) based on the identified transmission scheme of each cell in response to receiving the PDSCH of each cell, wherein, within the HARQ-ACK bit sequence, a HARQ-ACK bit sequence for the TB-based transmission and a HARQ-ACK bit sequence for the CBG-based transmission are separately generated, and transmits the generated HARQ-ACK bit sequence.

In addition, an exemplary embodiment of the present invention provides a wireless communication method in a wireless communication system, including: receiving downlink control information (DCI) through a physical downlink control channel (PDCCH) indicating physical downlink shared channel (PDSCH) scheduling information of each cell in one or more cell(s), wherein a code block group (CBG)-based transmission is configured in at least one cell among the one or more cell(s); identifying a transmission scheme in each cell based on a DCI format of the DCI, wherein the transmission scheme is either a transport block (TB)-based transmission or the CBG-based transmission; receiving a PDSCH of each cell in the one or more cell(s) based on the scheduling information of the PDCCH; generating a hybrid automatic repeat request acknowledgment (HARQ-ACK) bit sequence for the one or more cell(s) based on the identified transmission scheme of each cell in response to receiving the PDSCH of each cell, wherein, within the HARQ-ACK bit sequence, a HARQ-ACK bit sequence for the TB-based transmission and a HARQ-ACK bit sequence for the CBG-based transmission are separately generated, and transmitting the generated HARQ-ACK bit sequence.

One HARQ-ACK bit may be generated per one transport block in the HARQ-ACK bit sequence for the TB-based transmission, and N HARQ-ACK bit(s) may be generated per one transport block in the HARQ-ACK bit sequence for the CBG-based transmission, and the N may be a maximum number of CBGs per transport block configured to the user equipment.

When the number M of CBG(s) transmitted through a particular cell to which the CBG-based transmission is configured in the one or more cell(s) is less than the N, HARQ-ACK bit(s) for the particular cell may consist of M HARQ-ACK bit(s) for the transmitted CBG(s) and N–M NACK(s).

The processor may receive a downlink assignment index (DAI) in the DCI format and generate the HARQ-ACK bit sequence with reference to the DAI, and the DAI may comprise a counter-DAI indicating an accumulated number of PDSCH(s) scheduled up to the current cell and a total-DAI indicating a total number of PDSCHs scheduled for entire cells.

The DAI may be separately applied to the HARQ-ACK bit sequence for the TB-based transmission and the HARQ-ACK bit sequence for the CBG-based transmission, respectively.

Within the HARQ-ACK bit sequence, the HARQ-ACK bit sequence for the CBG-based transmission may be appended to the HARQ-ACK bit sequence for the TB-based transmission.

Next, another exemplary embodiment of the present invention provides a user equipment of a wireless communication system, including: a communication module; and a processor configured to control the communication module, wherein the processor receives a physical downlink control channel (PDCCH) indicating physical downlink shared channel (PDSCH) scheduling information of each cell in one or more cell(s), wherein it is configured that a code block group (CBG)-based transmission is available in at least one cell among the one or more cell(s), receives a downlink assignment index (DAI) through the PDCCH, receives PDSCH of each cell in the one or more cell(s) based on the scheduling information of the PDCCH, in response to receiving the PDSCH of each cell, generates a hybrid automatic repeat request acknowledgment (HARQ-ACK) bit sequence for the one or more cell(s) with reference to the DAI, wherein the HARQ-ACK bit sequence includes at least one of a HARQ-ACK bit sequence for a transport block (TB)-based transmission and a HARQ-ACK bit sequence for the CBG-based transmission, and wherein the DAI is separately applied to the HARQ-ACK bit sequence for the TB-based transmission and the HARQ-ACK bit sequence for the CBG-based transmission, and transmits the generated HARQ-ACK bit sequence.

In addition, another exemplary embodiment of the present invention provides a wireless communication method in a wireless communication system, including: receiving a physical downlink control channel (PDCCH) indicating physical downlink shared channel (PDSCH) scheduling information of each cell in one or more cell(s), wherein it is configured that a code block group (CBG)-based transmission is available in at least one cell among the one or more cell(s); receiving a downlink assignment index (DAI) through the PDCCH; receiving PDSCH of each cell in the one or more cell(s) based on the scheduling information of the PDCCH; in response to receiving the PDSCH of each cell, generating a hybrid automatic repeat request acknowledgment (HARQ-ACK) bit sequence for the one or more cell(s) with reference to the DAI, wherein the HARQ-ACK bit sequence includes at least one of a HARQ-ACK bit sequence for a transport block (TB)-based transmission and a HARQ-ACK bit sequence for the CBG-based transmission, and wherein the DAI is separately applied to the HARQ-ACK bit sequence for the TB-based transmission and the HARQ-ACK bit sequence for the CBG-based transmission; and transmitting the generated HARQ-ACK bit sequence.

The HARQ-ACK bit sequence may be generated based on an identified transmission scheme of each cell, and the transmission scheme of each cell may be either the TB-based transmission or the CBG-based transmission.

The processor may receive downlink control information (DCI) through the PDCCH, and the transmission scheme of each cell may be identified based on a DCI format of the DCI.

One HARQ-ACK bit may be generated per one transport block in the HARQ-ACK bit sequence for the TB-based transmission, and N HARQ-ACK bit(s) may be generated per one transport block in the HARQ-ACK bit sequence for the CBG-based transmission, and the N may be a maximum number of CBGs per transport block configured to the user equipment.

When the number M of CBG(s) transmitted through a particular cell to which the CBG-based transmission is configured in the one or more cell(s) is less than the N, HARQ-ACK bit(s) for the particular cell may consist of M HARQ-ACK bit(s) for the transmitted CBG(s) and N–M NACK(s).

Within the HARQ-ACK bit sequence, the HARQ-ACK bit sequence for the CBG-based transmission may be appended to the HARQ-ACK bit sequence for the TB-based transmission.

A DAI applied to the TB-based transmission may include a counter-DAI indicating an accumulated number of TB-based PDSCH(s) scheduled up to a current cell and a total-DAI indicating a total number of TB-based PDSCHs scheduled for entire cells, and a DAI applied to the CBG-based transmission may include a counter-DAI indicating an accumulated number of CBG-based PDSCH(s) scheduled up to a current cell and a total-DAI indicating a total number of CBG-based PDSCHs scheduled for entire cells.

When the total-DAI of the DAI applied to the TB-based transmission indicates a predetermined value and no PDCCH scheduling the TB-based transmission is received, the HARQ-ACK bit sequence may be configured to exclude the HARQ-ACK bit sequence for the TB-based transmission, and when the total-DAI of the DAI applied to the CBG-based transmission indicates a predetermined value and no PDCCH scheduling the CBG-based transmission is received, the HARQ-ACK bit sequence may be configured to exclude the HARQ-ACK bit sequence for the CBG-based transmission.

The predetermined value may be a binary '11'.

The HARQ-ACK bit sequence may be transmitted through a physical uplink shared channel (PUSCH).

Advantageous Effects

According to an embodiment of the present invention, an overhead of downlink control information to be referenced by a user equipment configured to enable CBG-based transmission in determining a HARQ-ACK bit sequence may be minimized. Therefore, according to the embodiment of the present invention, the transmission efficiency of the network between the base station and the user equipment can be increased.

In addition, according to an embodiment of the present invention, signaling overhead for the retransmission request can be minimized through efficient signaling of the fallback mode.

The effects obtainable in the present invention are not limited to the above-mentioned effects, and other effects not mentioned above may be clearly understood by those skilled in the art from the following description.

DESCRIPTION OF DRAWINGS

FIGS. 39 and 40 illustrate a method of performing a spatial bundling of HARQ-ACK according to an embodiment of the present invention.

FIGS. 41 and 42 more specifically illustrate a method of performing a spatial bundling of HARQ-ACK according to an embodiment of the present invention.

DETAILED DESCRIPTION OF THE INVENTION

Figure 1:
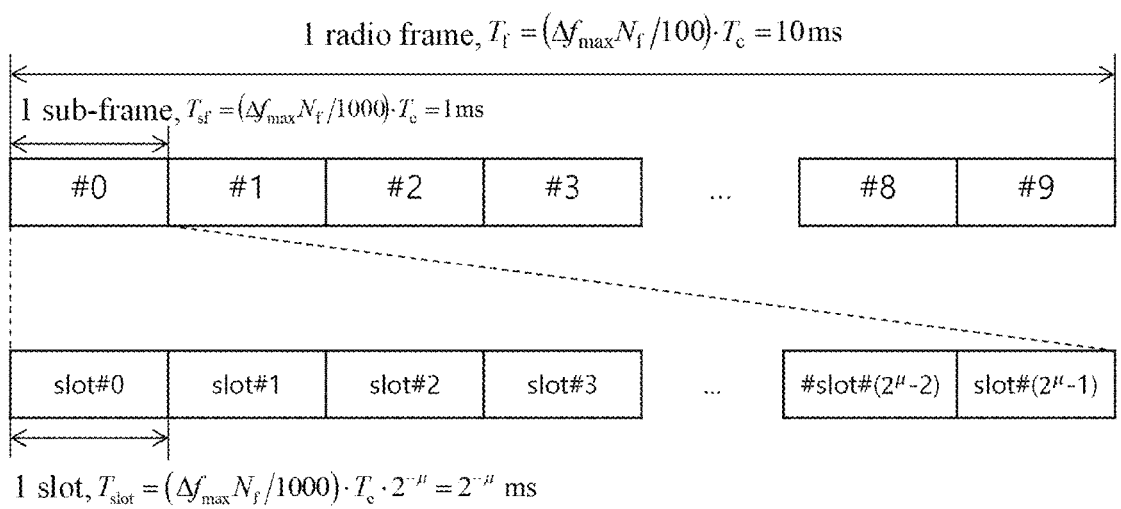
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (i.e., Wi-Fi), IEEE 802.16 (i.e., WiMAX), IEEE 802-20, evolved UTRA (E-UTRA), and the like. The UTRA is a part of a universal mobile telecommunication system (UMTS). 3GPP long term evolution (LTE) is a part of an evolved UMTS (E-UMTS) using evolved-UMTS terrestrial radio access (E-UTRA) and LTE-advanced (LTE-A) is an evolved version of the 3GPP LTE. 3GPP NR is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified in this specification, a base station may include a next generation node B (gNB) as defined in 3GPP NR. Furthermore, unless otherwise specified, a terminal may include a user equipment (UE).

FIG. 1 illustrates an example of a wireless frame structure used in a wireless communication system. Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz. $\mu$ can have a value of $\mu=0\sim4$ as subcarrier spacing configuration. That is, 15 kHz, 30 kHz, 60 kHz, 120 kHz or 240 kHz may be used for subcarrier spacing. One subframe having a length of 1 ms may consist of $2^\mu$ slots. In this case, the length of each slot is $2^{-\mu}$ ms. Numbers from 0 to $2^\mu-1$ may be respectively allocated to $2^\mu$ slots within one subframe. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
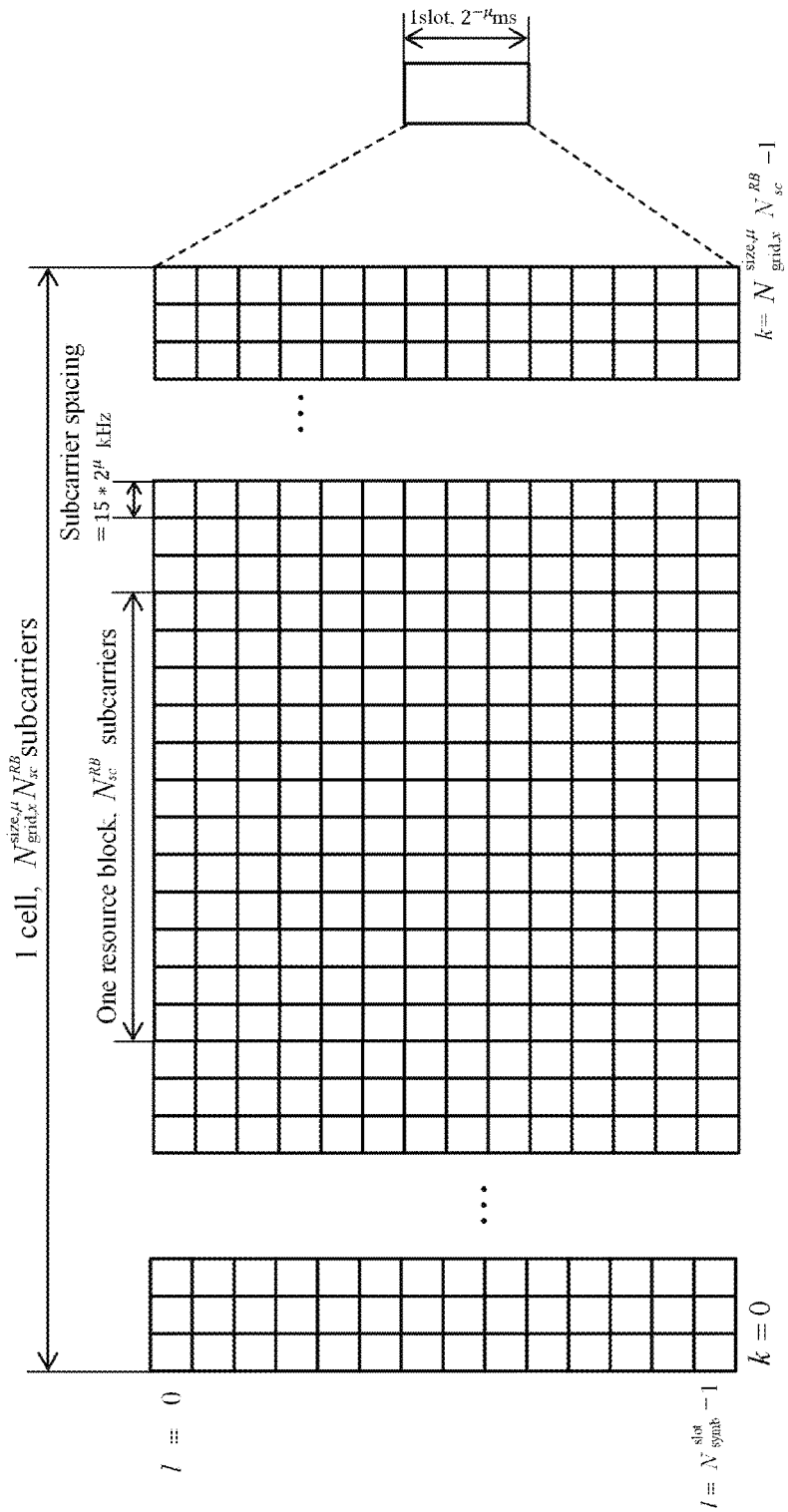
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system. There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol duration. Unless otherwise specified, an OFDM symbol may be simply referred to as a symbol. Referring to FIG. 2, a signal transmitted in each slot may be represented by a resource grid consisting of $N^{size,\mu}_{grid,x}*N^{RB}_{sc}$ subcarriers, and $N^{slot}_{symb}$ OFDM symbols. Here, x=DL for the downlink resource grid, and x=UL for the uplink resource grid. $N^{size,\mu}_{grid,x}$ denotes the number of resource blocks (in this case, x is DL or UL) according to a subcarrier spacing configuration $\mu$, and $N^{slot}_{symb}$ denotes the number of OFDM symbols in a slot. $N^{RB}_{sc}$ is the number of subcarriers constituting one RB and $N^{RB}_{sc}=12$. An OFDM symbol may be referred to as a cyclic prefix OFDM (CP-OFDM) symbol or a discrete Fourier transform spread OFDM (DFT-S-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP may only be used at 60 kHz subcarrier spacing. In FIG. 2, for convenience of description, one slot includes 14 OFDM symbols by way of example, but embodiments of the present invention may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

An RB may be defined by $N^{RB}_{sc}$ (e.g., 12) consecutive subcarriers in the frequency domain. As a reference, a resource including one OFDM symbol and one subcarrier may be referred to as a resource element (RE) or a tone. Therefore, one RB may include $N^{slot}_{symb} * N^{RB}_{sc}$ resource elements. Each resource element in the resource grid may be uniquely defined by a pair of indexes (k, l) in one slot. k may be an index numbered from 0 to $N^{size,\mu}_{grid,x} * N^{RB}_{sc} - 1$ in the frequency domain, and l may be an index numbered from 0 to $N^{slot}_{symb} - 1$ in the time domain.

In order for the user equipment to receive a signal from the base station or to transmit a signal to the base station, the time/frequency synchronization of the user equipment may be synchronized with the time/frequency synchronization of the base station. This is because the base station and the user equipment need to be synchronized, so that user equipment can determine the time and frequency parameters required for demodulating the DL signal and transmitting the UL signal at the correct time.

Each symbol of a wireless frame operating in a time division duplex (TDD) or unpaired spectrum may be configured as at least one of a DL symbol, an UL symbol, or a flexible symbol. A wireless frame operating as a downlink carrier in a frequency division duplex (FDD) or a paired spectrum may consist of a downlink symbol or a flexible symbol, and a wireless frame operating as an uplink carrier may consist of an uplink symbol or a flexible symbol. In the downlink symbol, downlink transmission is possible but uplink transmission is impossible, and in the uplink symbol, uplink transmission is possible but downlink transmission is not possible. The flexible symbol may be determined to be used as a downlink or an uplink according to a signal.

Information on the type of each symbol, that is, information indicating any one of a downlink symbol, an uplink symbol, and a flexible symbol may be configured by a cell-specific (or common) radio resource control (RRC) signal. In addition, the information on the type of each symbol may additionally be configured by a UE-specific (or dedicated) RRC signal. The base station uses the cell-specific RRC signal to indicate i) the period of cell-specific slot configuration, ii) the number of slots with only downlink symbols from the beginning of the period of cell-specific slot configuration, iii) the number of downlink symbols from the first symbol of the next slot immediately following the slot with only downlink symbols, iv) the number of slots with only uplink symbols from the end of the period of cell-specific slot configuration, and v) the number of uplink symbols from the last symbol of the slot immediately preceding the slot with only uplink symbols. Herein, a symbol that is not configured to any one of the uplink symbol and the downlink symbol is a flexible symbol.

When the information on the symbol type is configured with a UE-specific RRC signal, the base station may signal whether the flexible symbol is a downlink symbol or an uplink symbol by a cell-specific RRC signal. In this case, the UE-specific RRC signal cannot change the downlink symbol or the uplink symbol configured by the cell-specific RRC signal to another symbol type. The UE-specific RRC signal may signal, for each slot, the number of downlink symbols among $N^{slot}_{symb}$ symbols of the corresponding slot and the number of uplink symbols among $N^{slot}_{symb}$ symbols of the corresponding slot. In this case, the downlink symbols of the slot may be continuously configured from the first symbol to the i-th symbol of the slot. In addition, the uplink symbol of the slot may be continuously configured from the j-th symbol to the last symbol of the slot (where i<j). A symbol that is not configured to any one of the uplink symbol and the downlink symbol in a slot is a flexible symbol.

The type of symbol configured by the above RRC signal may be referred to as a semi-static DL/UL configuration. In the semi-static DL/UL configuration previously configured by the RRC signal, the flexible symbol may indicated to a downlink symbol, an uplink symbol or a flexible symbol through dynamic slot format information (SFI) transmitted through a physical downlink control channel (PDCCH). In this case, the downlink symbol or the uplink symbol configured by the RRC signal is not changed to another symbol type. Table 1 illustrates a dynamic SFI that the base station can configure to the terminal.

TABLE 1

| index | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |

TABLE 1-continued

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | X | U | U | U | U | U |
| 46 | D | D | D | D | X | U | D | D | D | D | D | X | U | U |
| 47 | D | D | X | U | U | U | D | D | X | U | U | U | U | U |
| 48 | D | X | U | U | U | U | D | X | U | U | U | U | U | U |
| 49 | D | D | D | X | X | U | D | D | D | D | X | X | X | U |
| 50 | D | D | X | X | U | U | D | D | X | X | U | U | U | U |
| 51 | D | X | X | U | U | U | D | X | X | U | U | U | U | U |
| 52 | D | X | X | X | X | U | D | X | X | X | X | X | X | U |
| 53 | D | D | X | X | X | U | D | D | X | X | X | X | X | U |
| 54 | X | X | X | X | X | X | D | D | D | D | D | D | D | D |
| 55 | D | D | X | X | X | U | U | U | D | D | D | D | D | D |
| 56-255 | | | | | | Reserved | | | | | | | | |

In Table 1, D represents a downlink symbol, U represents an uplink symbol, and X represents a flexible symbol. As shown in Table 1, up to two DL/UL switching may be allowed in one slot.

Figure 3:
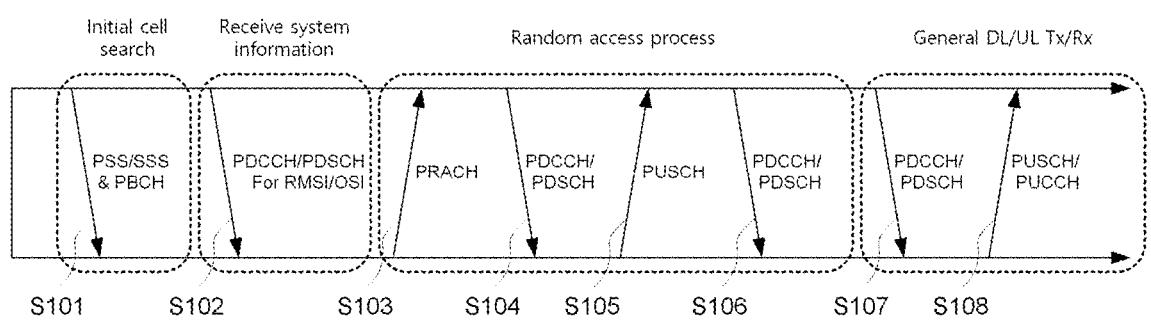
FIG. 3 is a diagram illustrating a physical channel used in a 3GPP system and a general signal transmission method using the physical channel.

FIG. 3 is a diagram for explaining a physical channel used in a 3GPP system (e.g., NR) and a general signal transmission method using the physical channel. When the power of the user equipment is turned on or the user equipment enters a new cell, the user equipment performs an initial cell search (S101). Specifically, the user equipment may synchronize with the base station in the initial cell search. For this, the user equipment may receive a primary synchronization signal (PSS) and a secondary synchronization signal (SSS) from a base station, synchronize with the base station, and obtain information such as a cell ID. Thereafter, the user equipment may receive the physical broadcast channel from the base station and obtain the in-cell broadcast information.

Upon completion of the initial cell search, the user equipment receives a physical downlink control channel (PDCCH) and a physical downlink shared channel (PDSCH) according to information carried in the PDCCH, so that the user equipment can obtain more specific system information than the system information obtained through the initial cell search (S102).

When the user equipment initially accesses the base station or does not have radio resources for signal transmission, the user equipment may perform a random access procedure on the base station (S103 to S106). First, the user equipment may transmit a specific sequence as a preamble through a physical random access channel (PRACH) (S103) and receive a response message for the preamble on the PDCCH and the corresponding PDSCH from the base station (S104). In case of the contention-based RACH, a contention resolution procedure may be additionally performed.

After the above-described procedure, the user equipment receives PDCCH/PDSCH (S107) and transmits a physical uplink shared channel (PUSCH)/physical uplink control channel (PUCCH) (S108) as a general phase/DL signal transmission procedure. In particular, the user equipment may receive downlink control information (DCI) through the PDCCH. The DCI may include control information such as resource allocation information for the user equipment. Also, the format of the DCI may vary depending on the intended use. The uplink control information (UCI) that the user equipment transmits to the base station through uplink includes a DL/UL ACK/NACK signal, a channel quality indicator (CQI), a precoding matrix index (PMI), a rank indicator (RI). In this case, the CQI, PMI, and RI may be includes in the channel state information (CSI). In the 3GPP NR system, the user equipment may transmit control information such as HARQ-ACK and CSI described above through the PUSCH and/or PUCCH.

Figure 4:
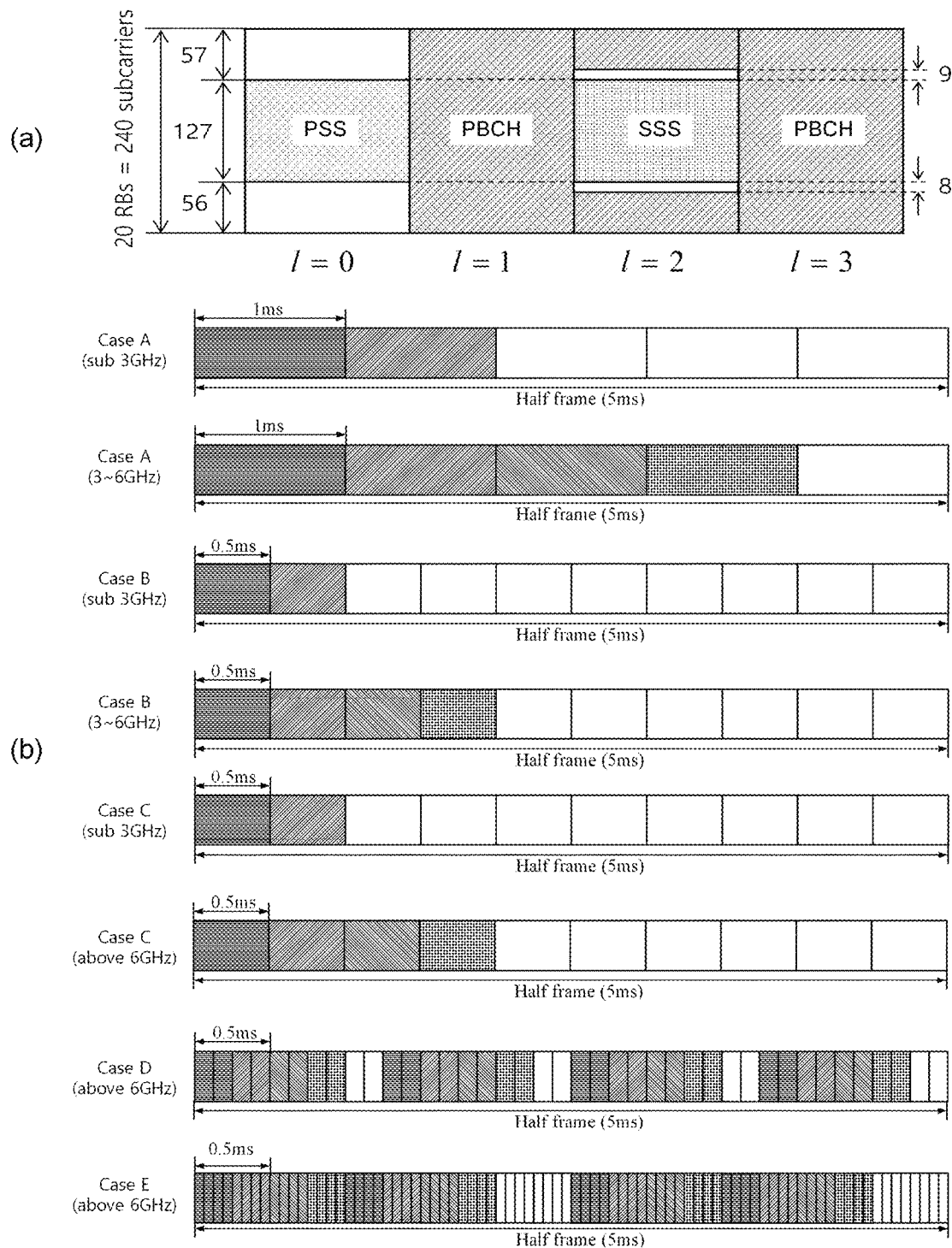
FIG. 4 illustrates an SS/PBCH block for initial cell access in a 3GPP NR system.

FIG. 4 illustrates an SS/PBCH block for initial cell access in a 3GPP NR system. When the power of the user equipment is turned on and the user equipment tries to access a new cell, the user equipment may obtain time and frequency synchronization with the cell and perform an initial cell search procedure. The user equipment can detect the physical cell identity $N^{cell}_{ID}$ of the cell in the initial cell search procedure. For this, the user equipment may receive a synchronization signal, for example, a primary synchronization signal (PSS) and a secondary synchronization signal (SSS) from a base station and synchronize with the base station. In this case, the user equipment may obtain information such as a cell identity (ID).

Referring to FIG. 4(a), a synchronization signal (SS) will be described in more detail. The synchronization signal may be divided into PSS and SSS. The PSS may be used to obtain time domain synchronization and/or frequency domain synchronization, such as OFDM symbol synchronization and slot synchronization. The SSS may be used to obtain frame synchronization and cell group ID. Referring to FIG. 4(a) and Table 2, the SS/PBCH block consists of 20 consecutive RBs (=240 subcarriers) in the frequency axis, and consists of 4 consecutive OFDM symbols in the time axis. Here, in the SS/PBCH block, PSS in the first OFDM symbol and SSS in the third OFDM symbol are transmitted through $56^{th} \sim 182^{nd}$ subcarriers. Here, the lowest subcarrier index of the SS/PBCH block is numbered from 0. In the first OFDM symbol in which the PSS is transmitted, the base station does not transmit a signal through the remaining subcarriers, that is, $0^{th} \sim 55^{th}$, and $183^{rd} \sim 239^{th}$ subcarriers. In the third OFDM symbol in which the SSS is transmitted, the base station does not transmit a signal through $48^{th} \sim 55^{th}$, and $183^{rd} \sim 191^{st}$ subcarriers. In the SS/PBCH block, the base station transmits the physical broadcast channel (PBCH) signal through the remaining RE except the above signal.

TABLE 2

| Channel or signal | OFDM symbol number/ relative to the start of an SS/PBCH block | Subcarrier number k relative to the start of an SS/PBCH block |
|---|---|---|
| PSS | 0 | 56, 57, . . ., 182 |
| SSS | 2 | 56, 57, . . ., 182 |
| Set to 0 | 0 | 0, 1, . . ., 55, 183, 184, . . ., 239 |
| | 2 | 48, 49, . . ., 55, 183, 184, . . ., 191 |
| PBCH | 1, 3 | 0, 1, . . ., 239 |
| | 2 | 0, 1, . . ., 47, 192, 193, . . ., 239 |
| DM-RS for PBCH | 1, 3 | 0 + v, 4 + v, 8 + v, . . ., 236 + v |
| | 2 | 0 + v, 4 + v, 8 + v, . . ., 44 + v 192 + v, 196 + v, . . ., 236 + v |

The SS may represent a total of 1008 unique physical layer cell IDs through a combination of 3 PSSs and SSS. Specifically, each physical layer cell ID is grouped into 336 physical-layer cell-identifier groups, where each group includes 3 unique identifiers such that each physical-layer cell ID is part of only one physical-layer cell-identifier group. Therefore, the physical layer cell ID $N^{cell}_{ID}=3N^{(1)}_{ID}+N^{(2)}_{ID}$ may be defined by an index $N^{(1)}_{ID}$ ranging from 0 to 335 indicating a physical-layer cell-identifier group and an index $N^{(2)}_{ID}$ ranging from 0 to 2 indicating a physical-layer identifier in the physical-layer cell-identifier group. The user equipment may detect the PSS and identify one of the three unique physical-layer identifiers. In addition, the user equipment may detect the SSS and identify one of the 336 physical layer cell IDs associated with the physical-layer identifier. In this case, the sequence $d_{PSS}(n)$ of PSS is as follows.

$$d_{PSS}(n)=1-2x(m)$$

$$m=(n+43N_{ID}^{(2)})\mod 127$$

$$0 \le n < 127$$

Here, $x(i+7)=(x(i+4)+x(i))\mod 2$ and $[x(6)\ x(5)\ x(4)\ x(3)\ x(2)\ x(1)\ x(0)]=[1\ 1\ 1\ 0\ 1\ 1\ 0]$.

In addition, the sequence $d_{SSS}(n)$ of SSS is as follows.

$$d_{SSS}(n) = [1 - 2x_0((n + m_0) \mod 127)][1 - 2x_1((n + m_1) \mod 127)]$$

$$m_0 = 15\left\lfloor \frac{N_{ID}^{(1)}}{112} \right\rfloor + 5N_{ID}^{(2)}$$

$$m_1 = N_{ID}^{(1)} \mod 112$$

$$0 \le n < 127$$

$$x_0(i + 7) = (x_0(i + 4) + x_0(i)) \mod 2$$

Here, $x_1(i+7) = (x_1(i+1) + x_1(i)) \mod 2$ and $[x_0(6)\ x_0(5)\ x_0(4)\ x_0(3)\ x_0(2)\ x_0(1)\ x_0(0)] = [0\ 0\ 0\ 0\ 0\ 0\ 1]$ $[x_1(6)\ x_1(5)\ x_1(4)\ x_1(3)\ x_1(2)\ x_1(1)\ x_1(0)] = [0\ 0\ 0\ 0\ 0\ 0\ 1]$.

A wireless frame with a length of 10 ms may be divided into two half frames with a length of 5 ms. Referring to FIG. 4(b), a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is {2, 8}+14*n-th symbols. In this case, n=0, 1 at a carrier frequency of 3 GHz or less. In addition, at a carrier frequency above 3 GHz and below 6 GHz, n=0, 1, 2, or 3. In the case B, the subcarrier spacing is 30 kHz and the starting time point of the SS/PBCH block is {4, 8, 16, 20}+28*n-th symbol. In this case, n=0, 1 at a carrier frequency of 3 GHz or less. In addition, at a carrier frequency above 3 GHz and below 6 GHz, n=0 or 1. In the case C, the subcarrier spacing is 30 kHz and the starting time point of the SS/PBCH block is {2, 8}+14*n-th symbol. In this case, n=0 or 1 at a carrier frequency of 3 GHz or less. In addition, at a carrier frequency above 3 GHz and below 6 GHz, n=0, 1, 2, or 3. In the case D, the subcarrier spacing is 120 kHz and the starting time point of the SS/PBCH block is {4, 8, 16, 20}+28*n. In this case, at a carrier frequency of 6 GHz or more, n=0, 1, 2, 3, 5, 6, 7, 8, 10, 11, 12, 13, 15, 16, 17, or 18. In the case E, the subcarrier spacing is 240 kHz and the starting time point of the SS/PBCH block is {8, 12, 16, 20, 32, 36, 40, 44}+56*n-th symbol. In this case, at a carrier frequency of 6 GHz or more, n=0, 1, 2, 3, 5, 6, 7, or 8.

Figure 5:
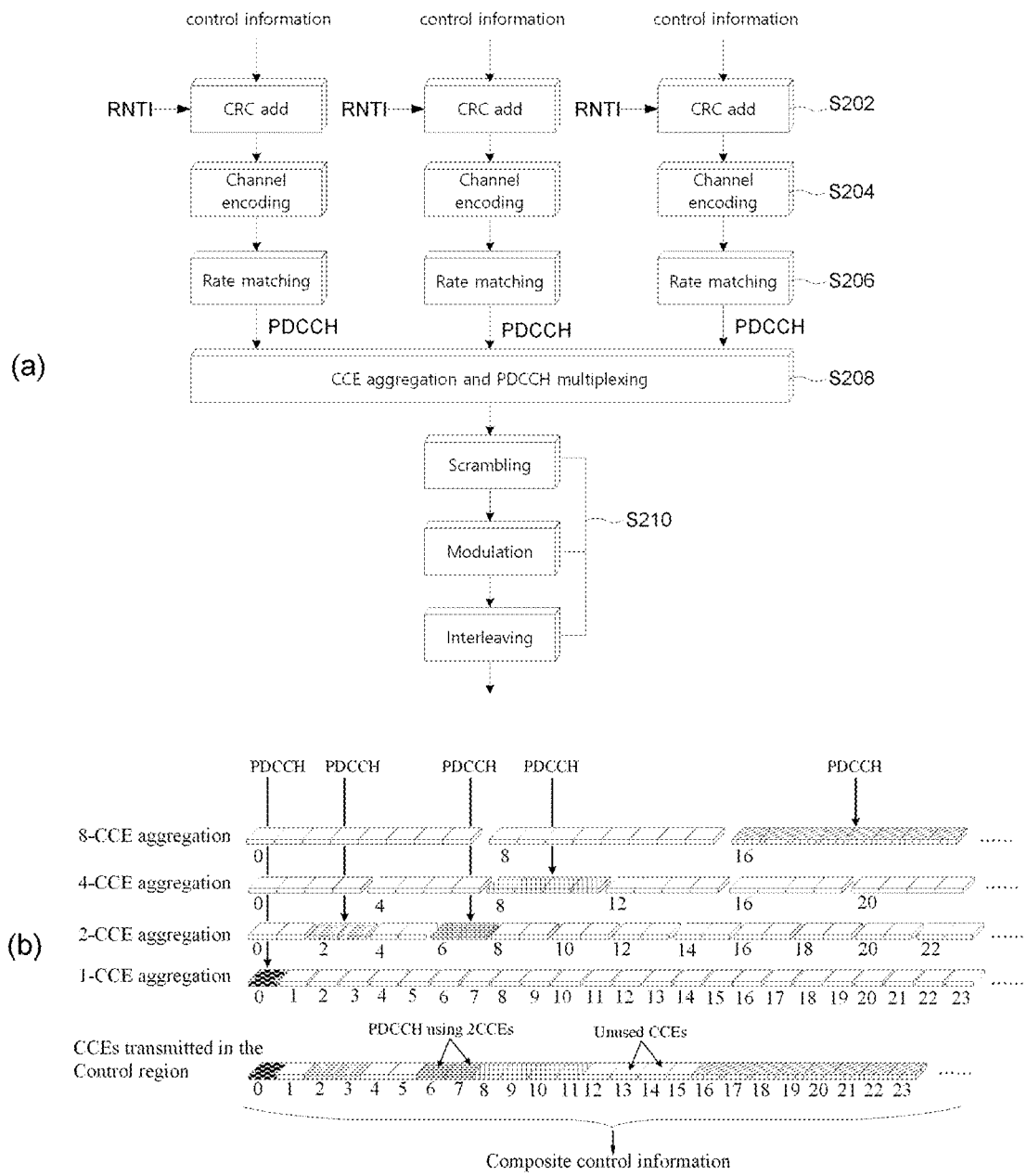
FIG. 5 illustrates a procedure for transmitting control information and control channel in a 3GPP NR system.

FIG. 5 illustrates a procedure for transmission of control information and control channel in a 3GPP NR system. Referring to FIG. 5(a), the base station may add a cyclic redundancy check (CRC) masked with a radio network temporary identifier (RNTI) (e.g., an XOR operation) to control information (e.g., Downlink Control Information, DCI) (S202). The base station may scramble the CRC with an RNTI value determined according to the purpose/target of each control information. The common RNTI used by one or more terminals may include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of cell temporary RNTI (C-RNTI) and CS-RNTI. Thereafter, the base station may perform rate-matching according to the amount of resource(s) used for PDCCH transmission (S206) after performing channel coding (e.g., polar coding) (S204). Subsequently, the base station may multiplex DCI(s) based on a control channel element (CCE) based PDCCH structure (S208). Furthermore, the base station may apply additional processes such as scrambling, modulation (e.g., QPSK), and interleaving for the multiplexed DCI(s) (S210), and thereafter, map it to a resource to be transmitted. The CCE is a basic resource unit for the PDCCH, and one CCE may consist of a plurality (e.g., 6) resource element groups (REGs). One REG may consist of a plurality of (e.g., 12) REs. The number of CCEs used for one PDCCH may be defined as an aggregation level. In 3GPP NR system, an aggregation level of 1, 2, 4, 8 or 16 can be used. FIG. 5(b) is a diagram illustrating the CCE aggregation level and the PDCCH multiplexing. In this case, the type of the CCE aggregation level used for one PDCCH and the CCE(s) transmitted in the control region accordingly are described.

Figure 6:
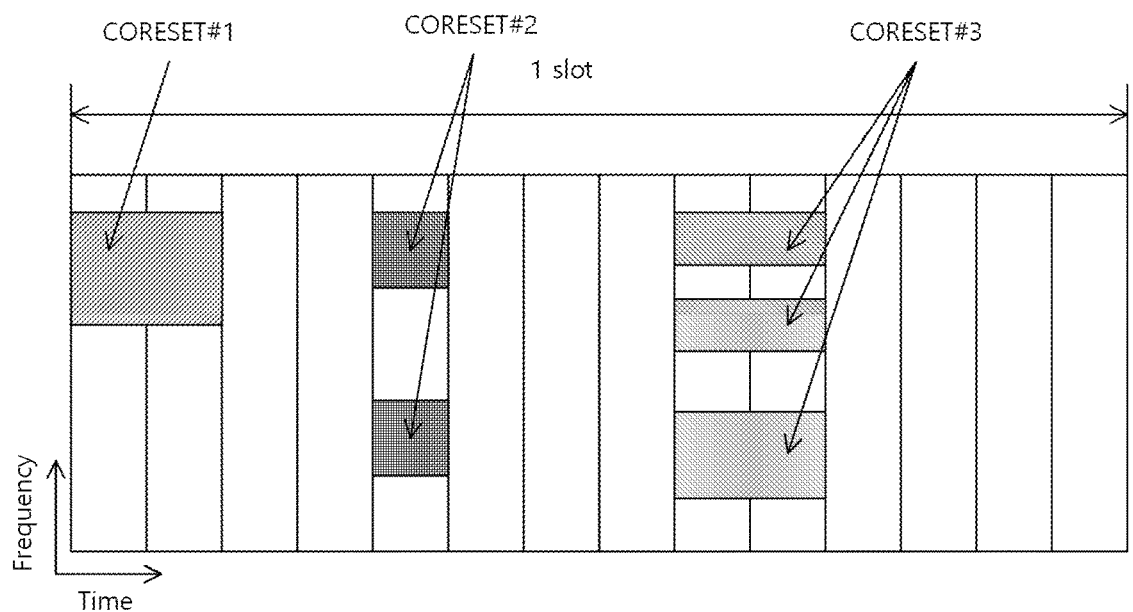
FIG. 6 is a diagram illustrating a control resource set (CORESET) in which a physical downlink control channel (PDCCH) can be transmitted in a 3GPP NR system.

FIG. 6 is a diagram illustrating a control resource set (CORESET) in which a physical downlink control channel (PDCCH) in a 3GPP NR system may be transmitted. The CORESET is a time-frequency resource in which PDCCH, that is, a control signal for a user equipment, is transmitted. In addition, a search space described below may be mapped to one CORESET. Accordingly, the user equipment may decode the PDCCH mapped to CORESET by monitoring the time-frequency region designated as CORESET, rather than monitoring all frequency bands for PDCCH reception. The base station may configure one or more CORESETs for each cell to the user equipment. The CORESET may be configured with up to three consecutive symbols on the time axis. In addition, the CORESET may be configured in units of 6 consecutive PRBs on the frequency axis. In the embodiment of FIG. 5, CORESET #1 is configured with consecutive PRBs, and CORESET #2 and CORESET #3 are configured with discontinuous PRBs. CORESET may be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
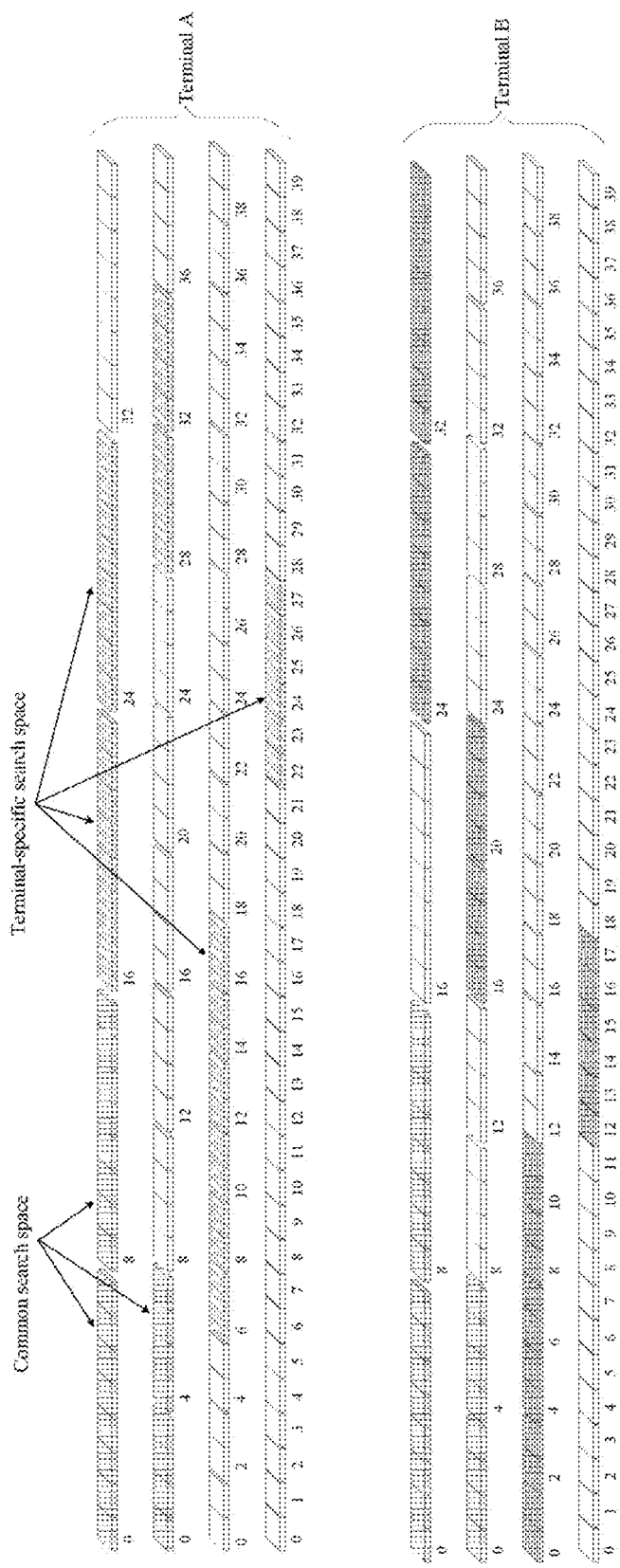
FIG. 7 is a diagram illustrating CCE aggregation search space allocation for a common search space and a UE specific (or terminal specific) search space.

FIG. 7 is a diagram illustrating a method for setting a PDCCH search space in the 3GPP NR system. In order to transmit the PDCCH to the user equipment, each CORESET may have at least one search space. In the embodiment of the present invention, the search space is all the time-frequency resource combinations (hereinafter, a set of PDCCH candidates) through which the PDCCH of the user equipment may be transmitted. The search space may include a common search space that the user equipment of the 3GPP NR must commonly perform a search and a Terminal-specific or UE-specific search space that a specific user equipment must perform a search. In the common search space, it is possible to monitor the PDCCH that all the user equipments in the cell belonging to the same base station are commonly set to search. In the common search space, it is set to monitor the PDCCH that Furthermore, in the UE-specific search space, each user equipment may be set to monitor the PDCCH allocated to each user equipment in different search space positions according to the user equipment. The corresponding UE-specific search space may be partially overlapped with the search space of other user equipments due to the limited control region to which the PDCCH can be allocated. Monitoring the PDCCH includes blind decoding PDCCH candidates in the search space. The case where the blind decoding is successful may be expressed that the PDCCH is (successfully) detected/received. Furthermore, the case where the blind decoding has failed may be expressed that the PDCCH is not detected/received or may be expressed that the PDCCH is not successfully detected/received.

For convenience of explanation, a PDCCH scrambled with a group common (GC) RNTI already known to transmit DL control information to one or more user equipments is referred to as a group common (GC) PDCCH or a common PDCCH. In addition, a PDCCH scrambled with a UE-specific RNTI that a specific user equipment already knows to transmit UL scheduling information or DL scheduling information to one specific user equipment is referred to as a UE-specific PDCCH. The common PDCCH may be included in a common search space, and the UE-specific PDCCH may be included in a common search space or a UE-specific PDCCH.

The base station may signal, through the PDCCH, each user equipment or user equipment group of at least one of information related to resource allocation (i.e., DL grant) of a paging channel (PCH) and a downlink-shared channel (DL-SCH), or information related to resource allocation (i.e., UL grant) of UL-SCH, and HARQ information. The base station may transmit a PCH transport block and a DL-SCH transport block through a PDSCH. The base station may transmit data excluding specific control information or specific service data through the PDSCH. In addition, the user equipment may receive data excluding specific control information or specific service data through the PDSCH.

The base station may include, in the PDCCH, information on to which user equipment (one or more user equipments) PDSCH data is transmitted and how the PDSCH data is to be received and decoded by the corresponding user equipment, and transmit the PDCCH. For example, it is assumed that a DCI transmitted thorough a specific PDCCH is CRC masked with an RNTI called "A", and the DCI indicates that a PDSCH is allocated to a radio resource (e.g., frequency location) called "B" and indicates transmission format information (e.g., transport block size, modulation scheme, coding information, etc.) called "C". The user equipment monitors the PDCCH using the RNTI information the user equipment has. In this case, when there is a user equipment that blind decodes the PDCCH with an "A" RNTI, the corresponding user equipment receives the PDCCH and receives the PDSCH indicated by "B" and "C" through the information of the received PDCCH.

Table 3 illustrates an embodiment of the physical uplink control channel (PUCCH) used in the wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following uplink control information (UCI).
  Scheduling request (SR): Information used to request a UL UL-SCH resource.
  HARQ-ACK: A response to the PDCCH (which indicates DL SPS release) and/or a response to a DL transport block (TB) on the PDSCH. The HARQ-ACK indicates whether information transmitted through PDCCH or PDSCH has been received. The HARQ-ACK response includes positive ACK (simply ACK), negative ACK (hereinafter NACK), discontinuous transmission (DTX), or NACK/DTX. Here, the term HARQ-ACK is interchangeably used with HARQ ACK/NACK and ACK/NACK. In general, ACK may be represented by a bit value 1 and NACK may be represented by a bit value 0.
  Channel state information (CSI): This is feedback information on the DL channel. It is generated by the user equipment based on the CSI-reference signal (RS) transmitted by the base station. Multiple input multiple output (MIMO)-related feedback information includes a rank indicator (RI) and a precoding matrix indicator (PMI). CSI may be divided into CSI part 1 and CSI part 2 according to the information indicated by CSI.

In the 3GPP NR system, five PUCCH formats may be used to support various service scenarios and various channel environments and frame structures.

PUCCH format 0 is a format may deliver 1-bit or 2-bit HARQ-ACK information or SR. PUCCH format 0 may be transmitted through one or two OFDM symbols on the time axis and one RB on the frequency axis. When PUCCH format 0 is transmitted in two OFDM symbols, the same sequence to the two symbols may be transmitted through different RBs. Through this, the user equipment can obtain a frequency diversity gain. More specifically, the user equipment may determine a value $m_{cs}$ of a cyclic shift according to $M_{bit}$ bits UCI ($M_{bit}$=1 or 2), and map a sequence obtained by cyclic-shifting a base sequence having a length of 12 to a predetermined value $m_{cs}$ to 12 REs of one OFDM symbol and one PRB and transmit it. In a case where the number of cyclic shifts usable by the user equipment is 12 and $M_{bit}$=1, then 1 bit UCI 0 and UCI 1 may be represented by a sequence corresponding to two cyclic shifts of which the difference of the cyclic shift value is 6. In addition, when $M_{bit}$=2, then 2 bit UCI 00, 01, 11, 10 may be represented by a sequence corresponding to four cyclic shifts of which the difference of the cyclic shift value is 3.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4~14. More specifically, a UCI of $M_{bit}$=1 may be modulated with BPSK. The user equipment may modulate a UCI of $M_{bit}$=2 with quadrature phase shift keying (QPSK). A signal is obtained by multiplying the modulated complex valued symbol d(0) by a sequence of length 12. The user equipment transmits the obtained signal by spreading the even-numbered OFDM symbol to which PUCCH format 1 is allocated through the time axis orthogonal cover code (OCC). PUCCH format 1 determines the maximum number of different user equipments multiplexed in the same RB according to the length of the OCC to be used. In the odd-numbered OFDM symbols of PUCCH format 1, demodulation reference signal (DMRS) is spread with OCC and mapped.

PUCCH format 2 may deliver uplink control information (UCI) exceeding 2 bits. PUCCH format 2 may be transmitted through one or two OFDM symbols on the time axis and one or more RBs on the frequency axis. When PUCCH format 2 is transmitted in two OFDM symbols, the same sequence to the two different OFDM symbols may be transmitted through different RBs. Through this, the user equipment can obtain a frequency diversity gain. More specifically, $M_{bit}$ bits UCI ($M_{bit}$>2) is bit-level scrambled, QPSK-modulated, and mapped to the RB(s) of the one or more OFDM symbol(s). Here, the number of RBs may be any one of 1~16.

PUCCH format 3 or PUCCH format 4 may deliver a UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4~14. Specifically, the user equipment modulates $M_{bit}$ bits UCI ($M_{bit}$>2) with π/2-binary phase shift keying (BPSK) or QPSK to generate a complex valued symbol $d(0)$~$d(M_{symb}-1)$. Here, $M_{symb}=M_{bit}$ when using π/2-BPSK, and $M_{symb}=M_{bit}/2$ when using QPSK. The user equipment may not apply block-wise spreading to PUCCH format 3. However, the user equipment may apply block-wise spreading to one RB (i.e., 12 subcarriers) using a length-12 PreDFT-OCC so that PUCCH format 4 can have two or four multiplexing capacities. The user equipment performs transmit precoding (or DFT-precoding) on the spread signal and mapping it to each RE to transmit the spread signal.

In this case, the number of RBs occupied by PUCCH format 2, PUCCH format 3, or PUCCH format 4 may be determined according to the length and maximum code rate of the UCI transmitted by the user equipment. When the user equipment uses PUCCH format 2, the user equipment can transmit HARQ-ACK information and CSI information together through the PUCCH. When the number of RBs that the user equipment can transmit is greater than the maximum number of RBs that PUCCH format 2, or PUCCH format 3, or PUCCH format 4 is capable of using, the user equipment may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with the RRC signal. When PUCCH format 1, or PUCCH format 3, or PUCCH format 4 is transmitted through N OFDM symbols on the time axis, the first hop may have floor (N/2) OFDM symbols and the second hop may have ceil (N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs is required to start at an OFDM symbol of the same position in each slot, and have the same length. When any one OFDM symbol among OFDM symbols of a slot in which the user equipment is required to transmit a PUCCH is indicated as a DL symbol by an RRC signal, the user equipment may not transmit the PUCCH in a corresponding slot and delay the transmission of the PUCCH to the next slot to transmit the PUCCH.

Meanwhile, in the 3GPP NR system, a user equipment can perform transmission/reception using a bandwidth less than or equal to the bandwidth of a carrier (or cell). For this, the user equipment may be configured with a bandwidth part (BWP) consisting of a continuous bandwidth which is a part of the bandwidth of the carrier. A user equipment operating according to TDD or operating in an unpaired spectrum may be configured with up to four DL/UL BWP pairs in one carrier (or cell). In addition, the user equipment may activate one DL/UL BWP pair. A user equipment operating according to FDD or operating in paired spectrum can receive up to four DL BWPs on a DL carrier (or cell) and up to four UL BWPs on a UL carrier (or cell). The user equipment may activate one DL BWP and one UL BWP for each carrier (or cell). The user equipment may or may not perform reception or transmission in a time-frequency resource other than the activated BWP. The activated BWP may be referred to as an active BWP.

The base station may indicate activated BWP among BWPs configured to the user equipment the downlink control information (DCI). The BWP indicated by the DCI is activated and other configured BWP(s) are deactivated. In a carrier (or cell) operating in TDD, the base station may include a bandwidth part indicator (BPI) indicating the BWP to be activated in the DCI scheduling PDSCH or PUSCH to change the DL/UL BWP pair of the user equipment. The user equipment may receive the DCI scheduling the PDSCH or PUSCH and may identify the DL/UL BWP pair activated based on the BPI. For a DL carrier (or cell) operating as an FDD, the base station may include a BPI indicating the BWP to be activated in the DCI scheduling PDSCH to change the DL BWP of the user equipment. For a UL carrier (or cell) operating as an FDD, the base station may include a BPI indicating the BWP to be activated in the DCI scheduling PUSCH to change the UL BWP of the user equipment.

Figure 8:
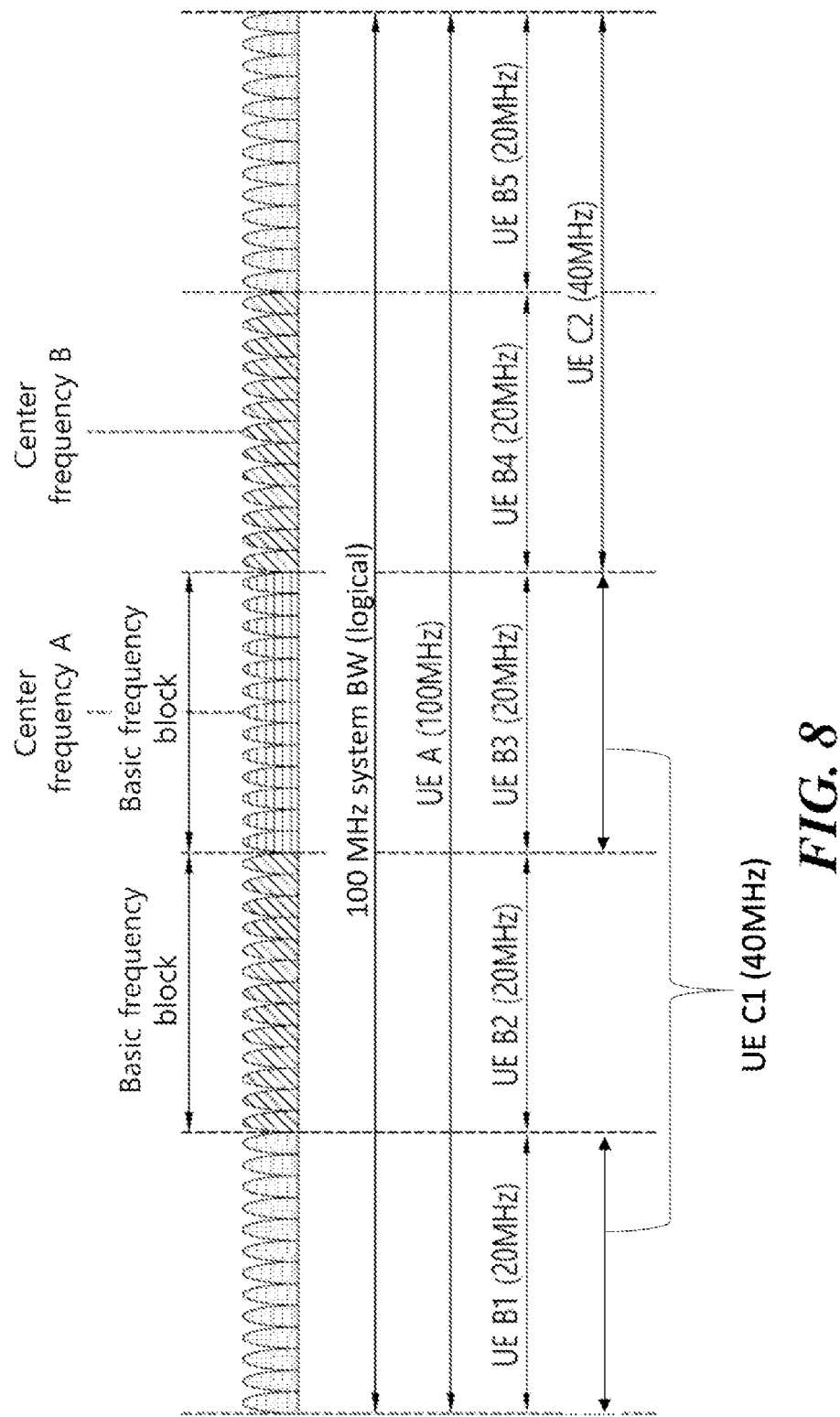
FIG. 8 is a conceptual diagram illustrating carrier aggregation.

FIG. 8 is a conceptual diagram illustrating carrier aggregation. Carrier aggregation is a method in which the user equipment uses a plurality of frequency blocks or cells (in the logical sense) including UL resources (or component carriers) and/or DL resources (or component carriers) as one large logical frequency band in order for a wireless communication system to use a wider frequency band. Hereinafter, for convenience of description, the term "component carrier" is used.

Referring to FIG. 8, as an example of a 3GPP NR system, a total system bandwidth includes up to 16 ∂component carriers, and each component carrier may be capable of having a bandwidth up to 400 MHz. A component carrier may include one or more physically contiguous subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in a physically adjacent component carrier. Assuming that all the component carriers are physically adjacent in the embodiment of FIG. 8, the center frequency A may be used in all the component carriers. Further, assuming that the respective component carriers are not physically adjacent to each other, the center frequency A and the center frequency B may be used in each of the component carriers.

When the total system band is extended by carrier aggregation, the frequency band used for communication with each user equipment may be defined in units of a component carrier. The user equipment A can use 100 MHz, which is the total system band, and performs communication using all five component carriers. The user equipments B1 to B5 can use only 20 MHz bandwidth and perform communication using one component carrier. The user equipments $C_1$ and $C_2$ can use a 40 MHz bandwidth and perform communication using two component carriers, respectively. The two component carriers may be logically/physically adjacent or non-adjacent. In the embodiment of FIG. 8, the user equipment $C_1$ uses two non-adjacent component carriers, and user equipment $C_2$ uses two adjacent component carriers.

Figure 9:
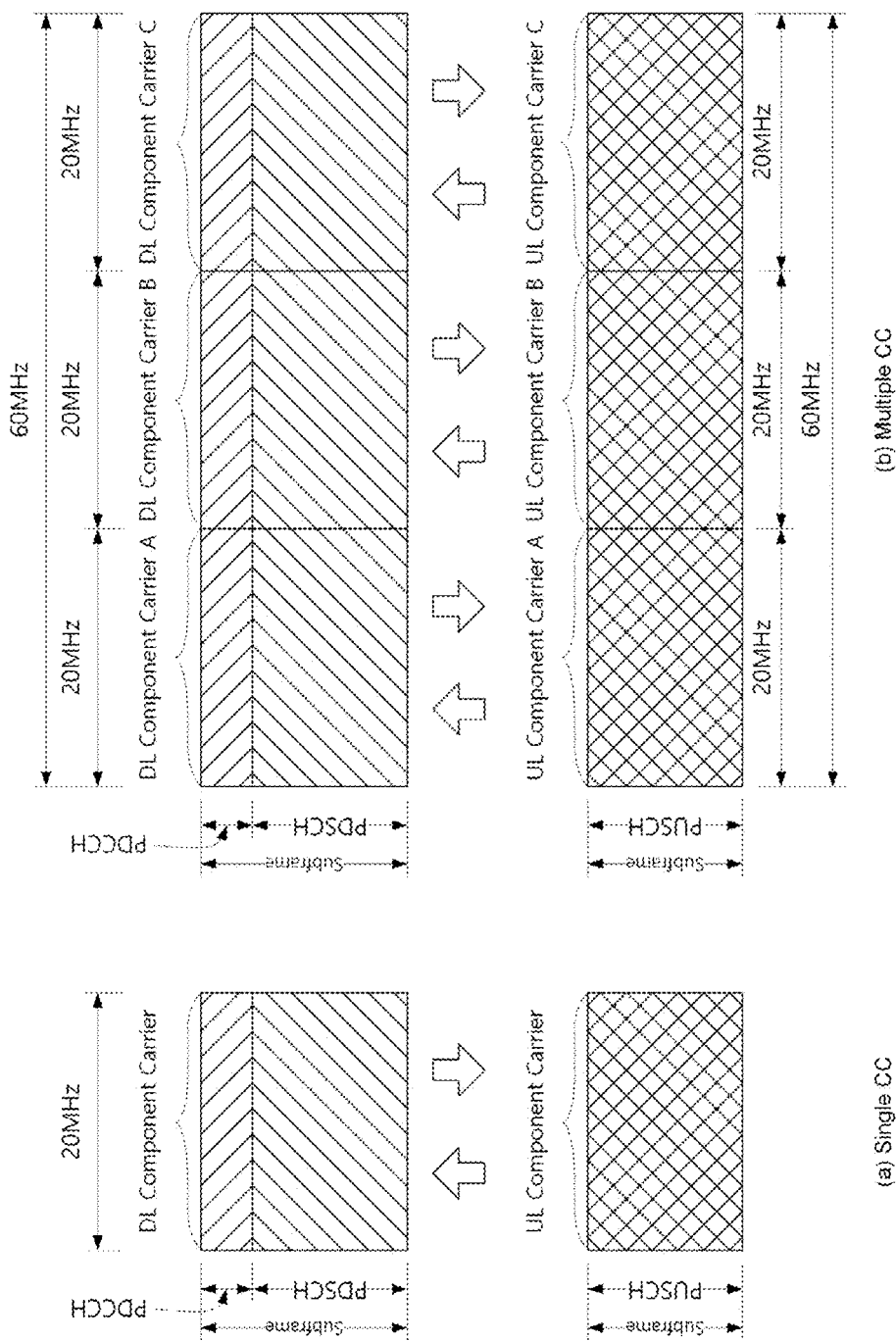
FIG. 9 is a diagram for describing single carrier communication and multicarrier communication.

FIG. 9 is a diagram for explaining single carrier communication and multi-carrier communication. Particularly, FIG. 7(*a*) shows a single carrier subframe structure and FIG. 7(*b*) shows a multi-carrier subframe structure.

Referring to FIG. 9(*a*), in case of an FDD mode, a general wireless communication system may perform data transmission or reception through one DL band and one UL band corresponding thereto. In another specific embodiment, in case of a TDD mode, a wireless communication system may divide a wireless frame into a UL time unit and a DL time unit in a time domain, and perform data transmission or reception through the UL/DL time unit. Referring to FIG. 9(*b*), three 20 MHz component carriers (CCs) may be aggregated into UL and DL, respectively, so that a bandwidth of 60 MHz may be supported. Each CC may be adjacent or non-adjacent to one another in the frequency domain. FIG. 9(*b*) shows a case where the bandwidth of the UL CC and the bandwidth of the DL CC are the same and symmetric, but the bandwidth of each CC may be determined independently. In addition, asymmetric carrier aggregation with different number of UL CCs and DL CCs is possible. A DL/UL CC that is allocated/configured to a specific user equipment through RRC may be referred to as a serving DL/UL CC of the specific user equipment.

The base station may communicate with the user equipment by activating some or all of the serving CCs of the user equipment, or by deactivating some CCs. The base station can change the CC to be activated/deactivated, and change the number of CCs to be activated/deactivated. If the base station allocates a CC available for the user equipment to a cell-specific or UE-specific, then at least one of the allocated CCs is deactivated, unless the CC allocation for the user equipment is completely reconfigured or the user equipment is handover. One CC that is not deactivated by the user equipment is called a primary CC (PCC) or a primary cell (PCell), and a CC that the base station can freely activate/deactivate is called a secondary CC (SCC) or a secondary cell (SCell).

Meanwhile, 3GPP NR uses the concept of a cell to manage radio resources. A cell is defined by a combination of DL resources and UL resources, that is, a combination of DL CC and UL CC. A cell may be configured with DL resources alone, or a combination of DL resources and UL resources. If carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in downlink is a DL PCC, and the carrier corresponding to the PCell in uplink is a UL PCC. Similarly, the carrier corresponding to the SCell in downlink is a DL SCC, and the carrier corresponding to the SCell in uplink is a UL SCC. According to the capability of the user equipment, the serving cell(s) may consist of one PCell and zero or more SCells. In the case of user equipments that are in the RRC_CONNECTED state but not configured for carrier aggregation or that do not support carrier aggregation, there is only one serving cell configured with PCell.

As mentioned above, the term "cell" used in carrier aggregation is distinguished from the term "cell" which refers to a certain geographical area in which a communication service is provided by one base station or one antenna group. In order to distinguish between a cell referring to a certain geographical area and a cell of carrier aggregation, in the present invention, a cell of a carrier aggregation is referred to as a CC, and a cell of a geographical area is referred to as a cell.

Figure 10:
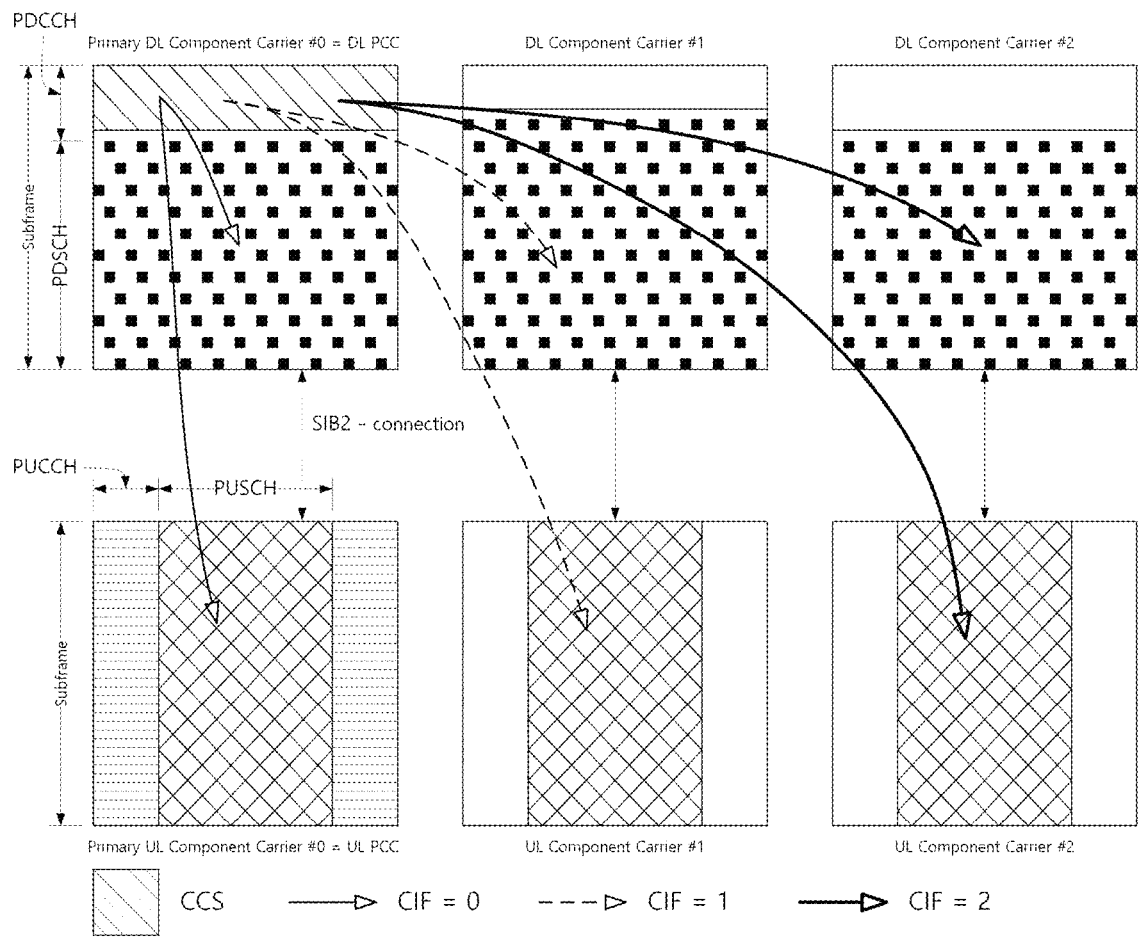
FIG. 10 is a diagram illustrating an example in which a cross carrier scheduling technique is applied.

FIG. 10 is a diagram illustrating an example in which a cross-carrier scheduling technique is applied. When cross-carrier scheduling is configured, the control channel transmitted through the first CC may schedule a data channel transmitted through the first CC or the second CC using a carrier indicator field (CIF). The CIF is included in DCI. In other words, a scheduling cell is configured, and a DL grant/UL grant transmitted in the PDCCH region of the scheduling cell schedules a PDSCH/PUSCH of the scheduled cell. That is, a search region for a plurality of component carriers exists in the PDCCH region of the scheduling cell. PCell is basically a scheduling cell, and a specific SCell may be designated as a scheduling cell by an upper layer.

In the embodiment of FIG. 10, it is assumed that 3 DL CCs are aggregated. Herein, DL component carrier #0 is assumed to be a DL PCC (or PCell), and DL component carrier #1 and DL component carrier #2 are assumed to be DL SCC (or SCell). It is also assumed that the DL PCC is set to the PDCCH monitoring CC. If no cross-carrier scheduling is configured by UE-specific (or UE-group-specific or cell-specific) higher layer signaling, CIF is disabled, and, according to NR PDCCH rule, only PDCCH scheduling PDSCH of itself can be transmitted without CIF in each DL CC (non-cross-carrier scheduling, self-carrier scheduling). On the other hand, if cross-carrier scheduling is configured by the UE-specific (or UE-group-specific or cell-specific) higher layer signaling, CIF is enabled and PDCCH scheduling PDSCH of another CC can be transmitted by using the CIF as well as PDCCH scheduling PDSCH of DL CC A in a specific CC (cross-carrier scheduling). On the other hand, PDCCH is not transmitted in the other DL CCs. Accordingly, the user equipment receives a self-carrier scheduled PDSCH by monitoring PDCCH not including CIF or receives a cross-carrier scheduled PDSCH by monitoring PDCCH including CIF depending on whether the cross-carrier scheduling is configured for the user equipment.

Meanwhile, FIGS. 9 and 10 illustrate a subframe structure of the 3GPP LTE-A system, but the same or similar configuration may be applied to the 3GPP NR system. However, in the 3GPP NR system, the subframes of FIGS. 9 and 10 may be replaced with slots.

Figure 11:
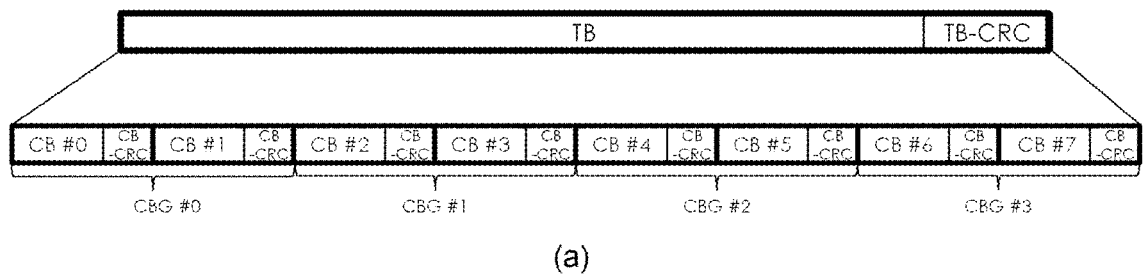
FIG. 11 illustrates a code block group (CBG) configuration and time frequency resource mapping thereof according to an embodiment of the present invention.
Figure 11:
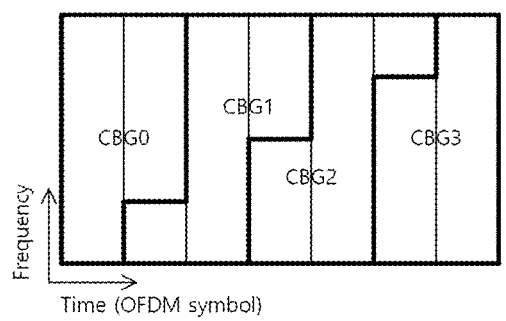

FIG. 11 illustrates a code block group (CBG) configuration and time-frequency resource mapping thereof according to an embodiment of the present invention. More specifically, FIG. 11(*a*) illustrates an embodiment of a CBG configuration included in one transport block (TB), and FIG. 11(b) illustrates time frequency resource mapping of the corresponding CBG configuration.

A maximum supported lengths of channel codes are defined. For example, the maximum supported length of a turbo code used in 3GPP LTE (-A) is 6144 bits. However, the length of a transport block (TB) transmitted in the PDSCH may be longer than 6144 bits. If the length of the TB is longer than the maximum supported length, the TB can be divided into code blocks (CBs) with a length up to 6144 bits. Each CB is a unit in which channel coding is performed. In addition, several CBs may be bundled to form one CBG for efficient retransmission. The user equipment and the base station need information on how the CBG is configured.

CBGs and CBs within a TB may be configured according to various embodiments. According to an embodiment, the number of usable CBGs may be determined as a fixed value, or may be configured by RRC configuration information between the base station and the user equipment. In this case, the number of CBs is determined according to the length of TB, and the CBGs may be set according to the determined number information. According to another embodiment, the number of CBs that can be included in one CBG may be determined as a fixed value, or may be configured by RRC configuration information between the base station and the user equipment. In this case, when the number of CBs is determined according to the length of TB, the number of CBGs may be set according to information on the number of CBs per one CBG.

Referring to the embodiment of FIG. 11(a), one TB can be divided into 8 CBs. The 8 CBs can be grouped into 4 CBGs again. The mapping relationship (or CBG configuration) of the CB and the CBG may be set statically between the base station and the user equipment or semi-statically with the RRC configuration information. According to another embodiment, the mapping relationship may be established through dynamic signaling. When the user equipment receives the PDCCH transmitted by the base station, the user equipment may directly or indirectly identify the CB and CBG mapping relationship (or CBG configuration) through explicit information and/or implicit information. One CBG may include only one CB or may include all CBs constituting one TB. For reference, the techniques proposed in the embodiments of the present invention may be applied regardless of CB and CBG configuration.

Referring to FIG. 11(b), CBGs constituting one TB are mapped to time-frequency resources for which a PDSCH is scheduled. According to an embodiment, each CBG may be assigned to the frequency axis first and then extended to the time axis. When a PDSCH consisting of one TB containing 4 CBGs is allocated to 7 OFDM symbols, CBG0 may be transmitted through the first and second OFDM symbols, CBG1 may be transmitted through the second, third and fourth OFDM symbols, CBG2 may be transmitted through the fourth, fifth and sixth OFDM symbols, and CBG3 may be transmitted through the sixth and seventh OFDM symbols. The time-frequency mapping relationship allocated to the CBG and PDSCH may be predetermined between the base station and the user equipment. However, the mapping relationship shown in FIG. 11(b) is an embodiment for explaining the present invention, and the technique proposed in the embodiment of the present invention may be applied regardless of the time-frequency mapping relationship of the CBG.

Figure 12:
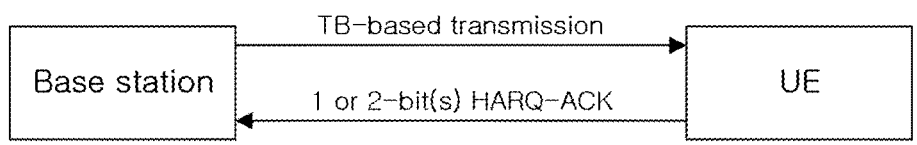
FIG. 12 illustrates a process in which a base station performs TB-based transmission or CBG-based transmission, and the user equipment performs HARQ-ACK transmission in response thereto according to an embodiment of the present invention.
Figure 12:
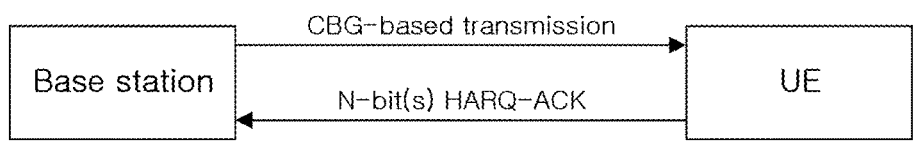

FIG. 12 illustrates a process in which a base station performs TB-based transmission or CBG-based transmission, and a user equipment performs transmission of HARQ-ACK transmission in response thereto according to an embodiment of the present invention. Referring to FIG. 12, the base station may configure a transmission scheme suitable for a user equipment between TB-based transmission and CBG-based transmission. The user equipment may transmit the HARQ-ACK bit(s) according to the transmission scheme configured by the base station through PUCCH or PUSCH. The base station may configure the PDCCH to schedule the PDSCH to be transmitted to the user equipment. The PDCCH may schedule TB-based transmissions and/or CBG-based transmissions. For example, one TB or two TBs may be scheduled in the PDCCH. If one TB is scheduled, the user equipment should feedback 1-bit HARQ-ACK. If two TBs are scheduled, 2-bit HARQ-ACK should be fed back for the two TBs. In order to eliminate ambiguity between the base station and the user equipment, a preset order may exist between each bit of the 2-bit HARQ-ACK and two TBs. For reference, when the MIMO transmission rank or layer is low, one TB may be transmitted in one PDSCH. When the MIMO transmission rank or layer is high, two TBs may be transmitted in one PDSCH.

The user equipment may transmit 1-bit TB-based HARQ-ACK per one TB to inform the base station whether the reception of each TB is successful. In order to generate HARQ-ACK for one TB, the user equipment may check the reception error of the corresponding TB through a TB-CRC. If the TB-CRC for the TB is successfully checked, the user equipment generates an ACK for HARQ-ACK of the corresponding TB. However, if a TB-CRC error occurs for the TB, the user equipment generates a NACK for HARQ-ACK of the corresponding TB. The user equipment transmits the TB-based HARQ-ACK(s) generated as described above to the base station. The base station retransmits the TB for which the NACK is responded among the TB-based HARQ-ACK(s) received from the user equipment.

In addition, the user equipment may transmit a 1-bit CBG-based HARQ-ACK per one CBG to inform the base station whether the reception of each CBG is successful. In order to generate HARQ-ACK for one CBG, the user equipment may decode all CBs included in the CBG and check the reception error of each CB through the CB-CRC. If the user equipment successfully receives all CBs constituting one CBG (that is, when all CB-CRCs are successfully checked), the user equipment generates an ACK for HARQ-ACK of the corresponding CBG. However, if the user equipment does not successfully receive at least one of the CBs constituting one CBG (that is, at least one CB-CRC error occurs), the user equipment generates a NACK for HARQ-ACK of the corresponding CBG. The user equipment transmits the CBG-based HARQ-ACK(s) generated as described above to the base station. The base station retransmits the CBG for which the NACK is responded among the CBG-based HARQ-ACK(s) received from the user equipment. According to an embodiment, the CB configuration of the retransmitted CBG may be the same as the CB configuration of the previously transmitted CBG. The length of the CBG-based HARQ-ACK bit(s) transmitted by the user equipment to the base station may be determined based on the number of CBGs transmitted through the PDSCH or the maximum number of CBGs configured by an RRC signal. In addition, a TB-based HARQ-ACK may be additionally transmitted separately from the CBG-based HARQ-ACK as in the above-described embodiments. In this case, the TB-based HARQ-ACK may indicate whether the TB-CRC is successfully checked.

According to an embodiment of the present invention, CBG-based HARQ-ACK feedback may be used for successful transmission of TB. The base station may indicate the user equipment to transmit the CBG-based HARQ-ACK. In this case, a retransmission scheme based on the CBG-based HARQ-ACK may be used. The CBG-based HARQ-ACK may be transmitted through the PUCCH. In addition, when UCI is configured to be transmitted through the PUSCH, the CBG-based HARQ-ACK may be transmitted through the corresponding PUSCH. The configuration of HARQ-ACK resources in the PUCCH may be configured through an RRC signal. In addition, the actually transmitted HARQ-ACK resources may be indicated through the PDCCH scheduling the PDSCH transmitted on CBG-based. The user equipment may transmit HARQ-ACK(s) for successful reception of transmitted CBGs through one PUCCH resource indicated through PDCCH among PUCCH resources configured with RRC.

The base station may identify whether the user equipment has successfully received the CBG(s) transmitted to the user equipment through the CBG-based HARQ-ACK feedback of the user equipment. That is, through the HARQ-ACK for each CBG received from the user equipment, the base station may identify the CBG(s) that the user equipment has successfully received and the CBG(s) that the user equipment has failed to receive. The base station may perform CBG retransmission based on the received CBG-based HARQ-ACK. More specifically, the base station may bundle and retransmit only the CBG(s) for which HARQ-ACK of a reception failure is responded in one TB. In this case, the CBG(s) for which the HARQ-ACK of successful reception has been responded are excluded from retransmission. The base station may schedule the retransmitted CBG(s) to one PDSCH and transmit the same to the user equipment.

The number of CBG(s) transmitted through the PDSCH may vary in a CBG retransmission process for transmission of one TB. Therefore, the user equipment needs to transmit information whether the reception of the CBG(s) transmitted in the corresponding PDSCH is successful through the HARQ-ACK. However, the user equipment does not need to transmit HARQ-ACK(s) for CBG(s) that have already been responded with an ACK to the base station and have not been retransmitted in the corresponding PDSCH. As described above, the HARQ-ACK bit(s) may be reduced according to the number of CBGs transmitted in the PDSCH. Through this, not only can the HARQ-ACK reliability be improved, but also the unused HARQ-ACK resources can be reused as HARQ-ACK resources for CBG (s) corresponding to other TBs or different TBs of the same user equipment, thereby reducing the overhead of the uplink control channel. However, despite the advantages described above, the method of transmitting HARQ-ACK bit(s) according to the number of CBGs transmitted in the PDSCH may have disadvantages in the following two situations.

i) A NACK-to-ACK error may occur in a base station after the user equipment transmits a PUCCH (or a PUSCH in which HARQ-ACK is included) transmitting HARQ-ACK. In this case, the base station may determine that the CBG(s) to be retransmitted are successfully transmitted and may not transmit them through the next PDSCH for retransmission. The user equipment expects retransmission of CBG(s) that failed to receive, but since the CBG(s) are not transmitted through the next PDSCH, transmission of NACK(s) for retransmission of the corresponding CBG(s) is required. However, since the CBG(s) have not been transmitted through the next PDSCH for retransmission, the user equipment cannot transmit HARQ-ACK for the corresponding CBG(s). Therefore, when a NACK-to-ACK error that may occur from transmission of a PUCCH (or a PUSCH in which HARQ-ACK is included) transmitting HARQ-ACK of the user equipment occurs, a method for improving that is needed.

ii) In the CBG-based transmission, the user equipment may determine whether the CBG reception is successful according to the CRC success of the CBs included in the CBG. That is, when the CB-CRC of all the CBs included in the CBG is successfully checked, the user equipment may transmit an ACK as HARQ-ACK for the corresponding CBG. On the contrary, when a CB-CRC error occurs even in one of the CBs included in the CBG, the user equipment may transmit a NACK as HARQ-ACK for the corresponding CBG. However, whether the TB is successfully received may be determined according to whether the TB-CRC attached to the TB is successfully checked. Accordingly, the user equipment may determine that all CBG(s) have been successfully received and transmit an ACK as HARQ-ACK for the corresponding CBG(s), but may fail to check the TB-CRC and thus fail to receive the TB. Therefore, there is a need for a method for improving such a situation.

According to an embodiment of the present invention, a fallback indicator may be used as a method for solving the above problems that may occur when using a method of transmitting HARQ-ACK bit(s) according to the number of CBGs transmitted in a PDSCH. The fallback indicator is an indicator for retransmitting all CBGs of one TB through the PDSCH (hereinafter, referred to as fallback mode). The user equipment may generate a fallback indicator according to the following embodiments, and transmit the fallback indicator together with the HARQ-ACK through already allocated PUCCH resource. The fallback indicator may indicate either of two states. In the embodiment of the present invention, the first state will be referred to as a 'fallback mode request' and the second state will be referred to as a 'non-fallback request'. The 'fallback mode request' is a state for requesting retransmission of all CBGs of one TB, and the 'non-fallback request' is a state in which the retransmission of all CBGs is not required. According to a further embodiment of the present invention, the fallback indicator may be used as a TB-based HARQ-ACK. Specific embodiments of the TB-based HARQ-ACK will be described later.

According to an embodiment of the present invention, only one CBG may be configured for one TB in a user equipment configured to operate on CBG-based. That is, all CBs included in one TB may be configured as one CBG. In this case, the HARQ-ACK feedback transmitted by the user equipment may be determined according to the success of the TB-CRC. That is, if the TB-CRC check succeeds, the user equipment may transmit an ACK as a HARQ-ACK for the corresponding CBG. If the TB-CRC check fails, the user equipment may transmit a NACK as a HARQ-ACK for the corresponding CBG. In this case, whether to perform the fallback mode may be determined from ACK/NACK for the CBG without explicit transmission of the fallback indicator. More specifically, a user equipment expecting to operate in the fallback mode may transmit a NACK as a HARQ-ACK for the CBG. When the NACK is received from the user equipment as a HARQ-ACK, the base station may determine that the fallback mode is necessary and may retransmit all CBGs of the corresponding TB through the PDSCH.

According to another embodiment of the present invention, N CBGs may be configured for one TB in a user equipment configured to operate on CBG-based (where N is a natural number greater than 1). That is, one TB may be composed of two or more CBGs. In this case, a method of transmitting a fallback indicator and HARQ-ACK by the user equipment is as follows.

First, N CBGs (i.e., all CBGs) for one TB may be transmitted in the PDSCH. In this case, the user equipment may determine whether the reception of each CBG is successful through the CB-CRC, and may transmit HARQ-ACK for N CBGs through the previously configured or indicated PUCCH resource. When all CB-CRCs included in each CBG are successfully checked, the user equipment may transmit an ACK as a HARQ-ACK for the corresponding CBG. Otherwise, the user equipment may transmit NACK as a HARQ-ACK for the corresponding CBG. The HARQ-ACK for the CBG may be transmitted through HARQ-ACK in PUCCH or PUSCH transmitted by the user equipment. The base station may bundle the CBGs for which the NACK has been responded by the user equipment and retransmit it through the PDSCH. In this case, whether to perform the fallback mode may be determined from ACK/NACK for the CBG without explicit transmission of the fallback indicator. More specifically, a user equipment expecting to operate in the fallback mode may transmit a NACK as a HARQ-ACK for the CBG. When the NACK is received as a HARQ-ACK for all CBGs from the user equipment, the base station may determine that the fallback mode is necessary and may retransmit all CBGs of the corresponding TB through the PDSCH.

Table 4 shows HARQ-ACK feedback that can be transmitted by the user equipment and its operation when N=2. If the HARQ-ACK of the user equipment is [ACK ACK], the base station may determine that the user equipment successfully received the TB. If the HARQ-ACK of the user equipment is [ACK NACK], the base station may determine that the user equipment successfully received the first CBG but failed to receive the second CBG. Accordingly, the base station may retransmit the second CBG through the PDSCH. If the HARQ-ACK of the user equipment is [NACK ACK], the base station may determine that the user equipment successfully received the second CBG but failed to receive the first CBG. Accordingly, the base station may retransmit the first CBG through the PDSCH. If the HARQ-ACK of the user equipment is [NACK NACK], the base station may determine that the user equipment needs the fallback mode. Therefore, the base station may bundle the first CBG and the second CBG and retransmit it through the PDSCH.

TABLE 4

| HARQ-ACK feedback | Retransmitted CBG(s) |
|---|---|
| [ACK ACK] | No retransmitted CBG |
| [ACK NACK] | Retransmit CBG2 |
| [NACK ACK] | Retransmit CBG1 |
| [NACK NACK] | Retransmit CBG1 and CBG2 (fallback mode) |

Next, for a natural number M smaller than N, M CBGs (i.e., some CBGs) for one TB may be transmitted through the PDSCH. When some CBGs for one TB are transmitted, a method of transmitting a fallback indicator and HARQ-ACK by the user equipment is as follows. In each embodiment, the same or corresponding parts as those in the previous embodiment will be omitted from the duplicate description.

According to the first embodiment of the present invention, the user equipment may transmit M+1 bits combining ACK/NACK bits for each of the M CBGs and 1-bit fallback indicator through the HARQ-ACK resource. In this case, priority may be given to the 1-bit fallback indicator over the M-bit HARQ-ACK to determine whether to perform the fallback mode. The user equipment may determine whether reception of each transmitted CBG is successful through the CB-CRC. More specifically, since there is a possibility that up to N CBGs are transmitted to the user equipment, the user equipment is allocated a PUCCH resource capable of accommodating N HARQ-ACK bits. The user equipment may transmit 1 to N HARQ-ACK bits through the corresponding resource. The user equipment may transmit an (M+1)-bit feedback by bundling an 1-bit fallback indicator together with the M-bit HARQ-ACK in the HARQ-ACK resource. The base station may obtain the M-bit HARQ-ACK and 1-bit fallback indicator for the transmitted CBGs by receiving (M+1)-bit feedback through the PUCCH or PUCCH resources of the PUSCH transmitted from the user equipment.

Figure 13:
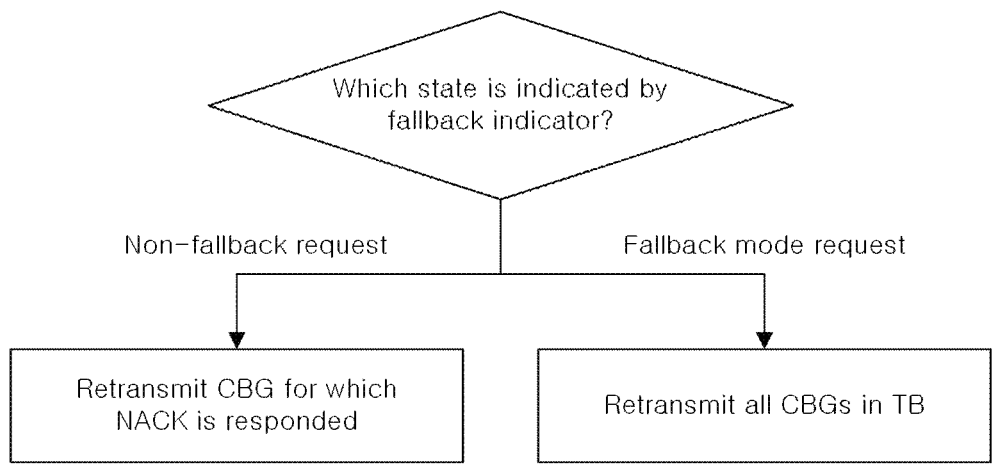
FIG. 13 illustrates an embodiment of a method of interpreting a received HARQ-ACK feedback and a fallback indicator.

FIG. 13 illustrates an embodiment of a method of interpreting a received HARQ-ACK feedback and a fallback indicator. Referring to FIG. 13, the base station may determine whether a fallback mode is required by assigning a priority to the 1-bit fallback indicator over the M-bit HARQ-ACK. If the fallback mode is required, the user equipment may transmit the fallback indicator to indicate the 'fallback mode request', otherwise, the user equipment may transmit the fallback indicator to indicate the 'non-fallback request'. The base station checks which state the received fallback indicator indicates. If the fallback indicator indicates the 'fallback mode request', the base station may perform the fallback mode with ignoring information such as ACK/NACK/DTX of the M-bit HARQ-ACK. That is, the base station may bundle all CBGs of the corresponding TB and retransmit it through the PDSCH. If the fallback indicator indicates the 'non-fallback request', the base station may perform CBG retransmission according to the information of the M-bit HARQ-ACK. That is, the base station may bundle the CBG(s) for which the NACK is responded and retransmit it through the PDSCH.

According to the second embodiment of the present invention, the user equipment may use the remaining (N−M) bit(s) except for M HARQ-ACK bit(s) among the N bits secured through the HARQ-ACK resource as a fallback indicator. In this case, priority may be given to the (N−M)-bit fallback indicator over the M-bit HARQ-ACK to determine whether to perform the fallback mode. The user equipment may transmit N bits combining ACK/NACK bits for each of the M CBGs and (N−M)-bit fallback indicator through the HARQ-ACK resource. That is, the user equipment may transmit an N-bit feedback by bundling the (N−M)-bit fallback indicator together with the M-bit HARQ-ACK in the HARQ-ACK resource. The base station may obtain the M-bit HARQ-ACK and (M−N)-bit fallback indicator for the transmitted CBGs by receiving the N-bit feedback through the PUCCH or PUSCH transmitted from the user equipment. The (M−N)-bit fallback indicator may indicate any one of a "fallback mode request" and a "non-fallback request" state. Since the (M−N)-bit fallback indicator may be composed of a plurality of bits, transmission reliability may be higher than that of the 1-bit fallback indicator.

Referring to FIG. 13, a method of interpreting a received HARQ-ACK feedback and a fallback indicator is described as follows. The base station may determine whether the fallback mode is required by assigning a priority to the (N−M)-bit fallback indicator over the M-bit HARQ-ACK. If the fallback mode is required, the user equipment may transmit the (N−M)-bit fallback indicator to indicate a 'fallback mode request', otherwise the user equipment may transmit the (N−M)-bit fallback indicator to indicate a 'non-fallback request'. The base station checks which state the received fallback indicator indicates. If the fallback indicator indicates the 'fallback mode request', the base station may perform the fallback mode. If the fallback indicator indicates the 'non-fallback request', the base station may perform CBG retransmission according to the information of the M-bit HARQ-ACK. Specific embodiments thereof are as described above in the first embodiment.

Table 5 shows a fallback indicator and HARQ-ACK feedback that can be transmitted by the user equipment and its operation when N=3 and M=2. In this case, one TB is composed of 3 CBGs, and the first CBG and the second CBG, which are some CBGs for the one TB, may be transmitted through the PDSCH.

TABLE 5

| Fallback indicator | HARQ-ACK feedback | Retransmitted CBG(s) |
|---|---|---|
| Fallback mode request | [ACK/NACK/DTX ACK/NACK/DTX] | Retransmit all CBGs (CBG1, CBG2 and CBG3) |
| Non-fallback request | [ACK ACK] | No retransmitted CBG |
| | [ACK NACK] | Retransmit CBG2 |
| | [NACK ACK] | Retransmit CBG1 |
| | [NACK NACK] | Retransmit CBG1 and CBG2 (fallback mode) |

Referring to Table 5, the base station may preferentially check the fallback indicator over the HARQ-ACK bits. If the fallback indicator indicates the 'fallback mode request', the base station may always perform the fallback mode. That is, the base station may retransmit all CBGs constituting the TB, that is, the first CBG, the second CBG and the third CBG through the PDSCH. If the fallback indicator indicates the 'non-fallback request', the base station may perform CBG retransmission according to the information of the 2-bit HARQ-ACK. That is, if the HARQ-ACK of the user equipment is [ACK ACK], the base station may determine that the user equipment successfully received two CBGs. If the HARQ-ACK of the user equipment is [ACK NACK], the base station may determine that the user equipment successfully received the first CBG but failed to receive the second CBG. Accordingly, the base station may retransmit the second CBG through the PDSCH. If the HARQ-ACK of the user equipment is [NACK ACK], the base station may determine that the user equipment successfully received the second CBG but failed to receive the first CBG. Accordingly, the base station may retransmit the first CBG through the PDSCH. If the HARQ-ACK of the user equipment is [NACK NACK], the base station may determine that the user equipment failed to receive the first CBG and the second CBG. Therefore, the base station may bundle the first CBG and the second CBG and retransmit it through the PDSCH.

According to the third embodiment of the present invention, the user equipment may transmit M+1 bits combining ACK/NACK bits for each of the M CBGs and 1-bit fallback indicator through the PUCCH resource. In this case, priority (or equivalent rank) may be given to M-bit HARQ-ACK over the 1-bit fallback indicator to determine whether to perform the fallback mode. A specific embodiment in which the user equipment transmits the 1-bit fallback indicator together with the M-bit HARQ-ACK through the HARQ-ACK resource and the base station receives the same is as described above in the first embodiment.

Figure 14:
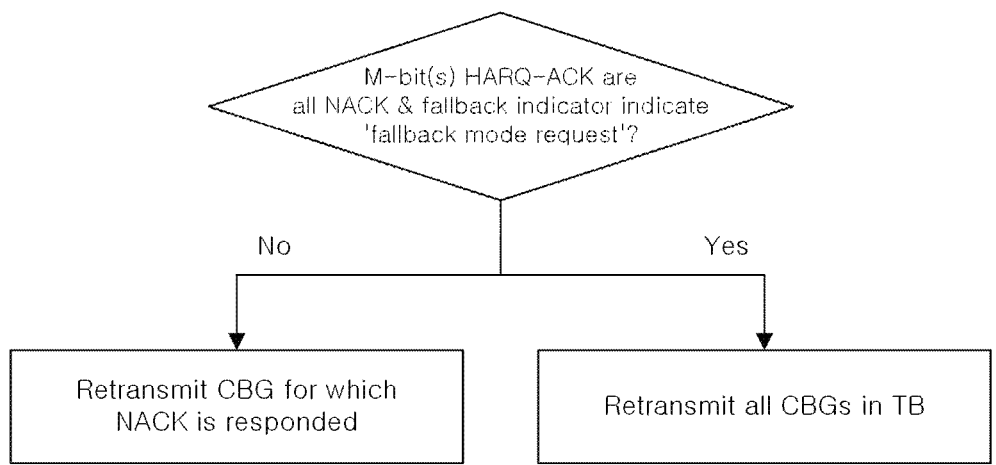
FIG. 14 illustrates another embodiment of a method of interpreting a received HARQ-ACK feedback and a fallback indicator.

FIG. 14 illustrates another embodiment of a method of interpreting a received HARQ-ACK feedback and a fallback indicator. Referring to FIG. 14, the base station may determine whether the fallback mode is required by assigning a priority (or an equivalent rank) to the M-bit HARQ-ACK over the 1-bit fallback indicator. That is, if the M-bit HARQ-ACK is all NACK, the base station may determine whether the fallback mode is necessary by checking the 1-bit fallback indicator. If the fallback mode is required, the user equipment may transmit the M-bit HARQ-ACK to indicate all NACK and the fallback indicator to indicate the 'fallback mode request'. In this case, the base station may bundle all CBGs of the corresponding TB and retransmit it through the PDSCH. Otherwise, the base station may determine that the fallback mode is not required. That is, if there is at least one ACK among the M-bit HARQ-ACK, the base station may not perform the fallback mode regardless of the value indicated by the fallback indicator. In this case, the base station may bundle the CBG(s) for which NACK is responded according to the information of the M-bit HARQ-ACK and retransmit it through the PDSCH.

According to the fourth embodiment of the present invention, the user equipment may use the remaining (N−M) bit(s) except for M HARQ-ACK bit(s) among the N bits secured through the HARQ-ACK resource as a fallback indicator. In this case, priority (or equivalent rank) may be given to the M-bit HARQ-ACK over the (N−M)-bit fallback indicator to determine whether to perform the fallback mode. A specific embodiment in which the user equipment transmits the (N−M)-bit fallback indicator together with the M-bit HARQ-ACK through the HARQ-ACK resource and the base station receives the same is as described above in the second embodiment.

Referring to FIG. 14, a method of interpreting a received HARQ-ACK feedback and a fallback indicator is described as follows. The base station may determine whether the fallback mode is required by assigning a priority (or equivalent rank) to the M-bit HARQ-ACK over the (N−M)-bit fallback indicator. That is, if the M-bit HARQ-ACK is all NACK, the base station may determine whether the fallback mode is necessary by checking the (N−M)-bit fallback indicator. If the fallback mode is required, the user equipment may transmit the M-bit HARQ-ACK to indicate all NACK and the (N−M)-bit fallback indicator to indicate the 'fallback mode request'. In this case, the base station may bundle all CBGs of the corresponding TB and retransmit it through the PDSCH. Otherwise, the base station may determine that the fallback mode is not required. That is, if there is at least one ACK among the M-bit HARQ-ACK, the base station may not perform the fallback mode regardless of the value indicated by the fallback indicator. In this case, the base station may bundle the CBG(s) for which NACK is responded according to the information of the M-bit HARQ-ACK and retransmit it through the PDSCH.

Table 6 shows a fallback indicator and HARQ-ACK feedback that can be transmitted by the user equipment and its operation when N=3 and M=2. In this case, one TB is composed of 3 CBGs, and the first CBG and the second CBG, which are some CBGs for the one TB, may be transmitted through the PDSCH.

TABLE 6

| HARQ-ACK feedback | Fallback indicator | Retransmitted CBG(s) |
|---|---|---|
| [ACK ACK] | 'fallback mode request' or 'non-fallback request' | No retransmitted CBG |
| [ACK NACK] | 'fallback mode request' or 'non-fallback request' | Retransmit CBG2 |
| [NACK ACK] | 'fallback mode request' or 'non-fallback request' | Retransmit CBG1 |
| [NACK NACK] | 'non-fallback request' | Retransmit CBG1 and CBG2 (fallback mode) |
|  | 'fallback mode request' | Retransmit all CBGs (CBG1, CBG2 and CBG3) (fallback mode) |

Referring to Table 6, if the 2-bit HARQ-ACK is [NACK NACK] and the fallback indicator indicates the 'fallback mode request', the base station may perform the fallback mode. That is, the base station may retransmit all CBGs constituting the TB, that is, the first CBG, the second CBG and the third CBG through the PDSCH. In all other cases, the base station may determine that the fallback mode is not required. In this case, the base station may perform CBG retransmission according to the information of 2-bit HARQ-ACK. That is, if the HARQ-ACK of the user equipment is [ACK ACK], the base station may determine, regardless of the value of the fallback indicator, that the user equipment has successfully received two CBGs. If the HARQ-ACK of the user equipment is [ACK NACK], the base station may determine, regardless of the value of the fallback indicator, that the user equipment successfully received the first CBG but failed to receive the second CBG. Accordingly, the base station may retransmit the second CBG through the PDSCH. If the HARQ-ACK of the user equipment is [NACK ACK], the base station may determine, regardless of the value of the fallback indicator, that the user equipment successfully received the second CBG but failed to receive the first CBG. Accordingly, the base station may retransmit the first CBG through the PDSCH. If the HARQ-ACK of the user equipment is [NACK NACK] and the fallback indicator indicates the 'non-fallback request', the base station may determine that the user equipment has failed to receive the first CBG and the second CBG. Therefore, the base station may bundle the first CBG and the second CBG and retransmit it through the PDSCH.

According to the fifth embodiment of the present invention, retransmission of TB may be performed through retransmission of higher layer without explicit fallback indicator. That is, the fallback mode for recovering the wrong transmission of the physical layer may not be used. According to an embodiment, there may be no explicit fallback indicator resource and only HARQ-ACK resources for CBGs may exist for the base station and the user equipment. In this case, if the CBG(s) that need to be retransmitted to the user equipment are not included in the PDSCH transmission, regardless of the success of the CB-CRC and the TB-CRC of the PDSCH transmission, the user equipment may transmit ACK as a HARQ-ACK for all CBGs of the PDSCH. As such, the user equipment recognizes the reception failure of the corresponding TB but may prevent unnecessary retransmission by transmitting ACK for all CBGs. The TB which is failed to be received may be recovered through retransmission in the upper layer, not retransmission through the HARQ-ACK transmission of the physical layer.

Figure 15:
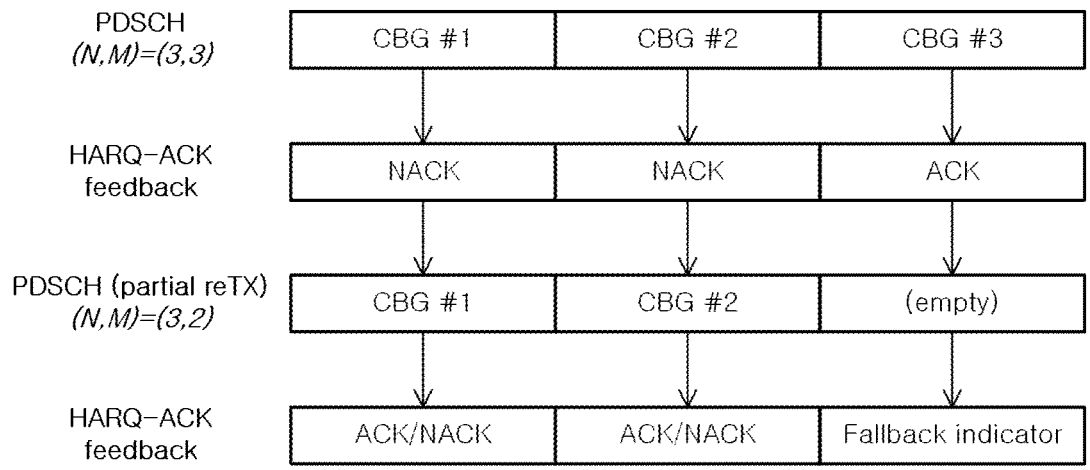
FIG. 15 illustrates an example in which a use equipment transmits a HARQ-ACK and a fallback indicator for CBG(s) according to the above-described embodiments.

FIG. 15 illustrates an example in which a user equipment transmits a HARQ-ACK and a fallback indicator for CBG(s) according to the above-described embodiments. According to the embodiment of FIG. 15, the base station may configure 3 CBGs in one TB (i.e., N=3), and thus, the user equipment may be allocated a PUCCH resource capable of transmitting 3-bit HARQ-ACK. In the first PDSCH transmission, the base station transmits CBG #1, CBG #2 and CBG #3. The user equipment successfully receives CBG #3 among 3 CBGs, and fails to receive CBG #1 and CBG #2. Accordingly, the user equipment may transmit [NACK NACK ACK] as a 3-bit HARQ-ACK for the first PDSCH transmission. In the second PDSCH transmission, the base station may retransmit only CBG #1 and CBG #2, except CBG #3 for which ACK has already received from the user equipment. The user equipment may transmit 3-bit HARQ-ACK in response to the second PDSCH transmission. In this case, the user equipment may use the first two bits of the 3-bit HARQ-ACK to indicate whether the retransmitted CBG #1 and CBG #2 are received, and use the last one bit corresponding to the CBG #3 as a fallback indicator.

FIGS. 16 to 19 illustrate additional embodiments in which a user equipment transmits a HARQ-ACK feedback and a fallback indicator for CBG(s). According to the additional embodiment of the present invention, the length of the HARQ-ACK payload transmitted by the user equipment may be configured based on the maximum number of CBGs configured by the RRC signal. Therefore, N CBG-based HARQ-ACK bits may be configured to the user equipment. Hereinafter, in the embodiments of FIGS. 16 to 19, the maximum number of CBGs configured by the RRC signal is N, and the number of CBG(s) included in the TB transmitted by the base station is M. In this case, the M bit(s) among the N-bit HARQ-ACK may be CBG-based HARQ-ACK (i.e., M-bit CBG-based HARQ-ACK) indicating whether the reception of each CBG is successful. In addition, when M is smaller than N, the remaining N−M bit(s) among the N-bit HARQ-ACK may be a fallback indicator.

In an embodiment of the present invention, the HARQ-ACK indicating whether the user equipment has successfully received each CBG transmitted through the PDSCH is referred to as a CBG-based HARQ-ACK or a CBG-level HARQ-ACK. In addition, as described above, in the embodiment of the present invention, the fallback indicator may also be referred to as a TB-based HARQ-ACK. In the embodiment of the present invention, the HARQ-ACK indicating whether the user equipment has successfully received each TB transmitted through the PDSCH is referred to as a TB-based HARQ-ACK or a TB-level HARQ-ACK.

According to an embodiment of the present invention, the (N−M)-bit fallback indicator may be configured in various ways. According to an embodiment, the (N−M)-bit fallback indicator may be configured as all ACK or all NACK. According to another embodiment, the (N−M)-bit fallback indicator may be configured by repeating the 1-bit TB-based HARQ-ACK with N−M bit(s). According to yet another embodiment, the (N-M)-bit fallback indicator may be configured based on the value of the M-bit CBG-based HARQ- ACK. If M is an aliquot of N, the (N−M)-bit fallback indicator may be configured by repeating the value of the M-bit CBG-based HARQ-ACK.

Table 7 shows an embodiment of configuring 4-bit HARQ-ACK feedback when N=4 and M=1~4. First, when M=1, 4-bit HARQ-ACK [b0 b0 b0 b0] may be configured by repeating HARQ-ACK b0 for CBG #0 four times. Next, when M=2, 4-bit HARQ-ACK [b0 b1 b0 b1] may be configured by repeating HARQ-ACK b0 for CBG #0 and HARQ-ACK b1 for CBG #1 twice. Next, when M=3, 4-bit HARQ-ACK may be configured to be [b0 b1 b2 x] by using HARQ-ACK b0 for CBG #0, HARQ-ACK b1 for CBG #1, HARQ-ACK b2 for CBG #2, and x determined by the combination of b0, b1 and b2. According to an embodiment, x may be obtained through an XOR operation of b0, b1, and b2. According to another embodiment, x may be determined by a value of b0+b1+b2 (mod 2). Table 7 shows an embodiment of configuring N-bit HARQ-ACK feedback, and N-bit HARQ-ACK feedback may be configured by a combination of at least one of the above mentioned embodiments.

TABLE 7

| M | $1^{st}$ HARQ-ACK bit | $2^{nd}$ HARQ-ACK bit | $3^{rd}$ HARQ-ACK bit | $4^{th}$ HARQ-ACK bit |
|---|---|---|---|---|
| 1 | b0 | b0 | b0 | b0 |
| 2 | b0 | b1 | b0 | b1 |
| 3 | b0 | b1 | b2 | X = b0 + b1 + b2 (mod 2) |
| 4 | b0 | b1 | b2 | b3 |

According to still another embodiment of the present invention, the user equipment may be configured in a transmission mode in which two TBs can be transmitted in one PDSCH. In this case, the user equipment may transmit HARQ-ACK feedback according to the length of the CBG-based HARQ-ACK payload for two TBs. If each TB is configured with the maximum number of CBGs and the user equipment receives a PDSCH scheduling only one TB, the user equipment may generate HARQ-ACK having a length of the CBG-based HARQ-ACK payload for two TBs by repeating CBG-based HARQ-ACK for one TB.

For example, the user equipment may be configured in a transmission mode in which up to two TBs can be transmitted, and one TB may consist of up to 4 CBGs. If only one TB is scheduled for the user equipment, 8-bit HARQ-ACKs [b0 b1 b2 b3 b0 b1 b2 b3] may be configured by repeating twice the CBG-based HARQ-ACKs [b0 b1 b2 b3] for the 4 CBGs included in the TB. On the other hand, if two TBs are scheduled to the user equipment, 8-bit HARQ-ACKs [b0 b1 b2 b3 c0 c1 c2 c3] may be configured by combining HARQ-ACKs [b0 b1 b2 b3] for the 4 CBGs included in the first TB and HARQ-ACKs [c0 c1 c2 c3] for the 4 CBGs included in the second TB. The user equipment may transmit the configured HARQ-ACK to the base station.

Meanwhile, even in a transmission mode in which two TBs can be transmitted in one PDSCH, the number M of CBGs included in the TBs transmitted by the base station may be less than N. In this case, a method of configuring the remaining N−M bit(s) except for the M bit(s) among the N-bit HARQ-ACKs is the same as the above-described embodiment.

Meanwhile, according to an additional embodiment of the present invention, the CBG-based HARQ-ACK(s) for the CBG(s) and the fallback indicator (or TB-based HARQ-ACK) may be transmitted through different PUCCH resources. FIGS. 16 to 19 illustrate embodiments in which a user equipment transmits a CBG-based HARQ-ACK(s) and a fallback indicator through different HARQ-ACK resources.

Figure 16:
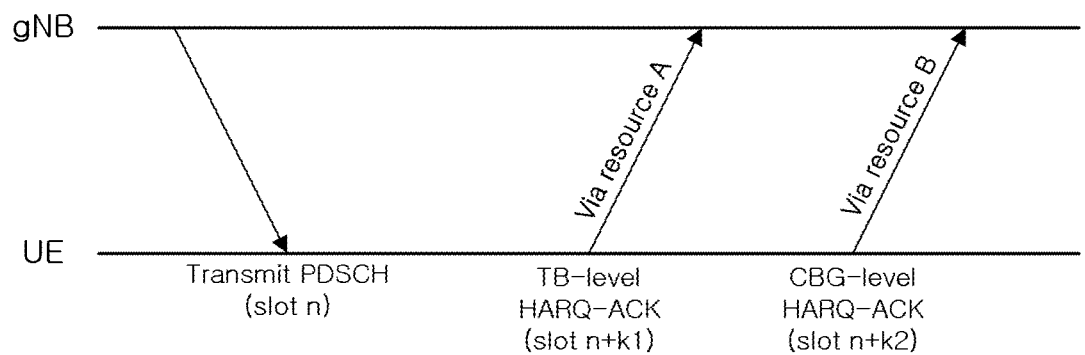
FIGS. 16 to 19 illustrate additional embodiments in which a user equipment transmits a HARQ-ACK and a fallback indicator for CBG(s).

First, FIG. 16 illustrates an embodiment of allocating different HARQ-ACK resources to transmission of CBG-based HARQ-ACK(s) and transmission of a fallback indicator (or TB-based HARQ-ACK). Referring to FIG. 16, the base station may allocate two HARQ-ACK resources at different times to the user equipment. Two different HARQ-ACK resources may be used for transmission of the CBG-based HARQ-ACK(s) and the fallback indicator (or TB-based HARQ-ACK), respectively. According to an embodiment of the present invention, the resource for transmission of the fallback indicator (or TB-based HARQ-ACK) may be configured to precede the resource for transmission of the CBG-based HARQ-ACK(s). For example, the user equipment may be allocated slot n+k1 (i.e., resource A) and slot n+k2 (i.e., resource B) as HARQ-ACK resources for the PDSCH received in slot n (where k1<k2). Among the above resources, the resource A in slot n+k1 may be a resource for transmission of a fallback indicator (or TB-based HARQ-ACK), and the resource B in slot n+k2 may be a resource for transmission of CBG-based HARQ-ACK(s). Meanwhile, the length of the CBG-based HARQ-ACK payload transmitted through the resource B may be configured based on any one of the number of transmitted CBGs, the maximum number of CBGs configured by RRC signal, or the number of CBGs that can be included in the corresponding TB.

Figure 17:
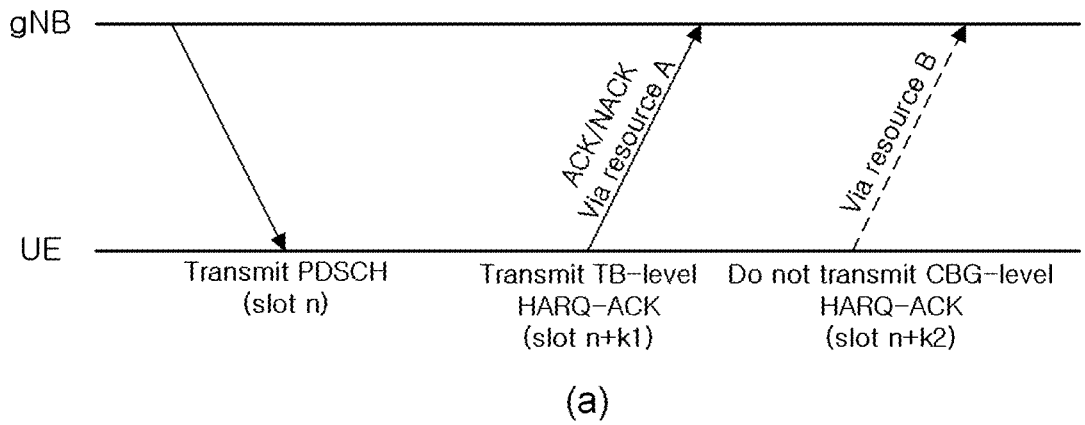
Figure 17:
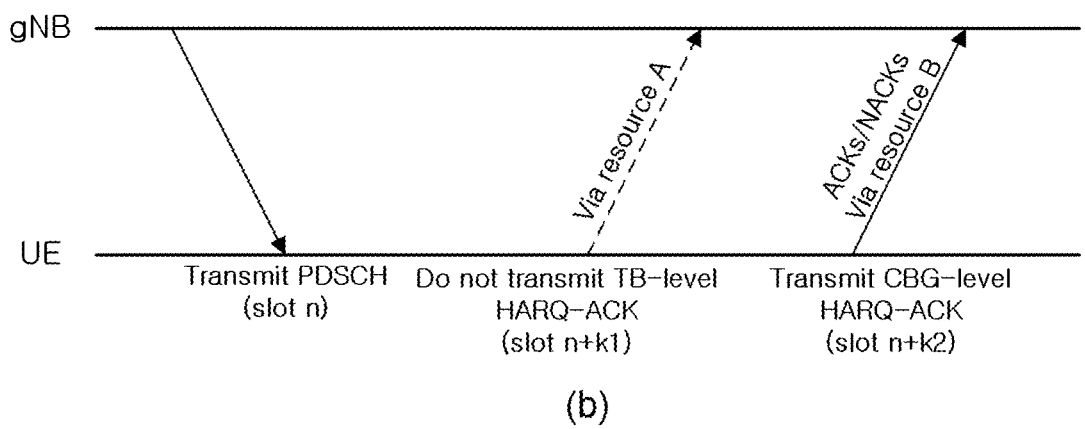

FIG. 17 illustrates an embodiment of transmitting CBG-based HARQ-ACK(s) and a fallback indicator (or TB-based HARQ-ACK) through different HARQ-ACK resources. According to the embodiment of FIG. 17, the user equipment may selectively transmit only one of CBG-based HARQ-ACK(s) and TB-based HARQ-ACK. More specifically, if the HARQ-ACK(s) for the CBG(s) are all ACK or all NACK in the situation that the user equipment configured for CBG-based communication transmits the HARQ-ACK to the base station, the user equipment may transmit only the TB-based HARQ-ACK and may not transmit the CBG-based HARQ-ACK(s). On the other hand, if the HARQ-ACK(s) for the CBG(s) include at least one ACK and at least one NACK, the user equipment may transmit only the CBG-based HARQ-ACK(s) and may not transmit the TB-based HARQ-ACK.

The user equipment may select one of two different HARQ-ACK resources according to the type of HARQ-ACK to be transmitted among the CBG-based HARQ-ACK(s) and the fallback indicator (that is, TB-based HARQ-ACK), and transmit the corresponding HARQ-ACK through the selected resource. As shown in FIG. 17 (a), when the TB-based HARQ-ACK is to be transmitted, the user equipment may transmit the TB-based HARQ-ACK through the slot n+k1. In this case, the user equipment may not transmit the CBG-based HARQ-ACK(s) through the slot n+k2. According to an embodiment, the user equipment may transmit an ACK as the TB-based HARQ-ACK when the TB-CRC is successfully checked. Meanwhile, the user equipment may transmit a NACK as the TB-based HARQ-ACK when all the CB-CRCs have been successfully checked but a TB-CRC error occurs. In addition, the user equipment may transmit a NACK as the TB-based HARQ-ACK even when reception of all CBGs fails (that is, when all CB-CRCs have failed). As shown in FIG. 17 (b), when the CBG-based HARQ-ACK(s) are to be transmitted, the user equipment may transmit the CBG-based HARQ-ACK(s) through the slot n+k2. In this case, the user equipment may not transmit the TB-based HARQ-ACK through the slot n+k1.

In the embodiment of FIG. 17, the operation of the base station is as follows. The base station may expect the TB-based HARQ-ACK transmission of the user equipment through the resource A of the slot n+k1. If the TB-based HARQ-ACK of the user equipment is successfully received through the resource A and the HARQ-ACK is ACK, the base station determines that the user equipment has successfully received the TB. If the TB-based HARQ-ACK of the user equipment is successfully received through the resource A and the HARQ-ACK is NACK, the base station determines that the user equipment has failed to receive all CBGs (or all CBs). Thus, the base station may retransmit all CBGs (or all CBs). When the TB-based HARQ-ACK of the user equipment is successfully received through the resource A, the base station may determine that the user equipment does not use the resource B (that is, slot n+k2). Therefore, when the TB-based HARQ-ACK of the user equipment is transmitted through the resource A, the resource B may be used for other purposes. For example, the resource B may be used for HARQ-ACK transmission of another user. On the other hand, if the TB-based HARQ-ACK of the user equipment is not successfully received through the resource A, the base station may determine that the user equipment has transmitted the CBG-based HARQ-ACK(s). Therefore, the base station may receive the CBG-based HARQ-ACK(s) of the user equipment through the resource B of the slot n+k2. The base station may perform, based on the CBG-based HARQ-ACK(s), retransmission of the CBG(s) that the user equipment failed to receive.

Figure 18:
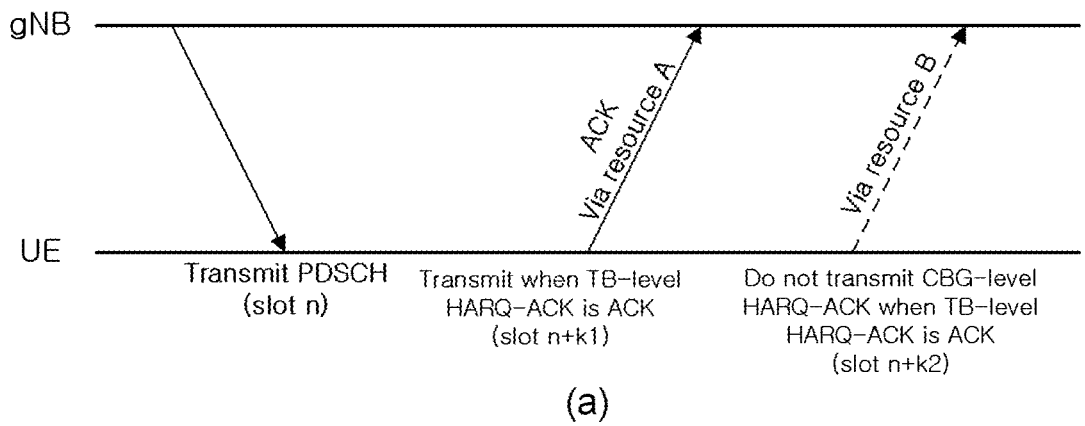
Figure 18:
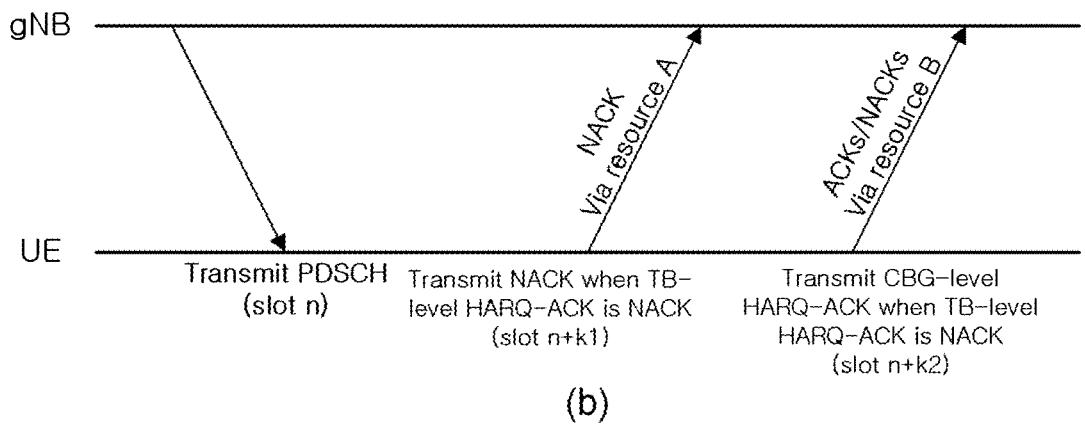

FIG. 18 illustrates another embodiment of transmitting CBG-based HARQ-ACK(s) and a fallback indicator (or TB-based HARQ-ACK) through different HARQ-ACK resources. According to the embodiment of FIG. 18, the user equipment may transmit only the TB-based HARQ-ACK or transmit both the CBG-based HARQ-ACK(s) and the TB-based HARQ-ACK according to whether all CBGs are successfully received.

As shown in FIG. 18(a), when the user equipment successfully receives all CBGs and the TB-CRC is successfully checked, the user equipment may transmit an ACK as the TB-based HARQ-ACK through the slot n+k1. In this case, the user equipment may not transmit the CBG-based HARQ-ACK(s) through the slot n+k2. However, as shown in FIG. 18(b), when the user equipment fails to receive at least one CBG or a TB-CRC error occurs, the user equipment may transmit a NACK as the TB-based HARQ-ACK through slot n+k1. In this case, the user equipment may transmit the CBG-based HARQ-ACK(s) through the slot n+k2.

In the embodiment of FIG. 18, the operation of the base station is as follows. The base station always expects the TB-based HARQ-ACK transmission of the user equipment through the resource A of the slot n+k1. If the TB-based HARQ-ACK of the user equipment received through the resource A is ACK, the base station determines that the user equipment has successfully received the TB. In this case, the base station may determine that the user equipment does not use the resource B (that is, slot n+k2). Therefore, when the TB-based HARQ-ACK of the user equipment is transmitted through the resource A, the resource B may be used for other purposes. For example, the resource B may be used for HARQ-ACK transmission of another user. If the TB-based HARQ-ACK of the user equipment is successfully received through the resource A and the HARQ-ACK is NACK (or DTX), the base station determines that the user equipment has failed to receive at least one CBG. In this case, the base station receives the CBG-based HARQ-ACK(s) of the user equipment through the resource B. The base station may perform, based on the CBG-based HARQ-ACK(s), retransmission of the CBG(s) that the user equipment failed to receive.

According to another embodiment of the present invention, even when the TB-based HARQ-ACK is ACK, the TB-based HARQ-ACK and the CBG-based HARQ-ACK(s) of the user equipment may be transmitted together. The base station may receive the TB-based HARQ-ACK and the CBG-based HARQ-ACK(s) through the resource A and the resource B, respectively, and determine the success of the reception of the user equipment by using the received HARQ-ACKs. For example, if the TB-based HARQ-ACK is ACK and the CBG-based HARQ ACK(s) are all ACK, the base station determines that the user equipment has successfully received the TB. However, if the TB-based HARQ-ACK is ACK and the CBG-based HARQ ACK(s) are not all ACK, then the base station performs CBG-based retransmission based on the CBG-based HARQ-ACK(s). As another method, if the TB-based HARQ-ACK is ACK, the base station may determine that the user equipment has successfully received the TB regardless of the value of the CBG-based HARQ-ACK.

If the CBG-based HARQ-ACK(s) is not successfully received through the resource B even though the TB-based HARQ-ACK is NACK, the base station may determine that the user equipment has failed to receive all the CBGs and may retransmit all the CBGs. According to another embodiment, if the CBG-based HARQ-ACK(s) are not successfully received through the resource B even though the TB-based HARQ-ACK is NACK, the base station may regard that an ACK-to-NACK error has occurred in the TB-based HARQ-ACK and may determine that the TB has been successfully received by the user equipment.

In addition, if the TB-based HARQ-ACK is NACK and the CBG-based HARQ-ACK(s) are all ACK, the base station may retransmit all CBGs on the assumption that the user equipment has failed to receive all the CBGs. According to another embodiment, if the TB-based HARQ-ACK is NACK and the CBG-based HARQ-ACK(s) are all ACK, the base station may regard that an ACK-to-NACK error has occurred in the TB-based HARQ-ACK and may determine that the TB has been successfully received by the user equipment.

Figure 19:
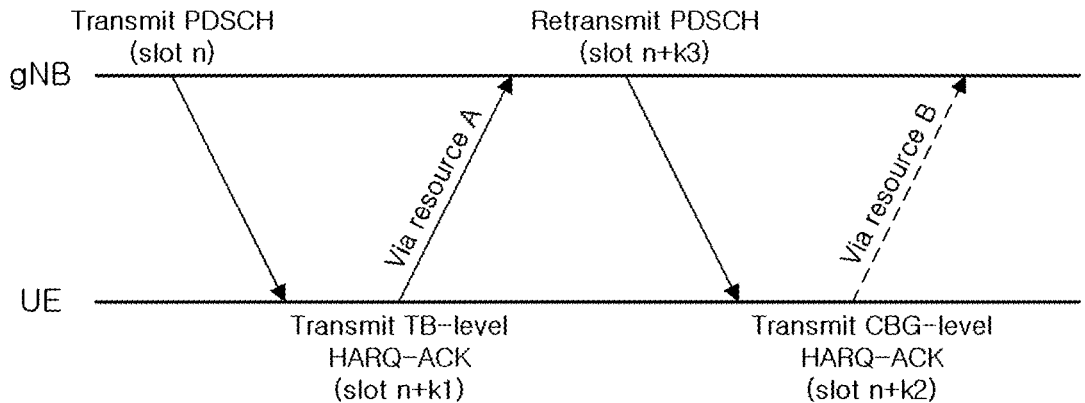

FIG. 19 illustrates an embodiment in which a user equipment receives a PDCCH scheduling a retransmission for a corresponding TB between transmission of the TB-based HARQ-ACK and transmission of the CBG-based HARQ-ACK(s). More specifically, when the user equipment is to transmit the TB-based HARQ-ACK through the resource A of the slot n+k1 and the CBG-based HARQ-ACK(s) through the resource B of the slot n+k2, a PDCCH scheduling a retransmission of the corresponding TB may be received through slot n+k3 prior to the slot n+k2 (i.e., k3<k2). In this case, the user equipment may not transmit the CBG-based HARQ-ACK(s) through the slot n+k2. As such, when the base station transmits the PDCCH scheduling the retransmission of the TB before slot n+k2 for transmitting the CBG-based HARQ-ACK(s), the resource B of the slot n+k2 may be used for other purposes. For example, the resource B may be used for HARQ-ACK transmission of another user.

According to an embodiment of the present invention, the base station may indicate the user equipment with information about resource A of slot n+k1 and resource B of slot n+k2 in various ways. According to an embodiment, the base station may independently indicate an offset k1 and an offset k2 through the DCI. According to another embodiment, the base station may inform or fix the difference value between the offset k1 and the offset k2 to the user equipment in advance, and indicate only one of the offset k1 or the offset k2 through the DCI. The user equipment may obtain the values of the offset k1 and the offset k2 by using any one offset indicated through the DCI and a previously known (or fixed) offset difference value. In this case, the smaller value among the obtained offsets may be used as an offset for transmission of the TB-based HARQ-ACK, and the larger value among the offsets may be used as an offset for transmission of the CBG-based HARQ-ACK(s).

If a HARQ-ACK multiplexing is configured for the user equipment, the TB-based HARQ-ACK transmitted through the resource A of the slot n+k1 in the above embodiment may be multiplexed with TB-based HARQ-ACKs for one or more TBs. In addition, the CBG-based HARQ-ACK(s) transmitted through the resource B of the slot n+k2 in the above embodiment may be multiplexed with CBG-based HARQ-ACKs for one or more TBs. According to an embodiment, the CBG-based HARQ-ACK(s) transmitted through the resource B may be generated by multiplexing the CBG-based HARQ-ACK bits for the TB in which NACK is transmitted as the TB-based HARQ-ACK. That is, with regard to the TB for which ACK is transmitted as the TB-based HARQ-ACK transmitted through the resource A, CBG-based HARQ-ACK transmission is not performed through the resource B.

Meanwhile, in the above-described embodiments, resources have been described on a slot basis, but the present invention is not limited thereto. That is, in a situation such as short-PUCCH transmission, the slot of the above-described embodiments may be replaced with an OFDM symbol. In this case, the OFDM symbol n+k1 and/or the ODFM symbol n+k2 may be an OFDM symbol at which the PUCCH starts.

In addition, in the above embodiments, it is assumed that k1<k2. However, according to another embodiment of the present invention, offset k1 and offset k2 may be set to the same value (that is, k=k1=k2). That is, HARQ-ACK resources of the same time may be allocated for transmission of the TB-based HARQ-ACK and transmission of the CBG-based HARQ-ACK(s). When the user equipment is configured in a transmission mode in which two TBs can be transmitted in one PDSCH, the user equipment may perform HARQ-ACK transmission by selecting one of resource A and resource B configured in the same slot n+k. According to an embodiment, if HARQ-ACKs for two TBs transmitted through one PDSCH are all ACK, the user equipment may transmit [ACK ACK] as the TB-based HARQ-ACKs through the resource A of the slot n+k. In this case, the user equipment may not use the resource B of the slot n+k. If the HARQ-ACKs for two TBs transmitted through one PDSCH are not all ACK, the user equipment may transmit CBG-based HARQ-ACKs for the CBGs included in the two TBs through the resource B of the slot n+k. In this case, the user equipment may not use the resource A of the slot n+k.

According to a further embodiment of the present invention, when CBG-based HARQ-ACKs for multiple TBs are multiplexed, a compressed CBG-based HARQ-ACK may be used to reduce the payload length. That is, the compressed CBG-based HARQ-ACK may be used by reducing the length of the payload in the original CBG-based HARQ-ACK. The user equipment generates the compressed CBG-based HARQ-ACK from the original CBG-based HARQ-ACK according to a predetermined rule, and transmits the compressed CBG-based HARQ-ACK to the base station.

The first embodiment of generating the compressed CBG-based HARQ-ACK is as follows. The base station may select the states expected to occur frequently among the entire CBG-based HARQ-ACK states for one TB so that the user equipment may signal this. Here, the CBG-based HARQ-ACK state refers to a combination of bits that the original CBG-based HARQ-ACK may have. That is, 4-bit CBG-based HARQ-ACK may have a total of 16 states, that is, states of [ACK ACK ACK ACK] to [NACK NACK NACK NACK]. The base station may select P states among the original CBG-based HARQ-ACK states as described above. That is, when the total number of TBs transmitted through the PDSCH is I, the original CBG-based HARQ-ACK state of the i-th TB may be mapped to the $p_i$-th state among P states. In this case, the user equipment multiplexes the mapped $p_i$ for a total of I TB(s) through the following equation to obtain U, and converts the U to a binary value to obtain the compressed CBG-based HARQ-ACK(s) for the entire TB (s).

$$U=\Sigma_{i=0}^{I-1} P^i \times p_i$$

The base station receives the compressed CBG-based HARQ-ACK(s) from the user equipment, and converts the compressed CBG-based HARQ-ACK(s) to a P-notation value to obtain the mapped CBG-based HARQ-ACK state information $p_i$ of each TB.

According to an embodiment, the value of P and information of P CBG-based HARQ-ACK states selected by the base station may be configured through an RRC signal transmitted by the base station to the user equipment. According to another embodiment, the value of P may be determined based on at least one of the capacity of the PUCCH that can be transmitted by the user equipment and the number of TBs (or the number of PDSCHs) to be transmitted by the user equipment. In addition, in order to determine P CBG-based HARQ-ACK states, entire CBG-based HARQ-ACK states may be prearranged according to a preset order. According to an embodiment, the preset order may be determined based on a frequency of occurrence of each state among the entire CBG-based HARQ-ACK states. For example, a CBG-based HARQ-ACK state indicating a reception error of adjacent CBGs may be determined in a higher order than a CBG-based HARQ-ACK state indicating a reception error of non-adjacent CBGs. P states among the entire CBG-based HARQ-ACK states may be selected based on the prearranged order.

Table 8 shows an embodiment of determining P CBG-based HARQ-ACK states. In the embodiment of Table 8, P states are determined from a total of 16 original CBG-based HARQ-ACK states based on 4 CBG-based HARQ-ACK bits. Here, information of selected P CBG-based HARQ-ACK states when P is 2, 4, 6, 9, 11, 14 or 16 is illustrated.

TABLE 8

| State | Original CBG-level HARQ-ACK | | | | P state | | | | | | |
|---|---|---|---|---|---|---|---|---|---|---|---|
| | o1 | o2 | o3 | o4 | 2 | 4 | 6 | 9 | 11 | 14 | 16 |
| All CBG NACK | 0 | 0 | 0 | 0 | 0 | 0 | 0 | 0 | 0 | 0 | 0 |
| All CBG ACK | 1 | 1 | 1 | 1 | 1 | 1 | 1 | 1 | 1 | 1 | 1 |
| CBG 1 error | 0 | 1 | 1 | 1 | | 2 | 2 | 2 | 2 | 2 | 2 |
| CBG 2 error | 1 | 0 | 1 | 1 | | 3 | 3 | 3 | 3 | 3 | 3 |
| CBG 3 error | 1 | 1 | 0 | 1 | | 4 | 4 | 4 | 4 | 4 | 4 |
| CBG 4 error | 1 | 1 | 1 | 0 | | 5 | 5 | 5 | 5 | 5 | 5 |
| CBG 1&2 error | 0 | 0 | 1 | 1 | 2 | 6 | 6 | 6 | 6 | 6 | 6 |
| CBG 2&3 error | 1 | 0 | 0 | 1 | | | 7 | 7 | 7 | 7 | 7 |
| CBG 3&4 error | 1 | 1 | 0 | 0 | 3 | 8 | 8 | 8 | 8 | 8 | 8 |
| CBG 1&2&3 error | 0 | 0 | 0 | 1 | | | | 9 | 9 | 9 | 9 |
| CBG 2&3&4 error | 1 | 0 | 0 | 0 | | | | 10 | 10 | 10 | 10 |
| CBG 1&3 error | 0 | 1 | 0 | 1 | | | | | 11 | 11 | 11 |
| CBG 2&4 error | 1 | 0 | 1 | 0 | | | | | | 12 | 12 |
| CBG 1&4 error | 0 | 1 | 1 | 0 | | | | | | 13 | 13 |

Each of the selected P states may be indexed into a $p_i$-th state based on the prearranged order. As described above, the original CBG-based HARQ-ACK state of each TB may be mapped to the $p_i$-th state among the P states. When the number of original CBG-based HARQ-ACK states is N, an N to P mapping may be performed. According to an embodiment of the present invention, the original CBG-based HARQ-ACK state may be mapped to the $p_i$-th state based on the NACK bit of the original state. That is, a bit that is NACK in the original CBG-based HARQ-ACK state shall be NACK even in the mapped $p_i$-th CBG-based HARQ-ACK state. For example, when the second bit is NACK (i.e., 0) in the original CBG-based HARQ-ACK state, the state to which the original state can be mapped may be one of states in which the second bit is NACK, that is, [0000], [0001], [0010], [0011], [1000], [1001], [1010] and [1011].

The second embodiment of generating the compressed CBG-based HARQ-ACK is as follows. The maximum number of CBGs configured by the RRC signal is N, and the number of CBG(s) included in the TB transmitted by the base station is M. In this case, the M bit(s) among the N-bit HARQ-ACK may be the CBG-based HARQ-ACK (i.e., M-bit CBG-based HARQ-ACK) indicating whether the reception of each CBG is successful. The base station may configure the length of the original CBG-based HARQ-ACK payload for one TB based on the maximum number of CBGs configured by the RRC signal. That is, the original CBG-based HARQ-ACK for one TB may consist of N bits. In this case, the original CBG-based HARQ-ACK may be represented by $[b_0, b_1, \ldots, b_{M-1}, X_0, X_1, \ldots, X_{N-M-1}]$. That is, the original CBG-based HARQ-ACK may consist of M-bit CBG-based HARQ-ACK $[b_0, b_1, \ldots, b_{M-1}]$ and the remaining N-M bit(s) $[X_0, X_1, \ldots, X_{N-M-1}]$. In this case, $X_m$ may be configured with a fixed value (e.g., ACK or NACK) or may be configured based on the value of M-bit CBG-based HARQ-ACK. Specific method thereof is the same as the above-described embodiment.

In order to reduce the length of the HARQ-ACK payload, the base station may indicate the user equipment to use the compressed CBG-based HARQ-ACK. The base station may signal the indication information through an RRC signal or a PDCCH. When the user equipment receives information indicating the use of the compressed CBG-based HARQ-ACK, the user equipment may reduce the original CBG-based HARQ-ACK composed of N bits into a compressed CBG-based HARQ-ACK composed of L bits.

If L is greater than or equal to M, the compressed CBG-based HARQ-ACK may consist of $[b_0, b_1, \ldots, b_{M-1}, Y_0, Y_1, \ldots, Y_{L-M-1}]$. That is, the compressed CBG-based HARQ-ACK may consist of M-bit CBG-based HARQ-ACK $[b_0, b_1, \ldots, b_{M-1}]$ and the remaining L-M bit(s) $[Y_1, \ldots, Y_{L-M-1}]$. Therefore, the M-bit CBG-based HARQ-ACK is included in the compressed CBG-based HARQ-ACK as it is, and only the remaining bit(s) is reduced from N-M to L-M. That is, M-bit CBG-based HARQ-ACK may be preserved in the compressed CBG-based HARQ-ACK. In this case, $Y_m$ may be configured with a fixed value (e.g., ACK or NACK) or may be configured based on the value of M-bit CBG-based HARQ-ACK.

If L is less than M, the compressed CBG-based HARQ-ACK may consist of $[a_0, a_1, \ldots, a_{M-1}]$. In this case, the compressed CBG-based HARQ-ACK may be generated by combining at least a part of M-bit CBG-based HARQ-ACK $[b_0, b_1, \ldots, b_{M-1}]$ except for the remaining N-M bit(s) in the original CBG-based HARQ-ACK. According to an embodiment, in the compressed CBG-based HARQ-ACK $[a_0, a_1, \ldots, a_{M-1}]$, $a_k$ of k=0 to L-2 is 1 (i.e., ACK) when $b_{k*w}, b_{k*w+1}, \ldots, b_{(k+1)*w-1}$ are all 1 (i.e., ACK), and otherwise 0 (i.e., NACK). Also, $a_k$ of k=L-1 is 1 (i.e., ACK) when $b_{k*w}, b_{k*w+1}, \ldots, b_{M-1}$ are all 1 (i.e., ACK), otherwise 0 (i.e., NACK). Here, w=floor (M/L).

For example, it can be assumed that N=8 and M=4, and the remaining N-M bits (i.e., 4 bits) always transmit 0 (i.e., NACK). In addition, it can be assumed that the original CBG-based HARQ-ACK is [10110000]. When generating 4 bits of compressed CBG-based HARQ-ACK from the original CBG-based HARQ-ACK, the compressed CBG-based HARQ-ACK becomes [1011]. That is, 4 bits CBG-based HARQ-ACK [1011] can be preserved in the compressed CBG-based HARQ-ACK even if the length of the payload is reduced to 4 bits. On the other hand, when generating 2 bits of compressed CBG-based HARQ-ACK from the original CBG-based HARQ-ACK, the compressed CBG-based HARQ-ACK becomes [01]. In this case, 4 bits CBG-based HARQ-ACK is not preserved in the compressed CBG-based HARQ-ACK. The compressed CBG-based HARQ-ACK [01] may be generated by bundling 4 bits CBG-based HARQ-ACK [1011] by 2 bits.

In the following embodiments, a transmission situation in units of a component carrier is assumed. In an embodiment of the present invention, the component carrier may be replaced with a term cell. In the embodiments of the present invention, transmission using carrier aggregation is described for convenience of description. However, in a TDD system using carrier aggregation, component carriers may refer to all component carriers of a subframe (or slot) in which HARQ-ACK is multiplexed. The user equipment may receive PDSCH(s) in one or more component carrier(s) and generate a HARQ-ACK bit sequence in response thereto. The HARQ-ACK bit sequence may be generated by combining HARQ-ACK bit(s) for each component carrier of one or more component carrier(s). In an embodiment of the present invention, the HARQ-ACK bit sequence may be replaced with a term such as HARQ-ACK information bit(s), HARQ-ACK codebook, HARQ-ACK codeword, HARQ-ACK payload, etc. In addition, in the following embodiments, the HARQ-ACK bit sequence for TB-based transmission (or PDSCH) may be referred to as a TB-based HARQ-ACK bit sequence, and the HARQ-ACK bit sequence for CBG-based transmission (or PDSCH) may be referred to as a CBG-based HARQ-ACK bit sequence.

When a carrier aggregation is used, each component carrier may be configured in a different transmission scheme. That is, a transmission of one TB may be configured in the first component carrier and a transmission of two TBs may be configured in the second component carrier. In addition, in the 3GPP NR system, the CBG-based transmission is supported in addition to the TB-based transmission as described above. Thus, the TB-based transmission may be configured in the first component carrier and the CBG-based transmission may be configured in the second component carrier.

Meanwhile, the user equipment monitors a PDCCH in a specific component carrier according to a scheme configured for the user equipment among self-carrier scheduling and cross-carrier scheduling, and receives a PDSCH based on the information of the PDCCH. In addition, the user equipment transmits HARQ-ACK for TBs transmitted through the PDSCH on each component carrier through PUCCH (or PUSCH). However, the user equipment may fail to decode the PDCCH scheduled to some component carriers among the component carriers configured by the base station (that is, DTX occurs). In this case, with excluding HARQ-ACK (s) of the corresponding component carrier, the user equipment may transmit only HARQ-ACK(s) of the successfully decoded component carriers through the PUCCH (or PUSCH). However, when the user equipment excludes transmission of HARQ-ACK(s) of some component carriers, an error may occur in the HARQ-ACK feedback interpretation between the base station and the user equipment. To solve this problem, a method of detecting a DTX using a downlink assignment index (DAI) is used in LTE-A Rel. 13.

Figure 20:
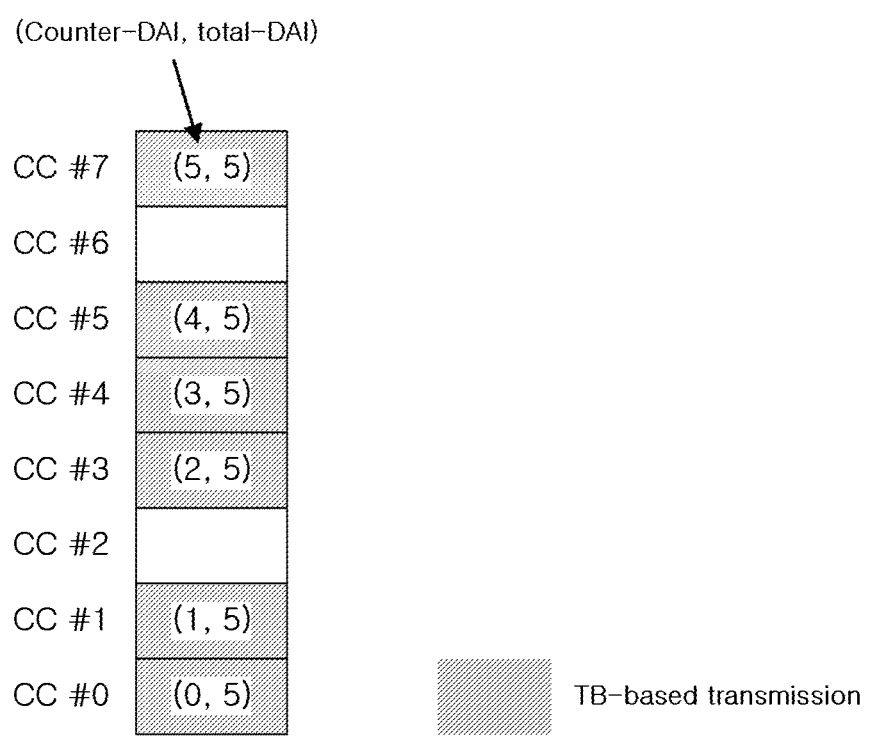
FIG. 20 illustrates an embodiment of values of a downlink assignment index (DAI) mapped to each component carrier.

FIG. 20 illustrates an embodiment of values of a downlink assignment index (DAI) mapped to each component carrier. Referring to FIG. 20, the PDCCH scheduling each PDSCH includes a counter-DAI and a total-DAI. The counter-DAI represents the accumulated number of PDSCH(s) scheduled from the first component carrier (i.e., component carrier #0) up to the current component carrier. In addition, the total-DAI represents the total number of PDSCHs scheduled for the entire component carriers. If the counter-DAI field consists of A bits, the counter-DAI has a value between 0 and $2^A*n-1$ (where n is a natural number). If the number of scheduled PDSCH(s) from the first component carrier to the current component carrier is C, the value of the counter-DAI may be set to $(C-1) \mod 2^A$. Similarly, if the total-DAI field consists of B bits, the total-DAI has a value between 0 and $2^B*m-1$ (where m is a natural number). If the total number of PDSCH(s) scheduled for the entire component carriers is T, the value of total-DAI may be set to $(T-1) \mod 2^B$. The user equipment may identify, by decoding the PDCCH, the order in which the PDSCHs scheduled by the corresponding PDCCH are transmitted. In this case, the user equipment may transmit the HARQ-ACK of the PDSCH in the order in which the corresponding PDSCH is transmitted.

Referring to FIG. 20, a base station may transmit a PDSCH through component carriers #0, #1, #3, #4, #5, and #7 to a user equipment which can use up to 8 component carriers by aggregation. Since the total number of PDSCHs scheduled for component carriers is 6, the value of total-DAI is set to 5. Thus, the (counter-DAI, total-DAI) values of component carriers #0, #1, #3, #4, #5, and #7 are (0, 5), (1, 5), (2, 5), (3, 5), (4, 5), (5, 5), respectively. When decoding of the PDCCH transmitted on the component carrier #3 fails, the user equipment may identify, based on the counter-DAI value of the PDCCH transmitted on the component carrier #1 and the counter-DAI value of the PDCCH transmitted on the component carrier #4, that reception of one PDCCH (and reception of one PDSCH corresponding thereto) has failed. In addition, when decoding of the PDCCH transmitted on the component carrier #7 fails, the user equipment may identify, based on the counter-DAI value and the total-DAI value of the PDCCH transmitted on the component carrier #5, that one PDSCH is scheduled after the component carrier #5 but the reception thereof was not successful.

By using the DAI as described above, the user equipment can identify the order of PDSCHs that have successfully received and the order of PDSCHs which are failed to be received. However, the user equipment cannot identify the number of TBs included in the PDSCH which are failed to be received, and thus cannot determine the HARQ-ACK bit sequence. To solve this, two methods can be used. The first method is to apply spatial bundling to all PDSCHs. In other words, 2-bit HARQ-ACK for the PDSCH in which two TBs are transmitted may be bundled to generate 1-bit. This method has no additional UCI overhead, but may degrade transmission performance. The second method does not apply spatial bundling, but assumes that all PDSCHs contain two TBs. In other words, in this method, 2-bit HARQ-ACK is transmitted even for a PDSCH in which 1 TB is transmitted. This method has a disadvantage of generating additional UCI overhead.

Meanwhile, as described above, TB-based transmission and CBG-based transmission are supported together in the 3GPP NR system. When the user equipment is configured to multiplex and transmit HARQ-ACK bits for a plurality of component carriers, the base station may inform the user equipment whether CBG-based transmission is possible for each component carrier. However, in a component carrier in which the CBG-based transmission is configured, TB-based transmission can be also performed. Accordingly, the user equipment may expect only the TB-based transmission on a specific component carrier, and may expect both the TB-based transmission and the CBG-based transmission on another specific component carrier. The user equipment may determine the HARQ-ACK bit sequence to be transmitted on the uplink only after successfully receiving all the PDCCHs scheduled for each component carrier.

In order to prevent an error in determining and interpreting a HARQ-ACK bit sequence between a base station and a user equipment, the above-described DAI may be used according to an embodiment of the present invention. Assuming that N HARQ-ACK bits are required in response to the CBG-based transmission, the user equipment and the base station may use the following three methods to prevent the interpretation error of the HARQ-ACK bit sequence that may occur when decoding of the PDCCH fails.

According to the first method, when the base station configures CBG-based transmission to the user equipment in at least one component carrier with carrier aggregation, it may be assumed that CBG-based transmission is performed for all PDSCHs scheduled to the user equipment. That is, even when the base station performs TB-based transmission to the user equipment in a specific component carrier, the user equipment may feedback an N-bit HARQ-ACK. Here, N may be the maximum number of CBGs per TB configured for the user equipment. However, in the case of the first method, there is a disadvantage that the overhead of the PUCCH is too large. For example, if N=4, an 1-bit HARQ-ACK is increased to 4 bits so that a maximum of 300% overhead may occur.

According to the second method, when the base station configures CBG-based transmission to the user equipment in at least one component carrier with carrier aggregation, it may be assumed that TB-based transmission is performed for all PDSCHs scheduled to the user equipment. In this case, the user equipment may be fixed to feedback 1-bit or 2-bit HARQ-ACK in response to the PDSCH. However, in the second method, even if the user equipment is configured for the CBG-based transmission from the base station and the CBG-based transmission is actually performed, the HARQ-ACK feedback information according to the CBG-based transmission cannot be used, so the performance gain of the CBG-based transmission cannot be obtained.

According to the third method, when the base station configures whether to perform CBG-based transmission for each component carrier individually to the user equipment at the time of carrier aggregation, it may be assumed that CBG-based transmission or TB-based transmission is performed in the PDSCH scheduled to the user equipment according to whether the CBG-based transmission is configured for the corresponding component carrier and a DCI scheduling the PDSCH. That is, when the base station configures the CBG-based transmission to the user equipment in the specific component carrier, the user equipment may feedback N-bit HARQ-ACK even if the base station performs TB-based transmission to the user equipment in the specific component carrier. Here, N may be the maximum number of CBGs per TB configured for the user equipment. If the base station does not configure the CBG-based transmission to the user equipment in the specific component carrier, the user equipment may be fixed to feedback 1-bit or 2-bit HARQ-ACK by assuming that the TB-based transmission is performed on the PDSCH scheduled for the specific component carrier.

As described above, when both the TB-based transmission and the CBG-based transmission are configured to a user equipment using HARQ-ACK multiplexing, a signaling scheme for preventing an interpretation error of the HARQ-ACK bit sequence between the base station and the user equipment may be provided. According to an embodiment of the present invention, the user equipment may receive a PDCCH indicating PDSCH scheduling information of each component carrier in one or more component carrier(s). In addition, the user equipment may receive the DCI through the PDCCH. In this case, CBG-based transmission may be configured in at least one component carrier among the one or more component carrier(s). In addition, at least one TB-based transmission and at least one CBG-based transmission may be configured in the one or more component carrier(s). The user equipment may identify a transmission scheme in each component carrier based on a DCI format of the DCI. In this case, the transmission scheme is either the TB-based transmission or the CBG-based transmission. Meanwhile, the user equipment may receive the DAI through the PDCCH. The DAI includes a counter-DAI and a total-DAI as described above.

The user equipment receives the PDSCH of each component carrier in one or more component carrier(s) based on the scheduling information of the PDCCH, and generates a HARQ-ACK bit sequence in response to receiving the PDSCH of each component carrier. In this case, the user equipment generates a HARQ-ACK bit sequence with reference to the DAI. The HARQ-ACK bit sequence includes at least one of a HARQ-ACK bit sequence for the TB-based transmissions (i.e., TB-based HARQ-ACK bit sequence) and a HARQ-ACK bit sequence for the CBG-based transmissions (i.e., CBG-based HARQ-ACK bit sequence). According to an embodiment of the present invention, the DAI may be separately applied to the TB-based HARQ-ACK bit sequence and the CBG-based HARQ-ACK bit sequence. In addition, within the HARQ-ACK bit sequence, the TB-based HARQ-ACK bit sequence may precede the CBG-based HARQ-ACK bit sequence.

The user equipment may generate a HARQ-ACK bit sequence for the one or more cell(s) based on the identified transmission scheme of each cell. That is, the TB-based HARQ-ACK bit sequence and the CBG-based HARQ-ACK bit sequence may be generated separately in the HARQ-ACK bit sequence. In this case, one HARQ-ACK bit is generated per one TB in the TB-based HARQ-ACK bit sequence, and N HARQ-ACK bit(s) are generated per one TB in the CBG-based HARQ-ACK bit sequence. That is, the HARQ-ACK bit(s) for the CBG-based PDSCH is configured to have N bits per one TB equally regardless of the number of CBG(s) actually scheduled and transmitted in the PDSCH.

According to an embodiment of the present invention, the N may be the maximum number of CBGs per TB configured for the user equipment. According to another embodiment, the N may be a value configured by the base station for HARQ-ACK multiplexing. According to a further embodiment, if the number M of CBG(s) transmitted through a particular component carrier to which the CBG-based transmission is configured in one or more component carrier(s) is less than N, HARQ-ACK bit(s) for the particular component carrier may be configured by repeating HARQ-ACK bit(s) for the transmitted CBG(s). Further, if the number M of CBG(s) transmitted through a particular component carrier to which the CBG-based transmission is configured in one or more component carrier(s) is less than N, the HARQ-ACK bit(s) for the particular component carrier may consist of M HARQ-ACK bit(s) for the transmitted CBG(s) and N–M NACK(s). The user equipment transmits the HARQ-ACK bit sequence generated in this way to the base station.

When the user equipment receives the PDCCH, the user equipment may identify whether the TB-based transmission or the CBG-based transmission is applied to the PDSCH scheduled by the PDCCH. The user equipment may identify a transmission scheme in each component carrier (i.e., PDSCH) based on the information of the DCI received through the PDCCH. For example, the transmission scheme information may be signaled by explicit 1-bit in the DCI or may be inferred through a combination of other information included in the DCI. In addition, the transmission scheme in each component carrier may be identified based on the DCI format of the DCI. Different DCI formats may be used for different transmission schemes. Different DCI formats may have different sizes of information included in the DCI. That is, different DCI formats may have different payload lengths of the DCI. In addition, CRC may be scrambled with different RNTIs in different DCI formats. In addition, when a PDCCH for scheduling a CBG-based PDSCH is received, the user equipment may identify, through information specified in the DCI, which CBG(s) among the entire CBGs are included in the PDSCH.

Hereinafter, specific embodiments of generating a HARQ-ACK bit sequence in response to reception of a PDSCH will be described with reference to each drawing. In each embodiment, it is assumed that the CBG-based transmission is configured in at least one component carrier (i.e., cell) among the one or more component carrier(s). For example, at least one TB-based transmission and at least one CBG-based transmission may be configured in one or more component carrier(s). In addition, in the embodiments of each drawing, the same or corresponding parts as those of the previous drawings will be omitted. In the embodiments of the present invention, for convenience of description, it is assumed that the value of each index or counter increases by 1 starting from 0. However, the embodiments of the present invention are not limited thereto, and the value of the index or counter may be increased by 1 starting from a predetermined value (for example, 1).

Figure 21:
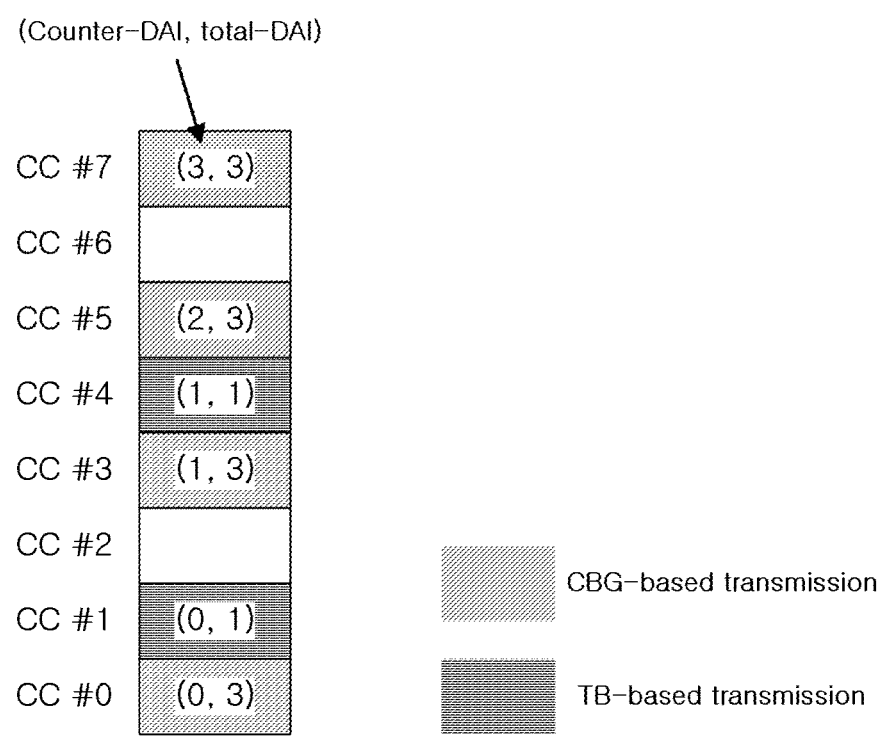
FIGS. 21 and 22 illustrate a DAI signaling method and a HARQ-ACK bit sequence generation method based on the DAI signaling method according to the first embodiment of the present invention.
Figure 22:
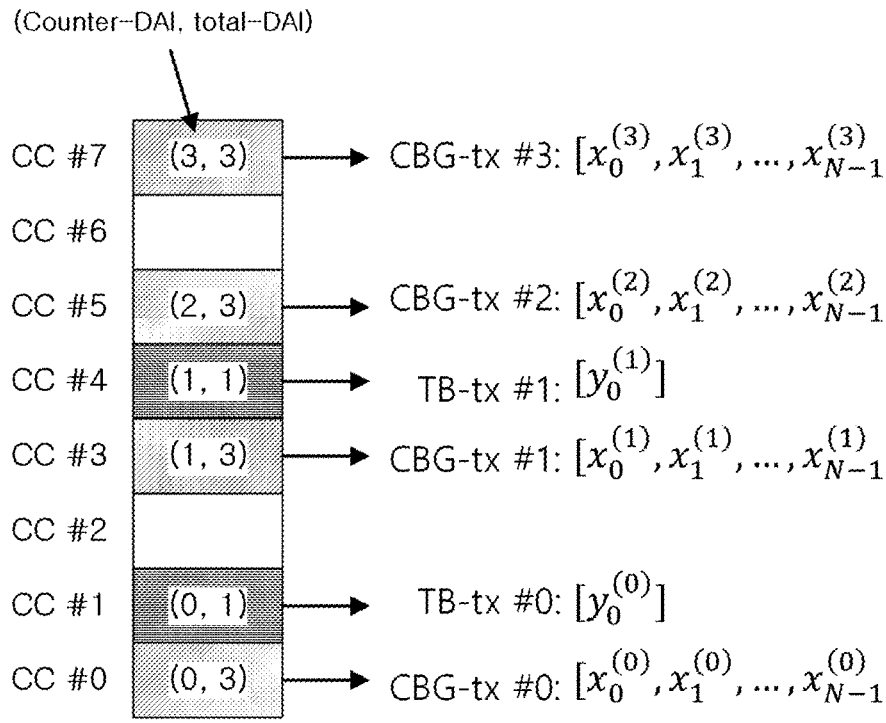
Figure 22:
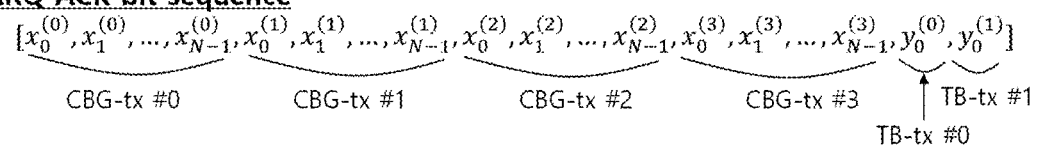

FIGS. 21 and 22 illustrate a DAI signaling method and a HARQ-ACK bit sequence generation method based on the DAI signaling method according to the first embodiment of the present invention. According to an embodiment of the present invention, the DAI may be separately applied to the TB-based HARQ-ACK bit sequence and the CBG-based HARQ-ACK bit sequence. Accordingly, the base station generates independent counter-DAI and total-DAI values for each transmission scheme. The base station transmits the counter-DAI value and the total-DAI value according to the PDSCH transmission scheme through the counter-DAI field and the total-DAI field of the PDCCH scheduling the PDSCH. The user equipment receives the DCI through the PDCCH transmitted by the base station, distinguishes the transmission scheme (i.e., TB-based transmission or CBG-based transmission) according to the information of the DCI, and receives the DAI corresponding to the transmission scheme. The user equipment may generate the HARQ-ACK bit sequence of the corresponding transmission scheme with reference to the received DAI. In this case, the user equipment may interpret the counter-DAI and the total-DAI received through the PDCCH as counter-DAI and total-DAI for the transmission scheme of the PDSCH scheduled by the PDCCH. Table 9 shows a method for the user equipment to interpret the counter-DAI and the total-DAI generated according to the first embodiment of the present invention.

PDSCH(s) scheduled from the first component carrier (i.e., CC #0) to the previous component carrier. In this case, if the value of the counter-DAI is C, the accumulated number of CBG-based PDSCH(s) scheduled up to the previous component carrier may be C. In a similar manner, the counter-DAI for the CBG-based transmission may indicate the accumulated number of CBG-based PDSCH(s) scheduled from the first component carrier (i.e., CC #0) to the current component carrier. In this case, if the value of the counter-DAI is C, the accumulated number of CBG-based PDSCH(s) scheduled up to the current component carrier may be C+1. In addition, the total-DAI for the CBG-based transmission may indicate the total number of CBG-based PDSCHs scheduled for the entire component carriers. If the value of total-DAI is T, the total number of CBG-based PDSCHs scheduled for the entire component carriers may be T+1.

FIG. 21 illustrates a DAI signaling method according to the first embodiment described above. Referring to FIG. 21, the PDSCH may be transmitted to a user equipment through component carriers #0, #1, #3, #4, #5, and #7. Among the component carriers, CBG-based PDSCH is transmitted through component carriers #0, #3, #5, and #7, and TB-based PDSCH is transmitted through component carriers #1 and #4. Since the total number of CBG-based PDSCHs scheduled for the entire component carriers is 4, the value of the total-DAI field for the CBG-based transmission may be set to 3. In addition, the value of the counter-DAI field for

TABLE 9

| Detected PDCCH | Interpretation of UE | |
|---|---|---|
| | If value of counter-DAI field is mapped to C | If value of total-DAI field is mapped to T |
| PDCCH scheduling TB-based transmission | Number of TB-based transmissions scheduled from CC#0 to previous CC: C | Number of TB-based transmissions scheduled in entire CC: T + 1 |
| PDCCH scheduling CBG-based transmission | Number of CBG-based transmissions scheduled from CC#0 to previous CC: C | Number of CBG-based transmissions scheduled in entire CC: T + 1 |

Referring to Table 9, the counter-DAI field and the total-DAI field of the PDCCH scheduling the TB-based PDSCH indicate the counter-DAI and the total-DAI for the TB-based transmission, respectively. In addition, the counter-DAI field and the total-DAI field of the PDCCH scheduling the CBG-based PDSCH indicate the counter-DAI and the total-DAI for the CBG-based transmission, respectively.

First, the counter-DAI for the TB-based transmission may indicate the accumulated number of TB-based PDSCH(s) scheduled from the first component carrier (i.e., CC #0) to the previous component carrier. In this case, if the value of the counter-DAI is C, the accumulated number of TB-based PDSCH(s) scheduled up to the previous component carrier may be C. In a similar manner, the counter-DAI for the TB-based transmission may indicate the accumulated number of TB-based PDSCH(s) scheduled from the first component carrier (i.e., CC #0) to the current component carrier. In this case, if the value of the counter-DAI is C, the accumulated number of TB-based PDSCH(s) scheduled up to the current component carrier may be C+1. In addition, the total-DAI for the TB-based transmission may indicate the total number of TB-based PDSCHs scheduled for the entire component carriers. If the value of total-DAI is T, the total number of TB-based PDSCHs scheduled for the entire component carriers may be T+1.

Next, the counter-DAI for the CBG-based transmission may indicate the accumulated number of CBG-based the CBG-based transmission may be set to a value increasing from 0 based on the accumulated number of CBG-based PDSCH(s) scheduled up to the current component carrier. Accordingly, the values of the (counter-DAI, total-DAI) fields of the PDCCH for component carriers #0, #3, #5, and #7 through which the CBG-based PDSCH is transmitted are (0, 3), (1, 3), (2, 3) and (3, 3), respectively. Similarly, since the total number of TB-based PDSCHs scheduled for the entire component carriers is 2, the value of the total-DAI field for the TB-based transmission may be set to 1. In addition, the value of the counter-DAI field for the TB-based transmission may be set to a value increasing from 0 based on the accumulated number of TB-based PDSCH(s) scheduled up to the current component carrier. Accordingly, the values of the (counter-DAI, total-DAI) fields of the PDCCH for component carriers #1 and #4 through which TB-based PDSCHs are transmitted may be (0, 1) and (1, 1), respectively.

The user equipment may identify a transmission scheme of the PDSCH by receiving the PDCCH scheduling the PDSCH. For example, the user equipment may identify the transmission scheme of the PDSCH based on the DCI format of the DCI received in the PDCCH. In this case, the user equipment interprets the values of the counter-DAI field and the total-DAI field of the received PDCCH as a counter-DAI and a total-DAI for a transmission scheme of the PDSCH scheduled by the PDCCH, respectively. For example, in the embodiment of FIG. 21, when a PDCCH scheduling a PDSCH transmitted through component carrier #3 is received, the user equipment may identify that a CBG-based PDSCH is transmitted through carrier #3, and may interpret the values of the counter-DAI field and the total-DAI field of the PDCCH as a counter-DAI and a total-DAI for the CBG-based transmission, respectively. Since the values of the received (counter-DAI, total-DAI) fields are (1, 3), the user equipment may identify that a total of 4 CBG-based PDSCHs are assigned to the entire component carriers and the PDSCH through component carrier #3 is the second CBG-based PDSCH.

If the counter-DAI value for the CBG-based transmission does not increase sequentially (i.e., not in the order of 0->1->2->3 . . . ) as the component carrier index increases, the user equipment may determine that reception of some PDCCHs for scheduling the CBG-based transmission has failed. In addition, if the counter-DAI value and the total-DAI value of the last PDCCH successfully received among the PDCCHs scheduling the CBG-based transmission are not equal to each other, the user equipment may determine that reception of at least one PDCCH scheduling the CBG-based transmission has failed after the last PDCCH. In this case, the number of PDCCHs scheduling the CBG-based transmissions which are failed to be received after the last successfully received PDCCH may be identified through a difference between the total-DAI value and the counter-DAI value of the last PDCCH. Such a method of interpreting the counter-DAI value and the total-DAI value may be equally applied to the interpretation of the counter-DAI value and the total-DAI value for the TB-based transmission.

Referring to FIG. 21, the user equipment may fail to decode the PDCCH transmitted through component carriers #3 and #7 in which the CBG-based transmission is scheduled, and may successfully decode the PDCCH transmitted through the remaining component carriers #0 and #5 in which the CBG-based transmission is scheduled. In this case, the user equipment may receive 0 and 2 as counter-DAI values for the CBG-based transmission, respectively. Accordingly, the user equipment may identify that the reception of the PDCCH corresponding to the counter-DAI=1 has failed among the PDCCHs scheduling the CBG-based transmission. In addition, since 3 is received as the total-DAI value for the CBG-based transmission but the counter-DAI value of the last PDCCH successfully received among the PDCCHs scheduling the CBG-based transmission is 2, the difference between the total-DAI value and the counter-DAI value of the last PDCCH is 1. Accordingly, the user equipment may identify that the reception of one PDCCH scheduling the CBG-based transmission has failed after the last PDCCH.

FIG. 22 illustrates a method of generating a HARQ-ACK bit sequence based on a DAI signaled according to the first embodiment described above. According to an embodiment of the present invention, the user equipment generates a HARQ-ACK bit sequence for the entire component carriers in response to receiving the PDSCH of each component carrier. In this case, the user equipment may generate a HARQ-ACK bit sequence based on the identified transmission scheme of each component carrier. As described above, the HARQ-ACK bit sequence includes a TB-based HARQ-ACK bit sequence and a CBG-based HARQ-ACK bit sequence. In addition, the user equipment may generate the HARQ-ACK bit sequence with reference to the DAI of the PDCCH scheduling the PDSCH of each component carrier.

In this case, the DAI is separately applied to the TB-based HARQ-ACK bit sequence and the CBG-based HARQ-ACK bit sequence.

More specifically, the user equipment may generate a CBG-based HARQ-ACK bit sequence by combining the N-bit HARQ-ACK for each CBG-based transmission in the order of the counter-DAI value of the CBG-based transmission. Each bit in the CBG-based HARQ-ACK bit sequence indicates whether one CBG is successfully received. According to an embodiment of the present invention, in the CBG-based HARQ-ACK bit sequence, N HARQ-ACK bit (s) are generated per one TB, where N is the maximum number of CBGs per TB configured for the user equipment. In addition, the user equipment may generate a TB-based HARQ-ACK bit sequence by combining the 1 or 2-bit HARQ-ACK for each TB-based transmission in the order of the counter-DAI value of the TB-based transmission. For reference, the HARQ-ACK for the TB-based transmission may consist of 1-bit per one PDSCH when a spatial bundling is applied, and may consist of a maximum of 2-bit per one PDSCH when the spatial bundling is not applied. In the embodiment of FIG. 22, it is assumed that 1-bit HARQ-ACK is transmitted as HARQ-ACK for each TB-based transmission.

According to a further embodiment of the present invention, when the user equipment does not receive any PDCCH scheduling the CBG-based transmission, the CBG-based HARQ-ACK bit sequence may be excluded from the HARQ-ACK bit sequence. That is, the HARQ-ACK bit sequence may consist only of the TB-based HARQ-ACK bit sequence. Similarly, when the user equipment does not receive any PDCCH scheduling the TB-based transmission, the TB-based HARQ-ACK bit sequence may be excluded from the HARQ-ACK bit sequence. That is, the HARQ-ACK bit sequence may consist only of the CBG-based HARQ-ACK bit sequence. The user equipment may configure the entire HARQ-ACK bit sequence by combining the CBG-based HARQ-ACK bit sequence and the TB-based HARQ-ACK bit sequence. According to an embodiment of the present invention, the user equipment may configure the entire HARQ-ACK bit sequence by appending the CBG-based HARQ-ACK bit sequence to the TB-based HARQ-ACK bit sequence. Referring to FIG. 22, the HARQ-ACK bit sequence configured by the user equipment is $[x_0^{(0)}, x_1^{(0)}, \ldots, x_{N-1}^{(0)}, x_0^{(1)}, x_1^{(1)}, \ldots, x_{N-1}^{(1)}, x_0^{(2)}, x_1^{(2)}, \ldots, x_{N-1}^{(2)}, x_0^{(3)}, x_1^{(3)}, \ldots, x_{N-1}^{(3)}, y_0^{(0)}, y_0^{(1)}]$. Here, x is a CBG-based HARQ-ACK bit and y is a TB-based HARQ-ACK bit. In addition, the superscript indicates a counter-DAI value of the PDCCH scheduling a PDSCH composed of the corresponding CBG or TB, and the subscript indicates an ascending order of the corresponding CBG or TB in the PDSCH.

Meanwhile, according to the first embodiment described above, in order for the user equipment to configure the entire HARQ-ACK bit sequence, the user equipment should receive at least one DAI for the TB-based transmission and at least one DAI for the CBG-based transmission. That is, the user equipment should receive at least one PDCCH scheduling the CBG-based transmission and at least one PDCCH scheduling the TB-based transmission. If the user equipment receives only the PDCCH for one transmission method, scheduling information for another transmission method cannot be identified. For example, if the user equipment does not successfully receive any PDCCH scheduling the TB-based transmission, the user equipment does not know whether the PDCCH for the TB-based transmission is transmitted and thus will not generate a TB-based HARQ- ACK bit sequence. In this case, an error in the interpretation of the HARQ-ACK bit sequence between the base station and the user equipment may occur, thus a method for solving the problem is required.

Figure 23:
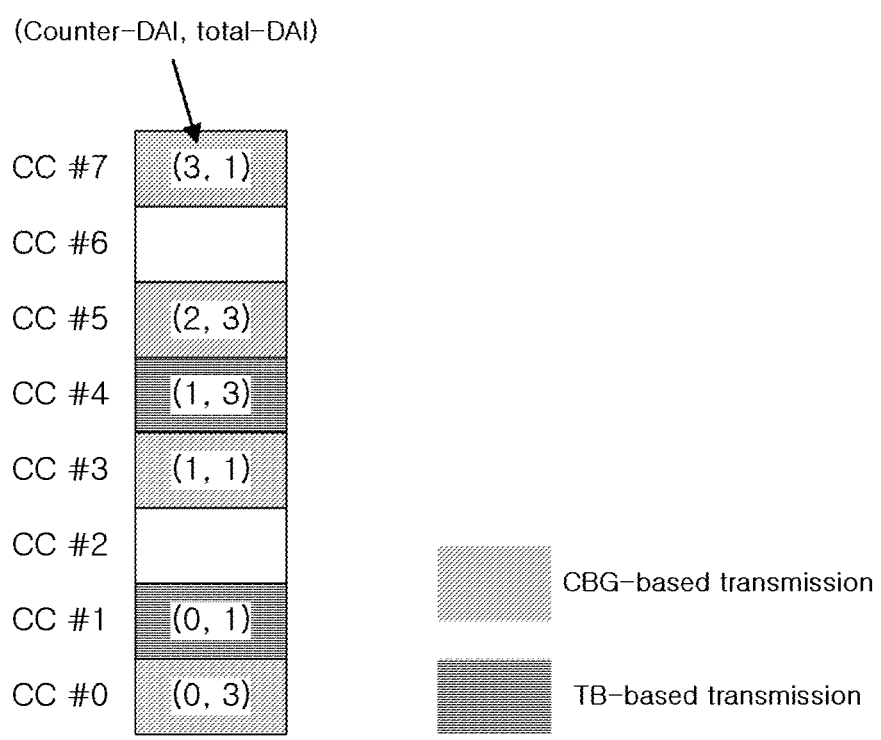
FIG. 23 illustrates a DAI signaling method according to the second embodiment of the present invention.

FIG. 23 illustrates a DAI signaling method according to the second embodiment of the present invention. According to the second embodiment of the present invention, the base station may transmit a counter-DAI value according to the transmission scheme of the PDSCH through the counter-DAI field of the PDCCH scheduling the corresponding PDSCH, and may transmit any one of a total-DAI value for the TB-based transmission or a total-DAI value for the CBG-based transmission through the total-DAI field of the PDCCH based on the counter-DAI value. That is, according to the second embodiment of the present invention, the counter-DAI field signals the counter-DAI value according to the transmission scheme of the corresponding PDSCH, but the total-DAI field may selectively signal any one of the total-DAI value according to the corresponding transmission scheme or the total-DAI value according to another transmission scheme based on the value of the counter-DAI field. According to an embodiment, when the counter-DAI value is even, the total-DAI field may indicate the total-DAI value according to the transmission scheme of the corresponding PDSCH, and when the counter-DAI value is odd, the total-DAI field may indicate the total-DAI value according to a transmission scheme other than the transmission scheme of the corresponding PDSCH.

The user equipment receives the DCI through the PDCCH transmitted by the base station, and receives the DAI in the DCI format of the DCI. The user equipment may generate the HARQ-ACK bit sequence with reference to the received DAI. In this case, the user equipment may interpret the counter-DAI received through the PDCCH as a counter-DAI for the transmission scheme of the PDSCH scheduled by the PDCCH. On the other hand, the user equipment may identify whether the total-DAI received through the PDCCH is a total-DAI for the TB-based transmission or a total-DAI for the TB-based transmission based on the value of the counter-DAI. Table 10 shows a method for the user equipment to interpret the counter-DAI and the total-DAI generated according to the second embodiment of the present invention.

value of the counter-DAI field of the PDCCH is odd. Similarly, the total-DAI field of the PDCCH scheduling the CBG-based PDSCH indicates the total-DAI for the CBG-based transmission when the value of the counter-DAI field of the PDCCH is even and indicates the total-DAI for the TB-based transmission when the value of the counter-DAI field of the PDCCH is odd. On the other hand, the information indicated by the counter-DAI and the total-DAI for the TB-based transmission and the counter-DAI and the total-DAI for the CBG-based transmission is the same as in the first embodiment described above.

FIG. 23 illustrates a DAI signaling method according to the second embodiment described above. In the embodiment of FIG. 23, a situation in which a CBG-based PDSCH and a TB-based PDSCH are transmitted through each component carrier is the same as the first embodiment described above. In this case, the total number of CBG-based PDSCHs scheduled for the entire component carriers is 4, and the total number of CBG-based PDSCHs scheduled for the entire component carriers is 2. According to the second embodiment, in the DAI for the CBG-based transmission, the value of the total-DAI field is set to 3 when the counter-DAI value is even, and the value of the total-DAI field is set to 1 when the counter-DAI value is odd. Accordingly, the values of the (counter-DAI, total-DAI) fields of the PDCCH for the component carriers #0, #3, #5, and #7 through which the CBG-based PDSCH is transmitted are (0, 3), (1, 1), (2, 3) and (3, 1), respectively. Similarly, in the DAI for the TB-based transmission, the value of the total-DAI field is set to 1 when the counter-DAI value is even, and the value of the total-DAI field is set to 3 when the counter-DAI value is odd. Accordingly, the values of the (counter-DAI, total-DAI) fields of the PDCCH for the component carriers #1 and #4 through which the TB-based PDSCH is transmitted may be (0, 1) and (1, 3), respectively.

The user equipment may identify a transmission scheme of the PDSCH by receiving the PDCCH scheduling the PDSCH. In this case, the user equipment interprets the value of the counter-DAI field of the received PDCCH as a counter-DAI for the transmission scheme of the PDSCH scheduled by the PDCCH. On the other hand, when interpreting the value of the total-DAI field of the received PDCCH, the user equipment interprets it as a total-DAI

TABLE 10

| Detected PDCCH | Interpretation of UE | |
|---|---|---|
| | If value of counter-DAI field is mapped to C | If value of total-DAI field is mapped to T |
| PDCCH scheduling TB-based transmission | Number of TB-based transmissions scheduled from CC#0 to previous CC: C | Number of TB-based transmissions scheduled in entire CC if C is even: T + 1<br>Number of TB-based transmissions scheduled in entire CC if C is odd: T + 1 |
| PDCCH scheduling CBG-based transmission | Number of CBG-based transmissions scheduled from CC#0 to previous CC: C | Number of CBG-based transmissions scheduled in entire CC if C is even: T + 1<br>Number of CBG-based transmissions scheduled in entire CC if C is odd: T + 1 |

Referring to Table 10, the counter-DAI field of the PDCCH scheduling the TB-based PDSCH indicates the counter-DAI for the TB-based transmission, and the counter-DAI field of the PDCCH scheduling the CBG-based PDSCH indicates the counter-DAI for the CBG-based transmission. On the other hand, the total-DAI field of the PDCCH scheduling the TB-based PDSCH indicates the total-DAI for the TB-based transmission when the value of the counter-DAI field of the PDCCH is even and indicates the total-DAI for the CBG-based transmission when the according to the transmission scheme of the corresponding PDSCH when the counter-DAI value is even, and interprets it as a total-DAI according to a transmission scheme other than the transmission scheme of the corresponding PDSCH when the counter-DAI value is odd. For example, in the embodiment of FIG. 23, when a PDCCH scheduling a PDSCH transmitted through component carrier #3 is received, the user equipment may identify that a CBG-based PDSCH is transmitted through carrier #3 and interpret the value of the counter-DAI field of the PDCCH as a counter- DAI for the CBG-based transmission. In this case, since the value of the counter-DAI field is odd, the user equipment may interpret the value of the total-DAI field of the PDCCH as a total-DAI for the TB-based transmission. Since the values of the received (counter-DAI, total-DAI) fields are (1, 1), the user equipment may identify that the PDSCH transmitted through the component carrier #3 is the second CBG-based PDSCH, and a total of 2 TB-based PDSCHs are assigned to the entire component carriers.

The method for determining that the user equipment has failed to receive the PDCCH scheduling the CBG-based transmission or the TB-based transmission based on the counter-DAI and/or the total-DAI is similar to the first embodiment described above. However, in order to obtain the total-DAI for a specific transmission scheme, the user equipment should refer to the total-DAI field in the PDCCH when the value of the counter-DAI field is even. Therefore, the total-DAI value of the last PDCCH in the above-described first embodiment should be replaced with the total-DAI value of the PDCCH in which the value of the counter-DAI field is even. Meanwhile, in order to obtain the total-DAI for the specific transmission scheme, the user equipment may refer to the total-DAI field when the value of the counter-DAI field is odd in the PDCCH scheduling PDSCH of another transmission scheme. The user equipment may determine whether reception of at least some PDCCHs has failed by referring to thus obtained total-DAI for the specific transmission scheme.

Meanwhile, according to the second embodiment described above, the user equipment may know the number of PDSCHs scheduled by another transmission scheme even when only PDCCHs for scheduling PDSCHs of one transmission scheme are received. Therefore, even if all of the reception of the PDCCHs scheduling the PDSCHs of a specific transmission scheme fails, it is possible to prevent an error in the interpretation of the HARQ-ACK bit sequence between the base station and the user equipment. For example, even if one PDCCH scheduling the TB-based transmission is transmitted and the user equipment fails to receive the corresponding PDCCH, the user equipment may identify the scheduled number of TB-based PDSCHs through the PDCCH scheduling the CBG-based transmission. However, in a situation where only one PDCCH is successfully received, an error in the interpretation of the HARQ-ACK bit sequence between the base station and the user equipment may still occur.

Figure 24:
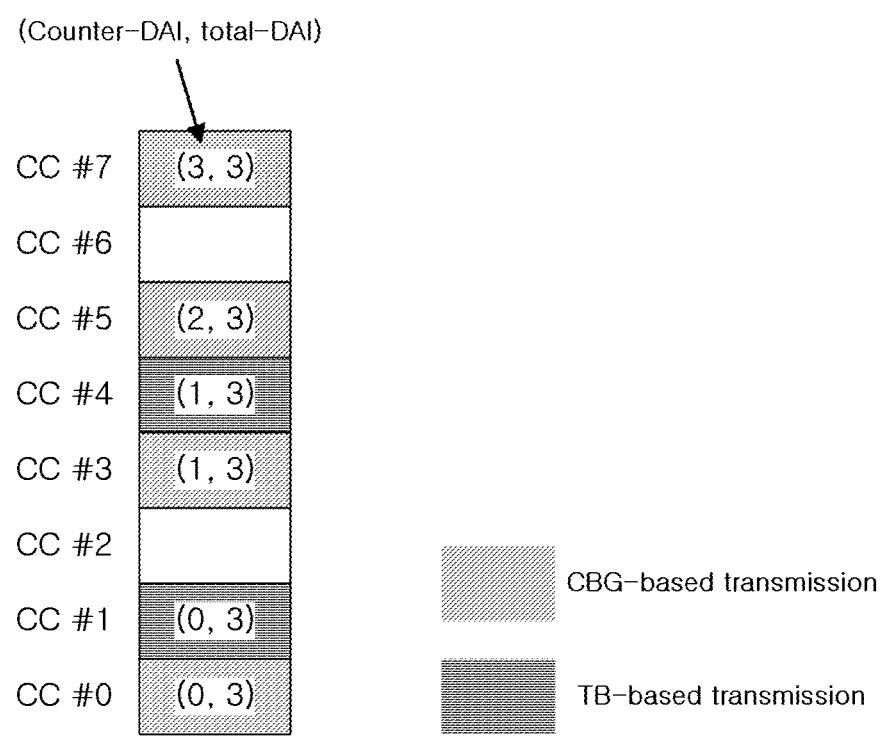
FIG. 24 illustrates a DAI signaling method according to the third embodiment of the present invention.

FIG. 24 illustrates a DAI signaling method according to the third embodiment of the present invention. According to the third embodiment of the present invention, the base station may generate an independent counter-DAI for each of the TB-based transmission and the CBG-based transmission, and generate a common total-DAI used together for the two transmission schemes. The base station may transmit a counter-DAI value according to the transmission scheme of the PDSCH through the counter-DAI field of the PDCCH scheduling the corresponding PDSCH, and may transmit a common total-DAI value through the total-DAI field of the all PDCCHs. That is, according to the third embodiment of the present invention, the counter-DAI field signals the counter-DAI value according to the transmission scheme of the corresponding PDSCH, but the total-DAI field signals only one of the total-DAI value for the TB-based transmission or the total-DAI value for the CBG-based transmission. The user equipment may interpret the counter-DAI received through the PDCCH as a counter-DAI for the transmission scheme of the PDSCH scheduled by the PDCCH. In addition, the user equipment may interpret the total-DAI received through the PDCCH as a total-DAI commonly applied to all the transmission schemes. Table 11 shows a method for the user equipment to interpret the counter DAI and the total DAI generated according to the third embodiment of the present invention.

TABLE 11

| Detected PDCCH | Interpretation of UE | |
| --- | --- | --- |
| | It value of counter-DAI field is mapped to C | It value of total-DAI held is mapped to T |
| PDCCH scheduling TB-based transmission | Number of TB-based transmissions scheduled from CC#0 to previous CC: C | Number of TB-based transmissions scheduled in entire CC if C is even: T + 1<br>Number of CBG-based transmissions scheduled in entire CC if C is odd: T + 1 |
| PDCCH scheduling CBG-based transmission | Number of CBG-based transmissions scheduled from CC#0 to previous CC: C | Number of TB-based transmissions scheduled in entire CC if C is even: T + 1<br>Number of CBG-based transmissions scheduled in entire CC if C is odd: T + 1 |

Referring to Table 11, the information indicated by the counter-DAI field of the PDCCH scheduling the TB-based PDSCH and the counter-DAI field of the PDCCH scheduling the CBG-based PDSCH are the same as the first and second embodiments described above. However, both the total-DAI field of the PDCCH scheduling the TB-based PDSCH and the total-DAI field of the PDCCH scheduling the CBG-based PDSCH represent a common total-DAI. The common total-DAI value may be determined according to various embodiments. If both at least one TB-based PDSCH and at least one CBG-based PDSCH are scheduled for the entire component carriers, the common total-DAI value may represent the total number of PDSCHs of any one transmission scheme scheduled for the entire component carriers. According to an embodiment, the common total-DAI value may indicate the total number of CBG-based PDSCHs scheduled for the entire component carriers. According to another embodiment, the common total-DAI value may be determined as a value that minimizes the length of the HARQ-ACK bit sequence. If only PDSCHs of any one transmission scheme is scheduled for the entire component carriers, the common total-DAI value may be determined as a predetermined value. According to an embodiment of the present invention, when a 2-bit total-DAI is used, the predetermined value may be binary '11'. In addition, when a 3-bit total-DAI is used, the predetermined value may be '011' or '111'.

FIG. 24 illustrates a DAI signaling method according to the third embodiment described above. In the embodiment of FIG. 24, the situation in which the CBG-based PDSCH and the TB-based PDSCH are transmitted through each component carrier is the same as the first embodiment described above. According to an embodiment, when the common total-DAI value represents the total number of CBG-based PDSCHs, the total-DAI field for the CBG-based transmission and the total-DAI field for the TB-based transmission are all set to 3. Accordingly, the values of the (counter-DAI, total-DAI) fields of the PDCCH for component carriers #0, #3, #5, and #7 through which the CBG-based PDSCH is transmitted are (0, 3), (1, 3), (2, 3) and (3, 3), respectively. In addition, the values of the (counter-DAI, total-DAI) fields of the PDCCH for the component carriers #1 and #4 through which the TB-based PDSCH is transmitted may be (0, 3) and (1, 3), respectively.

The user equipment may identify a transmission scheme of the PDSCH by receiving the PDCCH scheduling the PDSCH. In this case, the user equipment interprets the value of the received counter-DAI field of the PDCCH as a counter-DAI for the transmission scheme of the PDSCH scheduled by the PDCCH. On the other hand, the user equipment interprets the value of the total-DAI field of the received PDCCH as a total-DAI applied to both the CBG-based transmission and the TB-based transmission. For example, in the embodiment of FIG. 24, when a PDCCH scheduling a PDSCH transmitted through component carrier #3 is received, the user equipment may identify that a CBG-based PDSCH is transmitted through carrier #3 and interpret the value of the counter-DAI field of the PDCCH as a counter-DAI for the CBG-based transmission. In addition, the user equipment may interpret the value of the total-DAI field of the PDCCH as a total-DAI applied to both the CBG-based transmission and the TB-based transmission. Since the values of the received (counter-DAI, total-DAI) fields are (1, 3), the user equipment may identify that the PDSCH transmitted through the component carrier #3 is the second CBG-based PDSCH, and a total of 4 CBG-based PDSCHs and TB-based PDSCHs are assigned respectively to the entire component carriers. On the other hand, although the total-DAI field for the CBG-based transmission and the total-DAI field for the TB-based transmission both signal the common total-DAI value, the total numbers of scheduled CBG-based PDSCHs and TB-based PDSCHs may not be identical to each other. That is, if the total-DAI field consists of B bits and signals a common total-DAI value k, the total number of scheduled CBG-based PDSCHs may be $2^B*n+k+1$, and the total number of scheduled TB-based PDSCHs may be $2^B*m+k+1$ (where n and m are nonnegative integers). Thus, if the total-DAI field consists of two bits, the difference between the total number of scheduled CBG-based PDSCHs and the total number of scheduled TB-based PDSCHs may be a multiple of 4.

The method for determining that the user equipment has failed to receive the PDCCH scheduling the CBG-based transmission or the TB-based transmission based on the counter-DAI and/or the total-DAI is similar to the first embodiment described above. However, if the received common-DAI indicates a predetermined value and no PDCCH for scheduling a PDSCH of a specific transmission scheme is received, the user equipment may determine that the PDSCH of the specific transmission scheme is not scheduled. When generating the HARQ-ACK bit sequence, the user equipment may not multiplex the HARQ-ACK bit sequence for the specific transmission scheme that is determined not to be scheduled. For example, if the common total-DAI indicates a predetermined value and no PDCCH for scheduling the TB-based transmission is received, the HARQ-ACK bit sequence generated by the user equipment may be configured by excluding the TB-based HARQ-ACK bit sequence. Similarly, if the common total-DAI indicates a predetermined value and no PDCCH for scheduling the CBG-based transmission is received, the HARQ-ACK bit sequence generated by the user equipment may be configured by excluding the CBG-based HARQ-ACK bit sequence. On the other hand, if no PDCCH scheduling the PDSCH of a specific transmission scheme is received but the common total-DAI does not indicate a predetermined value, the user equipment may determine that the PDSCH of the specific transmission scheme has been scheduled but the user equipment has failed to receive the PDSCH. Accordingly, when generating the HARQ-ACK bit sequence, the user equipment may multiplex the HARQ-ACK bit sequence for the corresponding transmission scheme. According to an embodiment of the present invention, when a 2-bit total-DAI is used, the predetermined value may be binary '11'. In addition, when a 3-bit total-DAI is used, the predetermined value may be '011' or '111'. In addition, according to an embodiment of the present invention, the method of not multiplexing the HARQ-ACK bit sequence for a specific transmission scheme may be applied only when the HARQ-ACK bit sequence is transmitted through the PUSCH. That is, when the common total-DAI indicates a predetermined value and no PDCCH for scheduling a PDSCH of a specific transmission scheme is received, and a HARQ-ACK bit sequence is transmitted through a PUSCH, then the user equipment may not multiplex the HARQ-ACK bit sequence for the specific transmission scheme.

Meanwhile, according to the third embodiment of the present invention, a mismatch may occur in the total-DAI for a specific transmission scheme because the common total-DAI is used. Accordingly, in the case of a specific transmission scheme, the user equipment may generate a HARQ-ACK bit sequence based on the total number information according to the common total-DAI value, unlike the total number of PDSCHs scheduled for the specific transmission scheme. For example, if the decoding of the PDCCH transmitted through the component carriers #1 and #4 in which the TB-based transmission is scheduled is successful, the user equipment may receive values of 0 and 1 as counter-DAIs for the TB-based transmission, respectively. Meanwhile, the user equipment receives a value of 3 as a total-DAI for the TB-based transmission. Since 3 is received as the total-DAI value for the TB-based transmission but the counter-DAI value of the last PDCCH successfully received among the PDCCHs scheduling the TB-based transmission is 1, the difference between the total-DAI value and the counter-DAI value of the last PDCCH is 2. Accordingly, the user equipment may identify that the reception of two PDCCHs scheduling the TB-based transmission has failed after the last PDCCH. On the other hand, since the base station knows the actual total number of scheduled TB-based PDSCHs unlike the common total-DAI value, the base station may ignore the NACK transmitted due to the mismatch.

Figure 25:
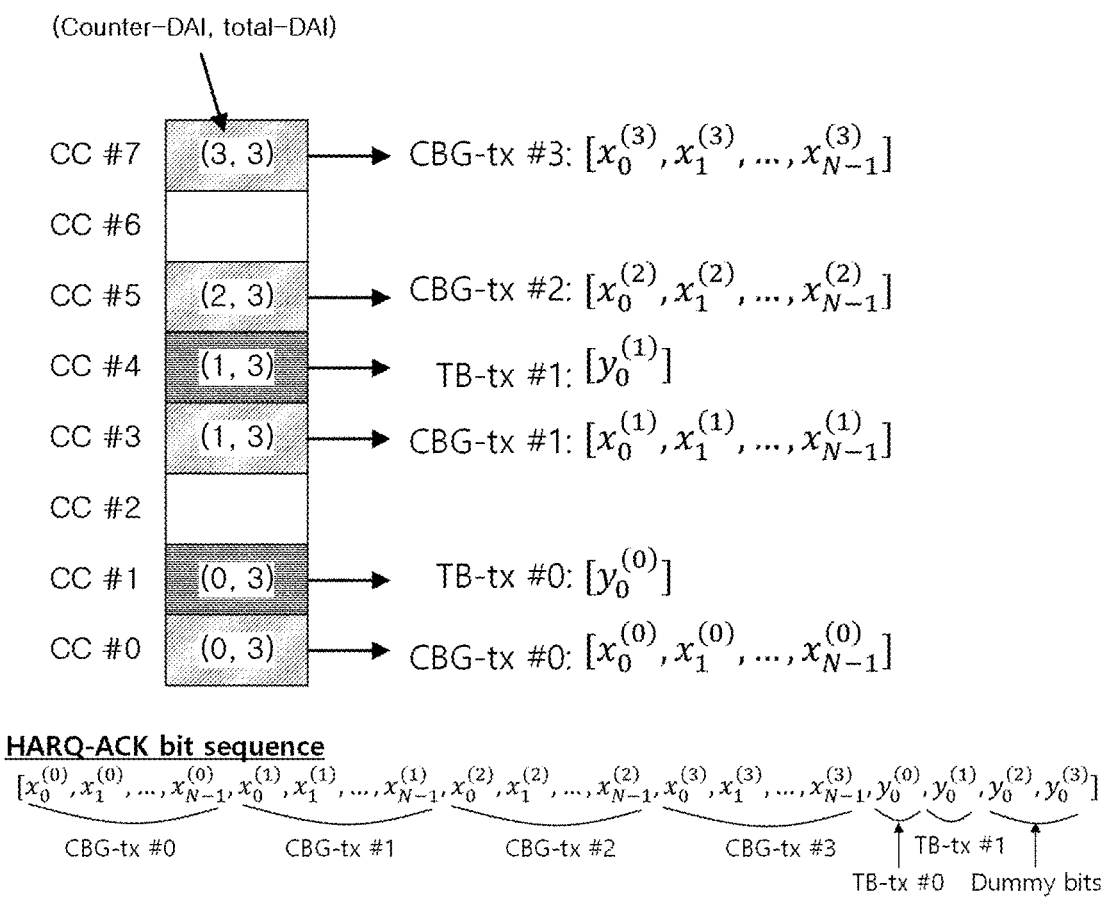
FIGS. 25 and 26 illustrate embodiments of generating a HARQ-ACK bit sequence based on a DAI signaled according to the third embodiment described above.
Figure 26:
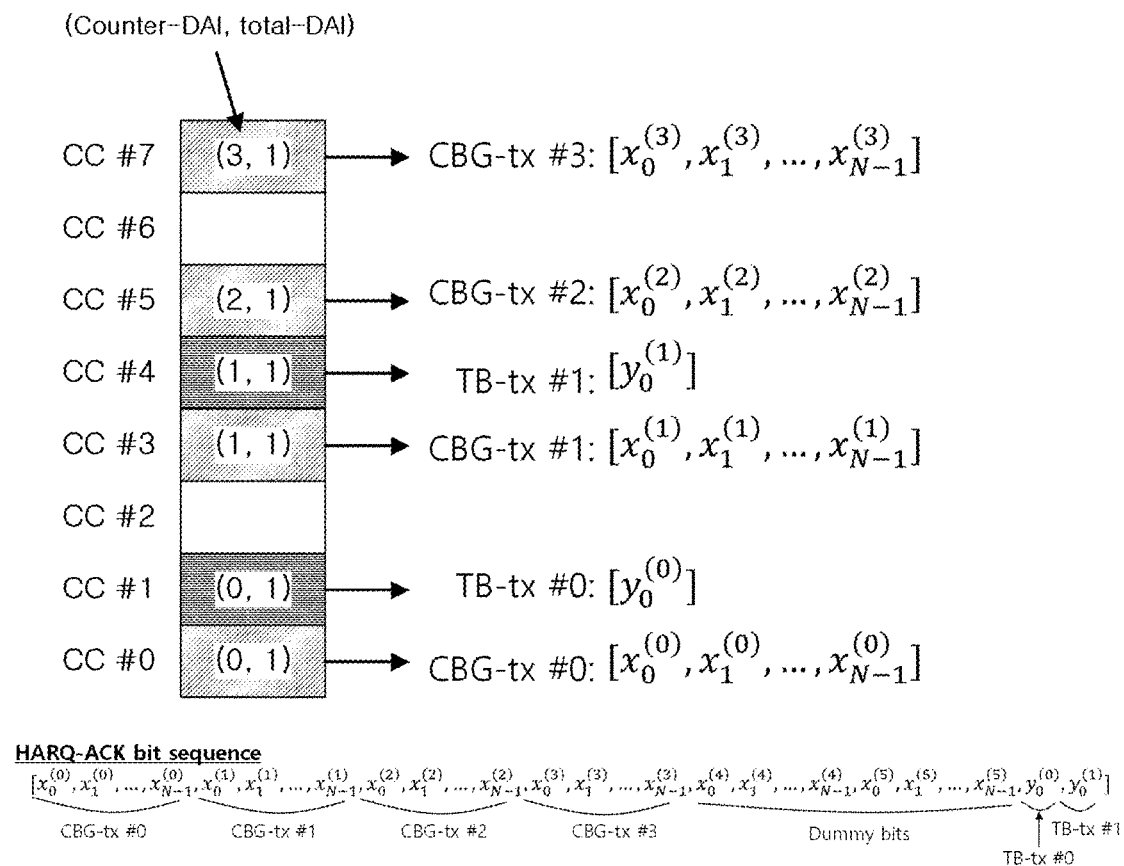

FIGS. 25 and 26 illustrate embodiments of generating a HARQ-ACK bit sequence based on a DAI signaled according to the third embodiment described above. FIG. 25 illustrates an embodiment in which the common total-DAI value represents the total number of CBG-based PDSCHs, and FIG. 26 illustrates an embodiment in which the common total-DAI value represents the total number of TB-based PDSCHs. The method of generating the HARQ-ACK bit sequence based on the DAI signaled according to the third embodiment of the present invention is similar to the first embodiment described with reference to FIG. 22. However, if the common total-DAI indicates a predetermined value and no PDCCH for scheduling a PDSCH of a specific transmission scheme is received, the user equipment may not multiplex the HARQ-ACK bit sequence for the specific transmission scheme when generating a HARQ-ACK bit sequence.

First, referring to FIG. 25, the common total-DAI value indicates the total number of CBG-based PDSCHs, and a value of the total-DAI field is 3. If the total-DAI field consists of 2 bits, it may be interpreted that the total number of CBG-based PDSCHs scheduled for the entire component carriers is $2^{2}*n+3+1=4*(n+1)$, and the total number of TB-based PDSCHs scheduled for the entire component carriers is $2^{2}*m+3+1=4(m+1)$ (where n and m are nonnegative integers). The user equipment may generate a CBG-based HARQ-ACK bit sequence and a TB-based HARQ-ACK bit sequence, respectively, and combine two HARQ-ACK bit sequences to configure an entire HARQ-ACK bit sequence. According to the embodiment of FIG. 25, since the value of the total-DAI field is 3, the TB-based HARQ-ACK bit sequence may include HARQ-ACK $[y_0^{(2)}, y_0^{(3)}]$ for virtual TB-based PDSCHs (i.e., PDSCH TB-tx #2, #3) in addition to 2 TB-based PDSCHs (that is, PDSCH TB-tx #0, #1). Here, the virtual PDSCH means a PDSCH on which transmission is not actually performed. The user equipment may configure the entire HARQ-ACK bit sequence by attaching the CBG-based HARQ-ACK bit sequence after the TB-based HARQ-ACK bit sequence. Referring to FIG. 25, the HARQ-ACK bit sequence configured by the user equipment is $[x_0^{(0)}, x_1^{(0)}, \ldots, x_{N-1}^{(0)}, x_0^{(1)}, x_1^{(1)}, \ldots, x_{N-1}^{(1)}, x_0^{(2)}, x_1^{(2)}, \ldots, x_{N-1}^{(2)}, x_0^{(3)}, x_1^{(3)}, \ldots, x_{N-1}^{(3)}, y_0^{(0)}, y_0^{(1)}, y_0^{(2)}, y_0^{(3)}]$. Here, the last two bits $[y_0^{(2)}, y_0^{(3)}]$ of the TB-based HARQ-ACK bit sequence are dummy bits with useless information for preventing an error in HARQ-ACK bit sequence interpretation between the base station and the user equipment.

Next, referring to FIG. 26, the common total-DAI value indicates the total number of TB-based PDSCHs, and a value of the total-DAI field is 1. If the total-DAI field consists of 2 bits, it may be interpreted that the total number of CBG-based PDSCHs scheduled for the entire component carriers is $2^{2}*n+1+1=4*n+2$, and the total number of TB-based PDSCHs scheduled for the entire component carriers is $2^{2}*m+1+1=4m+2$ (where n and m are nonnegative integers). The user equipment may generate a CBG-based HARQ-ACK bit sequence and a TB-based HARQ-ACK bit sequence, respectively, and combine two HARQ-ACK bit sequences to configure an entire HARQ-ACK bit sequence. According to the embodiment of FIG. 26, since the value of the total-DAI field is 1, the TB-based HARQ-ACK bit sequence may include HARQ-ACK $[x_0^{(4)}, x_1^{(4)}, \ldots, x_{N-1}^{(4)}, x_0^{(5)}, x_1^{(5)}, \ldots, x_{N-1}^{(5)}]$ for virtual CBG-based PDSCHs (i.e., PDSCH CBG-tx #4, #5) in addition to 4 CBG-based PDSCHs (that is, PDSCH CBG-tx #0, #1, #2, #3). The user equipment may configure the entire HARQ-ACK bit sequence by attaching the CBG-based HARQ-ACK bit sequence after the TB-based HARQ-ACK bit sequence. Referring to FIG. 26, the HARQ-ACK bit sequence configured by the user equipment is $[x_0^{(0)}, x_1^{(0)}, \ldots, x_{N-1}^{(0)}, x_0^{(1)}, x_1^{(1)}, \ldots, x_{N-1}^{(1)}, x_0^{(2)}, x_1^{(2)}, \ldots, x_{N-1}^{(2)}, x_0^{(3)}, x_1^{(3)}, \ldots, x_{N-1}^{(3)}, x_0^{(4)}, x_1^{(4)}, \ldots, x_{N-1}^{(4)}, x_0^{(5)}, x_1^{(5)}, \ldots, x_{N-1}^{(5)}, y_0^{(0)}, y_0^{(1)}]$. Here, the last 2N bits $[x_0^{(4)}, x_1^{(4)}, \ldots, x_{N-1}^{(4)}, x_0^{(5)}, x_1^{(5)}, \ldots, x_{N-1}^{(5)}]$ of the CBG-based HARQ-ACK bit sequence are dummy bits with useless information for preventing an error in HARQ-ACK bit sequence interpretation between the base station and the user equipment.

Figure 27:
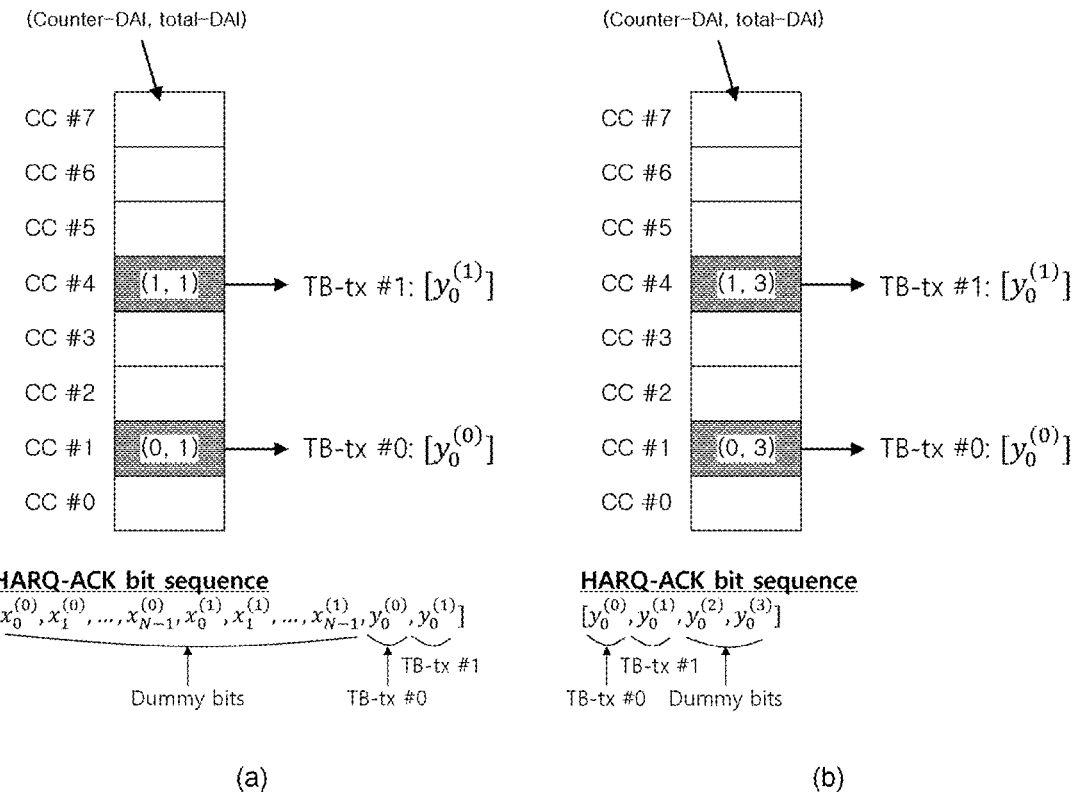
FIG. 27 illustrates another embodiment of generating a HARQ-ACK bit sequence based on a DAI signaled according to the third embodiment described above.

FIG. 27 illustrates another embodiment of generating a HARQ-ACK bit sequence based on a DAI signaled according to the third embodiment described above. As described above, according to an additional embodiment of the present invention, only PDSCH of any one of the CBG-based transmission and the TB-based transmission may be scheduled. In this case, in order to signal that only PDSCH of any one transmission scheme is scheduled, the total-DAI value may be set to a predetermined value 3 (i.e., binary '11'). In addition, in the embodiment of FIG. 27, it is assumed that TB-based PDSCH is transmitted through component carriers #1 and #4, and CBG-based PDSCH is not scheduled.

First, FIG. 27(a) shows an embodiment in which the value of the total-DAI field indicates the total number of TB-based PDSCHs. Since the number of scheduled TB-based PDSCHs for entire component carriers is 2, the value of the total-DAI field is set to 1. In this case, the total number of CBG-based PDSCHs scheduled for the entire component carriers may be interpreted as 2. Accordingly, the user equipment may generate 2*N-bit HARQ-ACK $[x_0^{(0)}, x_1^{(0)}, \ldots, x_{N-1}^{(0)}, x_0^{(1)}, x_1^{(1)}, \ldots, x_{N-1}^{(1)}]$ for two virtual CBG-based PDSCHs. Since the user equipment can detect only the PDCCH scheduling the TB-based PDSCH, the HARQ-ACK of the 2*N-bit may be set to all NACK as dummy bits.

Next, FIG. 27(b) shows an embodiment in which the value of the total-DAI field indicates a predetermined value representing that a PDSCH of a specific transmission scheme is not scheduled. Here, the predetermined value is 3 (i.e., binary '11'). Since the received total-DAI indicates the predetermined value and no PDCCH for scheduling the CBG-based PDSCH is received, the user equipment may determine that the CBG-based PDSCH is not scheduled. Accordingly, the user equipment may generate the entire HAQR-ACK bit sequence including only the TB-based HARQ-ACK bit sequence except for the CBG-based HARQ-ACK bit sequence. In this case, since the value of the total-DAI field is 3, the user equipment may interpret that the total number of TB-based PDSCHs scheduled for the entire component carriers is 4. However, since the user equipment can actually receive two TB-based PDSCHs, it may generate 2-bit HARQ-ACK $[y_0^{(2)}, y_0^{(3)}]$ for two virtual TB-based PDSCHs. Since the user equipment cannot receive the PDCCH scheduling the virtual TB-based PDSCHs, the 2-bit HARQ-ACK may be set to all NACK as dummy bits.

Meanwhile, in the above embodiments, it is assumed that one HARQ-ACK bit is generated per one TB in the TB-based HARQ-ACK bit sequence, and N HARQ-ACK bits are generated per one TB in the CBG-based HARQ-ACK bit sequence. In the following embodiments, it can be assumed that any one of 1 to N HARQ-ACK bit(s) per one TB is generated in the CBG-based HARQ-ACK bit sequence. For example, the length of the HARQ-ACK bit(s) for the CBG-based PDSCH may be determined based on the number of CBG(s) actually scheduled and transmitted in the PDSCH. In addition, in the following embodiments, it can be assumed that the TB-based transmission consists of 1 CBG-based transmission. That is, each embodiment may be described by assuming that a PDSCH composed of 1 TB is a PDSCH composed of 1 CBG, and a PDSCH composed of 2 TBs is a PDSCH composed of 2 CBGs. Thus, the separate expression of TB-based transmission or CBG-based transmission may be omitted. For reference, the user equipment may identify, through the information of the PDCCH, whether the TB-based transmission or the CBG-based transmission is applied to the PDSCH scheduled by the PDCCH.

Figure 28:
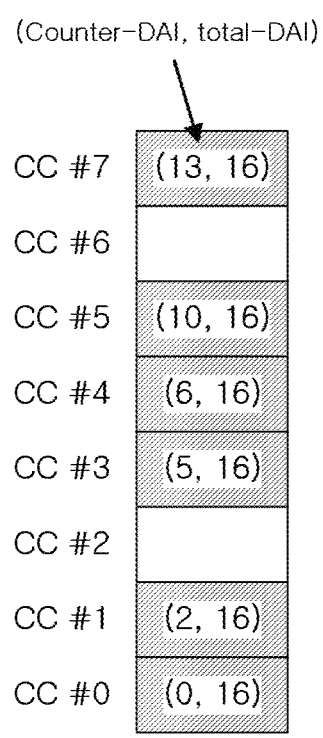
FIG. 28 illustrates a DAI signaling method according to the fourth embodiment of the present invention.

FIG. 28 illustrates a DAI signaling method according to the fourth embodiment of the present invention. According to the fourth embodiment of the present invention, the base station may generate a counter-DAI value and a total-DAI value based on the number of scheduled CBGs, and transmit the same through the counter-DAI field and the total-DAI field. That is, the counter-DAI represents the accumulated number of CBG(s) scheduled from the first component carrier (i.e., component carrier #0) to the previous component carrier. In addition, the total-DAI represents the total number of scheduled CBGs for entire component carriers. Referring to FIG. 28, a PDSCH may be transmitted to a user equipment through component carriers #0, #1, #3, #4, #5, and #7. In this case, the number of CBG(s) transmitted through component carriers #0, #1, #3, #4, #5, and #7 may be 2, 3, 1, 4, 3, and 3, respectively. Since the total number of CBGs scheduled for the entire component carriers is 16, the values of the (counter-DAI, total-DAI) fields of each PDCCH for component carriers #0, #1, #3, #4, #5 and #7 may be (0, 16), (2, 16), (5, 16), (6, 16), (10, 16) and (13, 16), respectively.

When the user equipment receives the PDCCH, the user equipment may identify, through the CBG scheduling information included in the PDCCH, the number of CBGs included in the PDSCH scheduled by the PDCCH. In addition, the user equipment may identify the total number of CBGs scheduled for the entire component carriers through a total-DAI value, and identify a transmission order of CBGs included in a PDSCH scheduled by the corresponding PDCCH through a counter-DAI value. If the PDSCH scheduled by the current PDCCH contains k CBG(s) and the values of the (counter-DAI, total-DAI) fields are (C, T), the PDSCHs scheduled for the entire component carriers include total of T CBGs and the CBG(s) included in the PDSCH scheduled by the current PDCCH are the C+1-st to C+k-th CBG(s) among the total T CBGs. For example, when the user equipment successfully receives the PDCCH scheduling the PDSCH transmitted through the component carrier #3, the user equipment may identify, based on the CBG scheduling information included in the PDCCH, that the PDSCH transmitted through the component carrier #3 includes 1 CBG. In addition, the user equipment may identify, through values (5, 16) of the received (counter-DAI, total-DAI) fields, that a total of 16 CBGs are scheduled for the entire component carriers and the CBG included in the PDSCH transmitted through component carrier #3 is the sixth CBG among the total 16 CBGs.

The user equipment may generate a HARQ-ACK bit sequence in the following manner. First, the length of the HARQ-ACK bit sequence may be determined based on the total-DAI value. If the total-DAI field consists of B bits and the value of the total-DAI field is T, the length of the HARQ-ACK bit sequence may be $2^B * n + T$. Here, n is a nonnegative integer, and may be a minimum value that allows HARQ-ACK bits for CBGs included in PDSCHs scheduled by the successfully received PDCCHs to be included in the HARQ-ACK bit sequence. The user equipment may determine the position of the HARQ-ACK bit(s) for the CBGs scheduled by the corresponding PDCCH based on the counter-DAI value obtained from the successfully received PDCCH and the number k of the scheduled CBG(s). That is, when the value of the counter-DAI field is C, the position of the HARQ-ACK bit(s) in the HARQ-ACK bit sequence may be from the C+1-st to C+k-th. If the counter-DAI field consists of A bits and the value of the counter-DAI field is C, the available HARQ-ACK bit(s) positions are from $2^A * m + C + 1$-th to $2^A * m + C + k$-th. Here, m is a nonnegative integer. Meanwhile, a bit to which HARQ-ACK bit(s) is not mapped among the HARQ-ACK bit sequence may be set to NACK.

Meanwhile, according to the fourth embodiment described above, when the user equipment successfully receives the PDCCH, the total number of CBGs scheduled for the entire component carriers and the transmission order of CBGs included in the PDSCH scheduled by the corresponding PDCCH may be identified. However, since various numbers of CBGs can be transmitted through one PDSCH, when the user equipment identifies failure of receiving a plurality of CBGs, it cannot identify the number of PDSCHs which are failed to be received.

Figure 29:
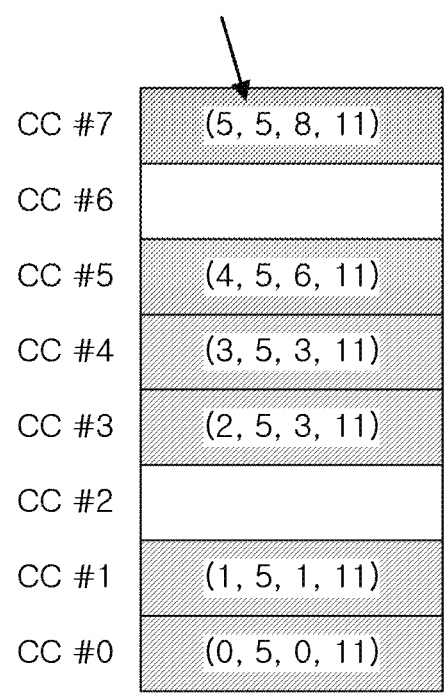
FIG. 29 illustrates a DAI signaling method according to the fifth embodiment of the present invention.

FIG. 29 illustrates a DAI signaling method according to the fifth embodiment of the present invention. According to the fifth embodiment of the present invention, the base station generates the first counter-DAI (i.e., counter-DAI #1) value and the first total-DAI (i.e., total-DAI #1) value based on the number of scheduled PDSCHs and generate the second counter-DAI (i.e., counter-DAI #2) value and the second total-DAI (i.e., total-DAI #2) value based on the number of CBGs. The base station may transmit the generated DAI values through the first counter-DAI field, the first total-DAI field, the second counter-DAI field, and the second total-DAI field, respectively.

First, the first counter-DAI represents the accumulated number of PDSCH(s) scheduled from the first component carrier (i.e., component carrier #0) to the previous component carrier. In this case, if the value of the first counter-DAI is C, the accumulated number of PDSCH(s) scheduled up to the previous component carrier may be C (i.e., the accumulated number of PDSCH(s) scheduled up to the current component carrier is C+1). In addition, the first total-DAI represents the total number of scheduled PDSCHs for the entire component carriers. If the value of the first total-DAI is T, the total number of PDSCHs scheduled for the entire component carriers may be T+1.

Next, the second counter-DAI is determined based on the accumulated number of CBG(s) scheduled from the first component carrier (i.e., component carrier #0) to the previous component carrier. In addition, the second total-DAI is determined based on the total number of scheduled CBGs for the entire component carriers. According to an embodiment of the present invention, in order to reduce the signaling overhead, the values of the second counter-DAI field and the second total-DAI field may be set by subtracting the value of the first counter-DAI field and the value of the first total-DAI field, respectively, from the information to be signaled. For example, if the number of CBGs scheduled up to the previous component carrier is P and the first counter-DAI value of the current component carrier is C1, the second counter-DAI value C2 of the current component carrier may be set to C2=P−C1. Further, if the total number of CBGs scheduled for the entire component carriers is Q and the first total-DAI value is T1, the second total-DAI value T2 may be set to T2=Q−T1.

In the embodiment of FIG. 29, the situation in which the CBG(s) are transmitted through each component carrier is the same as in the fourth embodiment described above. In this case, values of the (first counter-DAI, first total-DAI, second counter-DAI, second total-DAI) fields of each PDCCH for component carriers #0, #1, #3, #4, #5, and #7 are (0, 5, 0, 11), (1, 5, 1, 11), (2, 5, 3, 11), (3, 5, 3, 11), (4, 5, 6, 11) and (5, 5, 8, 11).

When the user equipment receives the PDCCH, the user equipment may identify, through the CBG scheduling information included in the PDCCH, the number of CBGs included in the PDSCH scheduled by the PDCCH. In addition, the user equipment may identify the total number of PDSCHs scheduled for the entire component carriers through the first total-DAI value, and identify a transmission order of PDSCHs scheduled by the corresponding PDCCH through the first counter-DAI value. In addition, the user equipment may identify the total number of CBGs scheduled for the entire component carriers through the second total-DAI value, and identify a transmission order of CBGs included in a PDSCH scheduled by the corresponding PDCCH through the second counter-DAI value. If the PDSCH scheduled by the current PDCCH includes k CBG(s) and the values of the (first counter-DAI, first total-DAI, second counter-DAI, second total-DAI) fields are (C1, T1, C2, T2), the total number of PDSCHs scheduled for the entire component carriers is T1+1 and the total number of CBGs scheduled for the entire component carriers is T1+T2. In addition, the order of PDSCH scheduled by the current PDCCH is C1-th and the CBGs included in the PDSCH are C1+C2+1-st to C1+C2+k-th CBGs among a total of T1+T2 CBGs.

If the first counter-DAI value does not increase sequentially (i.e., not in the order of 0->1->2->3 . . . ) as the component carrier index increases, the user equipment determines that reception of some PDCCHs has failed. In addition, if the first counter-DAI value and the first total-DAI value of the last successfully received PDCCH are not equal to each other, the user equipment may determine that reception of at least one PDCCH has failed after the last PDCCH. In this case, the number of PDCCHs which are failed to be received after the last successfully received PDCCH may be identified through a difference between the first total-DAI value and the first counter-DAI value of the last PDCCH.

The user equipment may generate a HARQ-ACK bit sequence in the following manner. First, the length of the HARQ-ACK bit sequence may be determined based on the sum of the first total-DAI value and the second total-DAI value. The user equipment may determine the position of the HARQ-ACK bit(s) for the CBGs scheduled by the corresponding PDCCH based on the first counter-DAI value and the second counter-DAI value obtained from the successfully received PDCCH and the number k of the scheduled CBG(s). That is, when the values of the (first counter-DAI, first total-DAI, second counter-DAI, second total-DAI) fields are (C1, T1, C2, T2), the position of the HARQ-ACK bit(s) in the HARQ-ACK bit sequence may be from the C1+C2+1-st to the C1+C2+k-th. Meanwhile, a bit to which HARQ-ACK bit(s) is not mapped among the HARQ-ACK bit sequence may be set to NACK.

Meanwhile, according to the fifth embodiment described above, when the user equipment successfully receives the PDCCH, the total number of CBGs scheduled for the entire component carriers and the transmission order of CBGs included in the PDSCH scheduled by the corresponding PDCCH may be identified. In addition, when the user equipment fails to receive at least one PDSCH, it may identify which PDSCH is failed to be received. However, according to the present embodiment, there may be a disadvantage in that the DCI overhead is high.

Figure 30:
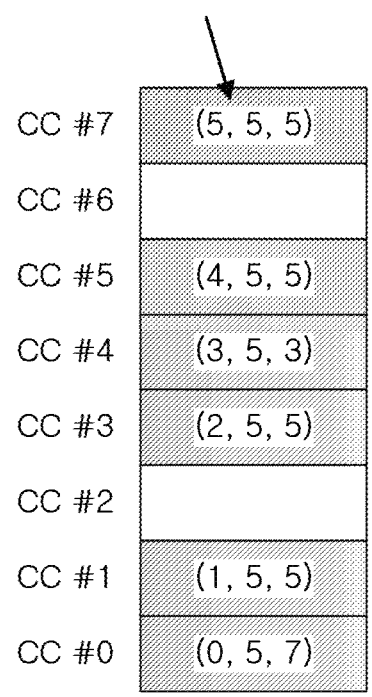
FIG. 30 illustrates a DAI signaling method according to the sixth embodiment of the present invention.

FIG. 30 illustrates a DAI signaling method according to the sixth embodiment of the present invention. According to the sixth embodiment of the present invention, the base station generates the first counter-DAI (i.e., counter-DAI #1) value and the first total-DAI (i.e., total-DAI #1) value based on the number of scheduled PDSCHs and generates the second counter-DAI (i.e., counter-DAI #2) value based on the number of CBGs. The base station may transmit the generated DAI values through the first counter-DAI field, the first total-DAI field, and the second counter-DAI field, respectively.

In the sixth embodiment of the present invention, the definitions of the first counter-DAI and the first total-DAI are the same as those in the fifth embodiment described above. However, the second counter-DAI is determined based on the number of CBG(s) scheduled in K PDSCH(s) prior to the current component carrier. According to an embodiment of the invention, K PDSCHs prior to the current component carrier may be determined cyclically. That is, if total of k PDSCHs are scheduled from the first component carrier (i.e., component carrier #0) to the previous component carrier (where k<K), then the K PDSCHs may include k PDSCHs from the first component carrier to the previous component carrier and K−k PDSCHs in reverse order from the last component carrier. According to an embodiment, the value of K may be determined based on the value of the first total-DAI, that is, the total number of CBGs scheduled for the entire component carriers. For example, when the value of the first total-DAI is 1, 2 or 3, respectively, the value of K may be set to 0, 1 or 2. In addition, when the value of the first total DAI is greater than 3, the value of K may be set to 3. According to an embodiment of the present invention, in order to reduce signaling overhead, the value of the second counter-DAI field may be set by subtracting K from the number of CBG(s) scheduled in K PDSCH(s) prior to the current component carrier.

In the embodiment of FIG. 30, the situation in which the CBG(s) are transmitted through each component carrier is the same as the fourth embodiment described above. In this case, the value of K may be set to 3, and the values of the (first counter-DAI, first total-DAI, second counter-DAI) fields are (0, 5, 7), (1, 5, 5), (2, 5, 5), (3, 5, 3), (4, 5, 5) and (5, 5, 5).

The method of determining that the user equipment has failed to receive some PDCCHs is the same as that of the fifth embodiment. In addition, in the sixth embodiment, since the second counter-DAI is determined based on the number of CBG(s) scheduled in K PDSCH(s) prior to the current component carrier, the user equipment may identify, based on the second counter DAI, the number of CBG(s) included in the PDSCH scheduled by the PDCCH which is failed to be received. For example, it may be assumed that the user equipment fails to receive a PDCCH in which a value of the first counter-DAI is 2, and successfully receives the remaining PDCCHs. Since the value of 2 does not exist among the first counter-DAI values of the successfully received PDCCHs, the user equipment may identify a reception failure of the PDCCH in which the value of the first counter-DAI is 2. The number of CBG(s) included in the PDSCH scheduled by the PDCCH in which the value of the first counter-DAI is 2 may be identified based on a value obtained by subtracting the number of CBGs included in PDSCHs scheduled by the PDCCHs in which the value of the first counter-DAI is 0 and 1 from the second counter-DAI value of the PDCCH in which the value of the first counter-DAI is 3. In the embodiment of FIG. 30, the second counter-DAI value of the PDCCH in which the value of the first counter-DAI is 3 is 3, and the number of CBGs included in PDSCHs scheduled by the PDCCHs in which the value of the first counter-DAI is 0 and 1 are 2 and 3, respectively. Accordingly, the number x of CBGs included in the PDSCH scheduled by the PDCCH in which the value of the first counter-DAI is 2 satisfies (2+3+x)−K=3. Here, since K is 3, the user equipment may identify that x is 1.

Figure 31:
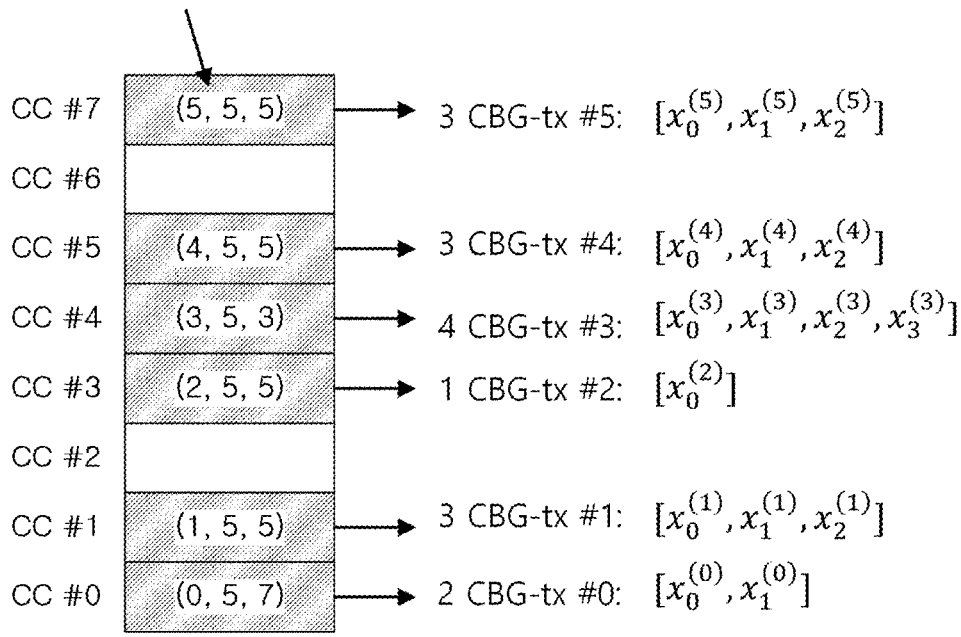
FIG. 31 illustrates an embodiment of generating a HARQ-ACK bit sequence based on a DAI signaled according to the sixth embodiment described above.

FIG. 31 illustrates an embodiment of generating a HARQ-ACK bit sequence based on a DAI signaled according to the sixth embodiment described above. As in the above embodiments, the user equipment may identify the number of PDSCHs transmitted through the component carriers based on the first counter-DAI value and the first total-DAI value. In addition, the user equipment may identify the number of CBGs transmitted through each component carrier based on the second counter-DAI value. Accordingly, the user equipment may sequentially increase the value of the first counter-DAI field from 0 to the first total-DAI value, and generate a HARQ-ACK bit sequence by combining HARQ-ACK bits for the PDSCH scheduled by the corresponding PDCCH. However, when the value of K is 2 or more (for example, when K=2 or 3), the user equipment may cyclically increase the value of the first counter-DAI field from i, and generate a HARQ-ACK bit sequence by combining HARQ-ACK bits for the PDSCH scheduled by the corresponding PDCCH. In this case, in order to indicate the value of i, a header indicating configuration information of the HARQ-ACK bit sequence may be added at the beginning or the end of the HARQ-ACK bit sequence. That is, the HARQ-ACK bit sequence may include a header and a main bit sequence. The header indicates information on which PDSCH of HARQ-ACK bits the main bit sequence starts with.

Referring to FIG. 31, when the value of K is 2 or 3, the candidate of HARQ-ACK bit sequences that can be transmitted by the user equipment may be 4. Thus, the header consists of two bits and indicates which PDSCH of HARQ-ACK bits the main bit sequence starts with. For example, if the header indicates '00', the main bit sequence starts from the HARQ-ACK bits of the first PDSCH. Likewise, if the header indicates '01', '10' or '11', the main bit sequence starts from the HARQ-ACK bits of the second, third or fourth PDSCH, respectively.

Meanwhile, according to the sixth embodiment, when the user equipment successfully receives the PDCCH, the total number of PDSCHs scheduled for the entire component carriers and the transmission order of PDSCHs scheduled by the corresponding PDCCH may be identified. In addition, the user equipment may identify information on the number of CBGs through the second counter-DAI value. According to the sixth embodiment, since the second total-DAI field is not transmitted, the overhead of DCI signaling can be reduced compared to the fifth embodiment. However, since the header should be added to the HARQ-ACK bit sequence transmitted by the user equipment, the overhead of UCI transmission may increase.

Figure 32:
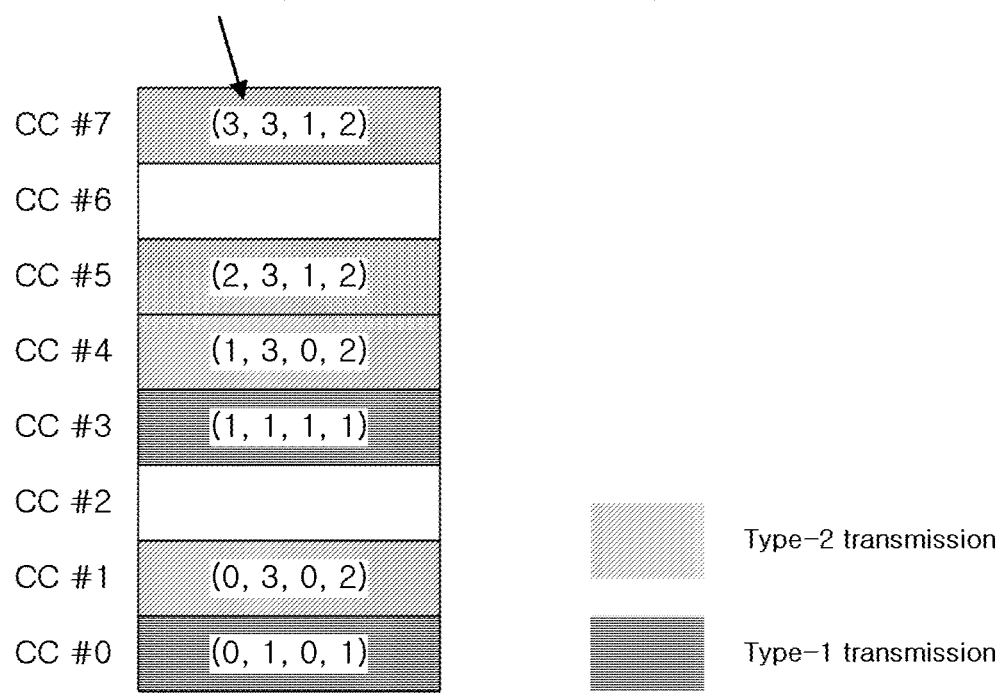
FIG. 32 illustrates a DAI signaling method according to the seventh embodiment of the present invention.

FIG. 32 illustrates a DAI signaling method according to the seventh embodiment of the present invention. According to the seventh embodiment of the present invention, the base station separates the transmission type into the first type transmission and the second type transmission according to the number of CBGs included in the scheduled PDSCH, and generates the first counter-DAI (i.e., counter-DAI #1) and the first total-DAI (i.e., total-DAI #1) values, and the second counter-DAI (i.e., counter-DAI #2) and the second total-DAI (i.e., total-DAI #2) values independently based on the number of PDSCHs for each transmission type. The base station may transmit DAI values of the same type as the transmission type of the PDSCH scheduled by the PDCCH through the first counter-DAI field, the first total-DAI field, the second counter-DAI field, and the second total-DAI field of the PDCCH, respectively. When the user equipment receives the PDCCH, the user equipment may identify, through the CBG scheduling information included in the PDCCH, the number of CBGs included in the PDSCH scheduled by the PDCCH. In addition, the user equipment may identify the transmission type of the PDSCH based on the number of CBGs included in the PDSCH. The user equipment interprets the values of the first counter-DAI field, the first total-DAI field, the second counter-DAI field, and the second total-DAI field received through the PDCCH as DAI values for the identified transmission type.

According to an embodiment of the present invention, the first type transmission is a transmission of a PDSCH composed of a predetermined number or less CBGs, and the second type transmission is a transmission of PDSCH composed of CBGs exceeding the predetermined number. According to an embodiment, the predetermined number may be $\lfloor N/2 \rfloor$ or $\lceil N/2 \rceil$. Here, N may be the maximum number of CBGs per TB configured in the user equipment, $\lfloor x \rfloor$ is the largest natural number less than or equal to x, and $\lceil x \rceil$ is the smallest natural number greater than or equal to x. In the following embodiments, it is assumed that the predetermined number is $\lfloor N/2 \rfloor$, but this may be replaced with $\lceil N/2 \rceil$ or other values according to the embodiment.

The DAI values for the first type transmission are applied to the PDSCH and CBG based on the first type transmission, and the definitions of the DAI values are the same as those in the fifth embodiment described above. Similarly, the DAI values for the second type transmission are applied to the PDSCH and CBG based on the second type transmission. However, in the DAI for the second type transmission, the first counter-DAI and the first total-DAI may be set in the same manner as in the fifth embodiment described above, but the second counter-DAI and the second total-DAI may be set to have granularity different from that according to the fifth embodiment. That is, since the minimum number of minimum CBGs included in the PDSCH in which the second type transmission is performed is $\lfloor N/2 \rfloor+1$, the second counter-DAI value and the second total-DAI value for the second type transmission is set by subtracting the value which is based on the minimum number to reduce the signaling overhead. More specifically, if the number of CBGs based on the second type transmission scheduled up to the previous component carrier is P and the first counter-DAI value of the current component carrier is C1, then the second counter-DAI value C2 of the current component carrier may be set to $C2=P-(\lfloor N/2 \rfloor+1)*C1$. Further, if the total number of CBGs based on the second type transmission scheduled for the entire component carriers is Q and the first total-DAI value is T1, then the second total-DAI value T2 may be set to $T2=Q-(\lfloor N/2 \rfloor+1)*(T1+1)$.

Referring to FIG. 32, a PDSCH may be transmitted to a user equipment through component carriers #0, #1, #3, #4, #5, and #7. In this case, the number of CBG(s) transmitted through component carriers #0, #1, #3, #4, #5, and #7 may be 2, 3, 1, 4, 3, and 4, respectively. If N=4, the PDSCHs scheduled in component carriers #0 and #3 are PDSCHs based on the first type transmission, and the PDSCHs scheduled in component carriers #1, #4, #5 and #7 are PDSCHs based on the second type transmission. Accordingly, the values of the (first counter-DAI, first total-DAI, second counter-DAI, second total-DAI) fields of each PDCCH for component carriers #0 and #3 in which the PDSCH based on the first type transmission is scheduled may be (0, 1, 0, 1) and (1, 1, 1, 1), respectively. Further, the values of the (first counter-DAI, first total-DAI, second counter-DAI, second total-DAI) fields of each PDCCH for component carriers #1, #4, #5, and #7 in which the PDSCH based on the second type transmission is scheduled may be (0, 3, 0, 2), (1, 3, 0, 2), (2, 3, 1, 2) and (3, 3, 1, 2), respectively. Table 12 shows a method for the user equipment to interpret the counter-DAI and the total-DAI generated according to the seventh embodiment of the present invention.

entire HARQ-ACK bit sequence by combining the HARQ-ACK bit sequence for the first type based transmission and the HARQ-ACK bit sequence for the second type based

TABLE 12

| | Interpretation of UE | | | |
|---|---|---|---|---|
| Detected PDCCH | $1^{st}$ counter-DAI: C1 | $1^{st}$ total-DAI: T1 | $2^{nd}$ counter-DAI: C2 | $2^{nd}$ total-DAI: T2 |
| PDCCH scheduled $1^{st}$ type PDSCH | Number of $1^{st}$ type PDSCHs scheduled from CC#0 to previous CC: C1 | Number of $1^{st}$ type PDSCHs scheduling in entire CC: T + 1 | Number of $1^{st}$ type CBGs included in PDSCHs from CC#0 to previous CC: C1 + C2 | Number of $1^{st}$ type CBGs included in PDSCHs of entire CC: T1 + T2 |
| PDCCH scheduling $2^{nd}$ type PDSCH | Number of $2^{nd}$ type PDSCHs scheduled from CC#0 to previous CC: C1 | Number of $2^{nd}$ type PDSCHs scheduled in entire CC: T + 1 | Number of $2^{nd}$ type CBGs included in PDSCHs from CC#0 to previous CC: ($\lfloor N/2 \rfloor$ + 1) * C1 + C2 | Number of $2^{nd}$ type CBGs included in FDSCHs of entire CC: ($\lfloor N/2 \rfloor$ + 1) * (T1 + 1) + T2 |

Referring to Table 12, the user equipment may identify, through the values of the first counter-DAI field and the first total-DAI field of the PDCCH, the number of PDSCHs of a corresponding transmission type scheduled to the component carriers and a transmission order of PDSCHs of the transmission type scheduled by the PDCCH. In addition, the user equipment may identify, through the values of the second counter-DAI field and the second total-DAI field of the PDCCH, the number of CBGs included in the PDSCHs of a corresponding transmission type scheduled to the component carriers and a transmission order of CBGs included in the PDSCHs of the transmission type scheduled by the PDCCH. If the PDSCH scheduled by the current PDCCH contains k CBG(s) and the transmission type is x (where x=1 or 2), and the values of the (first counter-DAI, first total-DAI, second counter-DAI, second total-DAI) fields are (C1, T1, C2, T2), then the total number of PDSCHs based on the type-x transmission scheduled for the entire component carriers is T1+1 and the order of the PDSCH based on the type-x transmission scheduled by the current PDCCH is C1+1-th. Further, CBGs included in the PDSCH based on type-x are CBGs from $M_x$*C1+C2+1-st to $M_x$*C1+C2+k-th. Here, $M_x$=1 when x=1, and $M_x$=$\lfloor N/2 \rfloor$+1 when x=2. Meanwhile, the method of determining that the user equipment has failed to receive some PDCCHs is the same as the above-described embodiments.

Figure 33:
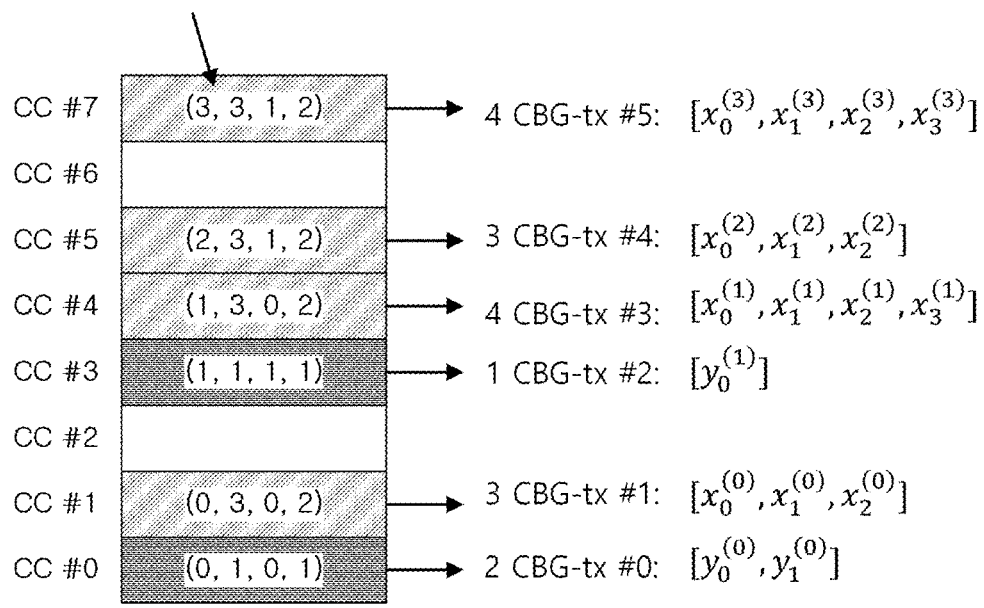
FIG. 33 illustrates an embodiment of generating a HARQ-ACK bit sequence based on a DAI signaled according to the seventh embodiment described above.
Figure 33:
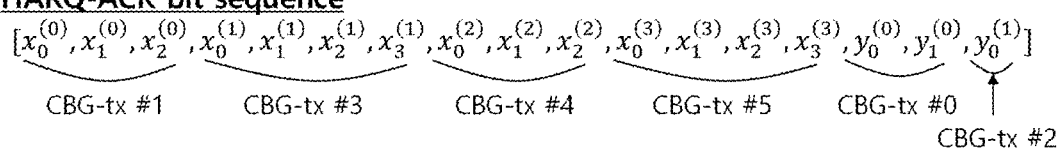

FIG. 33 illustrates an embodiment of generating a HARQ-ACK bit sequence based on a DAI signaled according to the seventh embodiment described above. First, the user equipment may generate the first type-based HARQ-ACK sequence by combining HARQ-ACKs for the PDSCH based on the first type transmission in the order of the first counter-DAI value. In addition, the user equipment may generate the second type-based HARQ-ACK sequence by combining HARQ-ACKs for the PDSCH based on the second type transmission in the order of the first counter-DAI value. In this case, 'NACK' may be used as the HARQ-ACK for the PDSCH in which the reception of the PDCCH has failed. According to an embodiment, if no PDCCH scheduling the first type based transmission is received, the HARQ-ACK bit sequence generated by the user equipment may be configured to exclude the HARQ-ACK bit sequence for the first type based transmission. Similarly, if no PDCCH scheduling the second type based transmission is received, the HARQ-ACK bit sequence generated by the user equipment may be configured to exclude the HARQ-ACK bit sequence for the second type based transmission. The user equipment may configure the entire HARQ-ACK bit sequence by combining the HARQ-ACK bit sequence for the first type based transmission and the HARQ-ACK bit sequence for the second type based transmission in a preset order. According to an embodiment, the user equipment may configure the entire HARQ-ACK bit sequence by appending the HARQ-ACK bit sequence for the first type based transmission to the HARQ-ACK bit sequence for the second type based transmission. Referring to FIG. 33, the HARQ-ACK bit sequence configured by the user equipment is [$x_0^{(0)}$, $x_1^{(0)}$, $x_2^{(0)}$, $x_0^{(1)}$, $x_1^{(1)}$, $x_2^{(1)}$, $x_3^{(1)}$, $x_0^{(2)}$, $x_1^{(2)}$, $x_2^{(2)}$, $x_0^{(3)}$, $x_1^{(3)}$, $x_2^{(3)}$, $x_3^{(3)}$, $y_0^{(0)}$, $y_1^{(0)}$, $y_0^{(1)}$]. However, the present invention is not limited thereto and the entire HARQ-ACK bit sequence may be configured by combining the bit sequences in the reverse order.

Meanwhile, according to the seventh embodiment, the transmission type may be separated into the first type transmission and the second type transmission according to the number of CBGs included in the PDSCH, and independent DAI values for each transmission type may be signaled to reduce the overhead of DCI. However, there is a disadvantage that the user equipment should always receive the PDCCH scheduling different transmission types.

Figure 34:
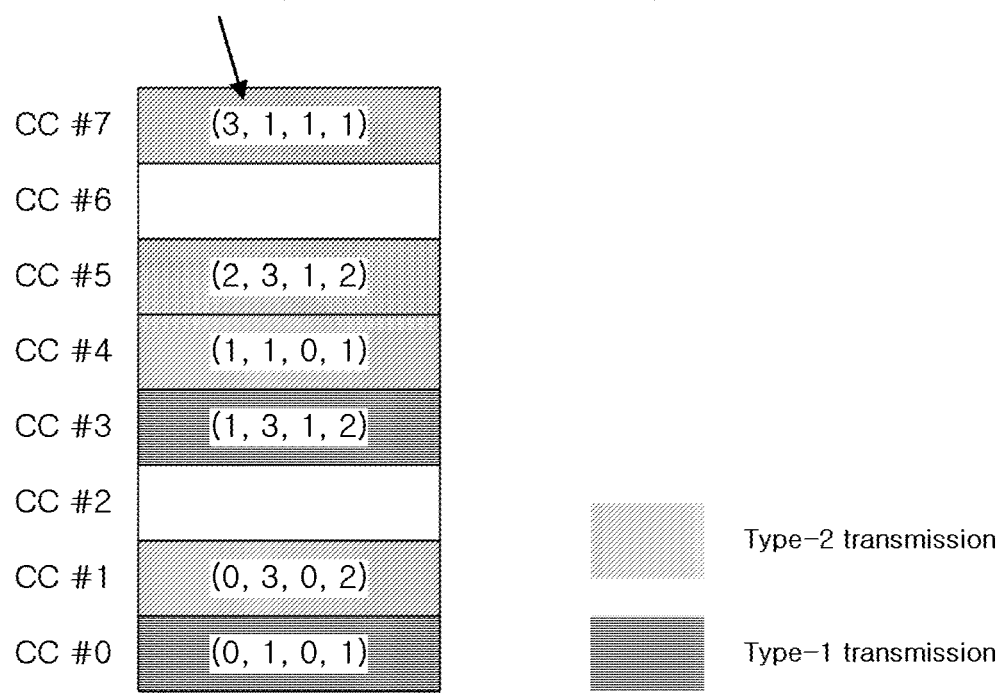
FIG. 34 illustrates a DAI signaling method according to the eighth embodiment of the present invention.

FIG. 34 is a diagram illustrating a DAI signaling method according to the eighth embodiment of the present invention. The eighth embodiment of the present invention may be performed by combining at least some components of the second embodiment and the seventh embodiment described above. That is, the base station separates the transmission type into the first type transmission and the second type transmission according to the number of CBGs included in the scheduled PDSCH, and generates the first counter-DAI (i.e., counter-DAI #1) and the first total-DAI (i.e., total-DAI #1) values, and the second counter-DAI (i.e., counter-DAI #2) and the second total-DAI (i.e., total-DAI #2) values independently based on the number of PDSCHs for each transmission type. In this case, when the first counter-DAI value is even, the base station may transmit the first total DAI value and the second total DAI value for the same type as the transmission type of the PDSCH scheduled by the PDCCH through the first total-DAI field and the second total-DAI field, respectively. However, when the first counter-DAI value is odd, the base station may transmit the first total DAI value and the second total DAI value for a type different from the transmission type of the PDSCH scheduled by the PDCCH through the first total-DAI field and the second total-DAI field, respectively. In this case, the definition of the DAI values is the same as in the seventh embodiment described above.

In the embodiment of FIG. 34, the situation in which the CBG(s) are transmitted through each component carrier is the same as the seventh embodiment described above.

PDSCHs scheduled on component carriers #0 and #3 are PDSCHs based on the first type transmission, and PDSCHs scheduled on component carriers #1, #4, #5 and #7 are PDSCHs based on the second type transmission. Accordingly, the values of the (first counter-DAI, first total-DAI, second counter-DAI, second total-DAI) fields of each PDCCH for component carriers #0 and #3 in which PDSCH based on the first type transmission is scheduled may be (0, 1, 0, 1) and (1, 3, 1, 2), respectively. Further, the values of the (first counter-DAI, first total-DAI, second counter-DAI, second total-DAI) fields of each PDCCH for component carriers #1, #4, #5 and #7 in which PDSCH based on the second type transmission is scheduled may be (0, 3, 0, 2), (1, 1, 0, 1), (2, 3, 1, 2) and (3, 1, 1, 1), respectively. Meanwhile, the method for generating the HARQ-ACK bit sequence based on the DAI signaled according to the eighth embodiment is the same as the embodiment of FIG. 33 described above.

Meanwhile, according to the eighth embodiment, the transmission type may be separated into the first type transmission and the second type transmission according to the number of CBGs included in the PDSCH, and independent DAI values may be signaled for each transmission type to reduce the overhead of DCI. In addition, the user equipment may know the number of PDSCHs and CBGs based on another transmission type even when only PDCCHs for scheduling PDSCHs based on one transmission type are received. However, the user equipment should always receive a plurality of PDCCHs indicating total-DAI for different types.

Figure 35:
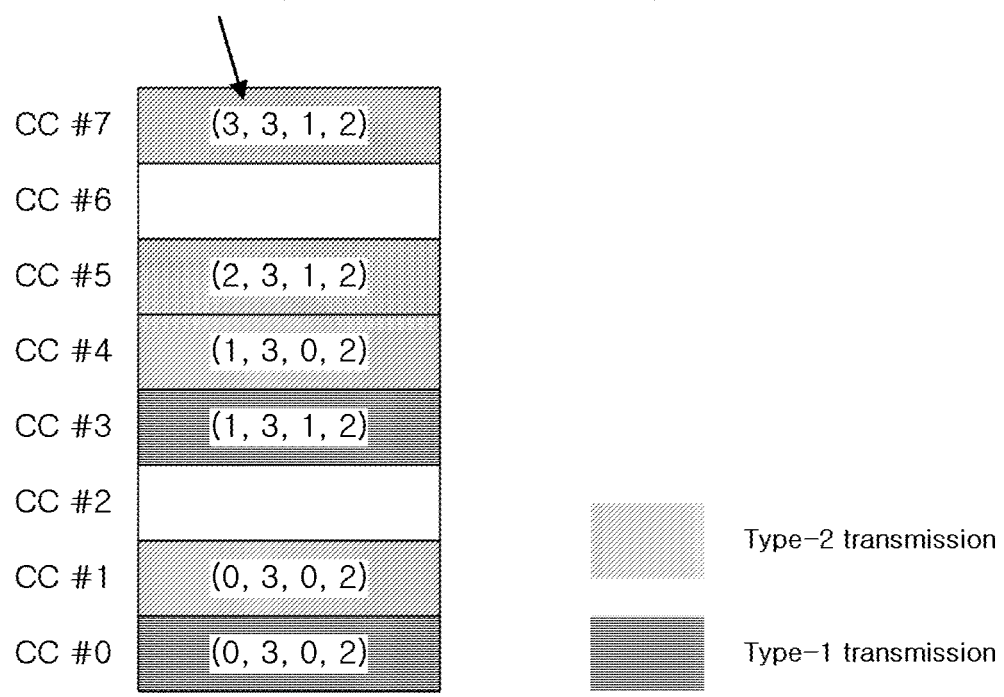
FIG. 35 illustrates a DAI signaling method according to the ninth embodiment of the present invention.

FIG. 35 is a diagram illustrating a DAI signaling method according to the ninth embodiment of the present invention. The ninth embodiment of the present invention can be performed by combining at least some components of the third embodiment and the seventh embodiment described above. That is, the base station separates the transmission type into the first type transmission and the second type transmission according to the number of CBGs included in the scheduled PDSCH, and generates the first counter-DAI (i.e., counter-DAI #1) value based on the number of PDSCHs and the second counter-DAI (i.e., counter-DAI #2) value based on the number of CBGs independently for each transmission type. In addition, the base station generates a common first total-DAI (i.e., total-DAI #1) value and a common second total-DAI (i.e., total-DAI #2) value that are used together for the two transmission types. The base station transmits the first counter-DAI value and the second counter-DAI value according to the transmission type of the PDSCH through the first counter-DAI field and the second counter DAI field of the PDCCH scheduling the corresponding PDSCH. In addition, the base station may transmit the common first total-DAI value and the common second total-DAI value through the first total-DAI field and the second total-DAI field of all PDCCHs regardless of the transmission type.

According to a further embodiment, when only PDSCH of any one transmission type is scheduled for the entire component carriers, the common first total DAI value may be determined as a predetermined value. According to an embodiment of the present invention, when a 2-bit total-DAI is used, the predetermined value may be binary '11'. In addition, when a 3-bit total-DAI is used, the predetermined value may be '011' or '111'. Meanwhile, the method of determining the first counter-DAI value and the second counter-DAI value is the same as that of the seventh embodiment described above.

In the embodiment of FIG. 35, the situation in which the CBG(s) are transmitted through each component carrier is the same as the seventh embodiment described above. In addition, it may be assumed that the common first total-DAI value and the common second total-DAI value are determined based on the number of PDSCHs and CBGs based on the second type transmission, respectively. Accordingly, the values of the (first counter-DAI, first total-DAI, second counter-DAI, second total-DAI) fields of each PDCCH for component carriers #0 and #3 in which the PDSCH based on the first type transmission is scheduled may be (0, 3, 0, 2) and (1, 3, 1, 2), respectively. Further, the values of the (first counter-DAI, first total-DAI, second counter-DAI, second total-DAI) fields of each PDCCH for component carriers #1, #4, #5, and #7 in which the PDSCH based on the second type transmission is scheduled may be (0, 3, 0, 2), (1, 3, 0, 2), (2, 3, 1, 2) and (3, 3, 1, 2), respectively.

Figure 36:
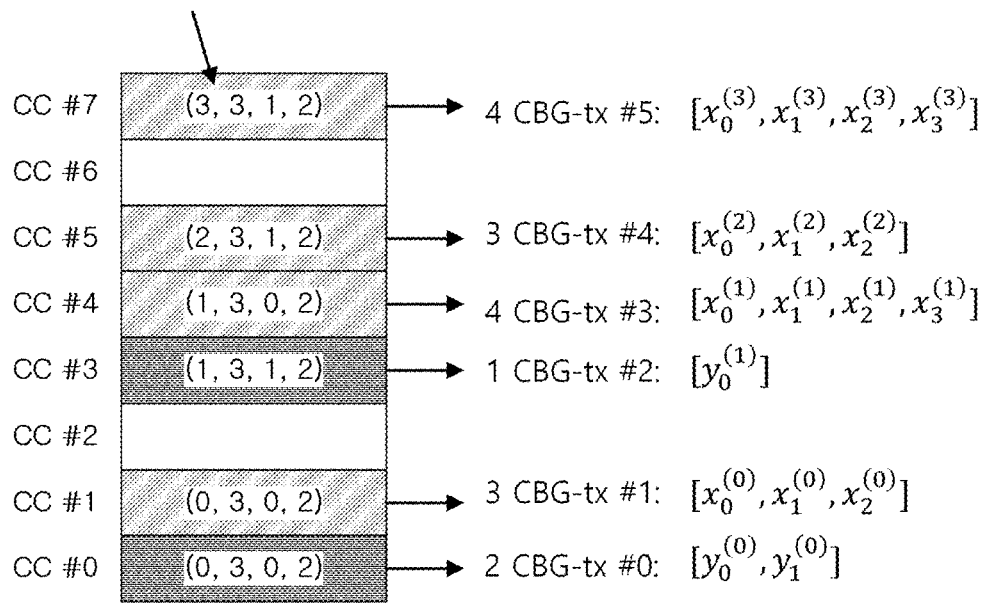
FIG. 36 illustrates an embodiment of generating a HARQ-ACK bit sequence based on a DAI signaled according to the ninth embodiment described above.

FIG. 36 illustrates an embodiment of generating a HARQ-ACK bit sequence based on a DAI signaled according to the ninth embodiment described above. The HAQR-ACK bit sequence may be generated in the same manner as in the embodiment of FIG. 33 described above. However, since (3, 2) is used instead of (1, 1) as the values of the (first total-DAI, second total-DAI) fields for the PDSCH based on the first type transmission, dummy HARQ-ACK [z0, z1, z2] for three virtual CBGs included in two virtual PDSCHs may be further included in the HARQ-ACK bit sequence.

Figure 37:
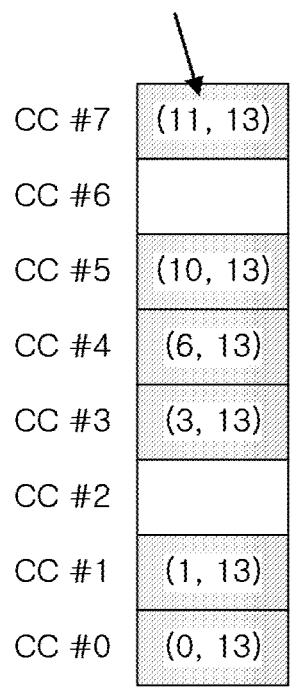
FIG. 37 illustrates a DAI signaling method according to the tenth embodiment of the present invention.

FIG. 37 illustrates a DAI signaling method according to the tenth embodiment of the present invention. When the base station configures the CBG-based transmission, the number of CBG(s) per one TB configured in each component carrier or cell may be different with each other. For example, the number of CBGs per TB may be configured to be 2 in component carrier #0, and the number of CBGs per TB may be configured to be 4 in component carrier #1. In addition, when the user equipment is configured in a transmission mode in which two TBs can be transmitted in one PDSCH, the number of CBG(s) per one TB may be equally set in the two TBs.

A user equipment configured in a transmission mode in which one TB can be transmitted in one PDSCH should transmit HARQ-ACK bit(s) to the base station based on the configured number of CBG(s). If a user equipment configured in a transmission mode in which two TBs can be transmitted in one PDSCH is configured not to perform spatial bundling, the user equipment should transmit HARQ-ACK bit(s) to the base station based on twice the configured number of CBG(s) per TB. On the other hand, if a user equipment configured in a transmission mode in which two TBs can be transmitted in one PDSCH is configured to perform spatial bundling, the user equipment should transmit HARQ-ACK bit(s) to the base station based on the configured number of CBG(s) per TB. In the following embodiment of the present invention, it is assumed that a user equipment is configured to perform spatial bundling or is configured in a transmission mode in which one TB can be transmitted in one PDSCH. Specific embodiments of the HARQ-ACK bundling method including the spatial bundling will be described later. However, the embodiment of the present invention can be extended to a user equipment configured in a transmission mode in which two TBs can be transmitted in one PDSCH and configured not to perform spatial bundling.

According to an embodiment of the present invention, the DCI of the PDCCH scheduling the PDSCH may include a counter-DAI and a total-DAI. In this case, the counter-DAI represents the accumulated number of CBG groups scheduled from the first component carrier (i.e., component carrier #0) to the previous component carrier, and the total-DAI represents the total number of CBG groups scheduled for the entire component carriers. Here, the CBG group is a group of predetermined S CBGs. According to an embodiment, TB-based PDSCH in the counter-DAI and total-DAI may be treated the same as CBG-based transmission consisting of S CBGs. That is, it can be assumed that the TB-based PDSCH includes one CBG group. Therefore, the user equipment should feedback the S-bit HARQ-ACK even though the TB-based PDSCH is received. The S-bit HARQ-ACK may be generated by repeating 1-bit TB-based HARQ-ACK, or by mapping NACK to the remaining bit(s). For example, if the total-DAI value is 3, the user equipment may determine that a total of 3*S CBGs have been transmitted through the entire component carriers. Therefore, the user equipment should transmit a total of 3*S-bit HARQ-ACK. If two TBs are transmitted in one PDSCH and the spatial bundling is not performed, the user equipment should transmit a total of 2*3*S-bit HARQ-ACKs.

Table 13 shows the number of CBG(s) indicated by each DAI value when the total-DAI field and the counter-DAI field consist of two bits. In addition, Table 14 shows the number of CBG(s) indicated by each DAI value when the total-DAI field and the counter-DAI field consist of 3 bits.

TABLE 13

| DAI, MSB, LSB | $V_{C-DAI}^{DL}$, c or $V_{T-DAI}^{DL}$ | Interpretation |
|---|---|---|
| 0, 0 | 1 | S * (4 * n + 1), n = 0, 1, 2, ... |
| 0, 1 | 2 | S * (4 * n + 2), n = 0, 1, 2, ... |
| 1, 0 | 3 | S * (4 * n + 3), n = 0, 1, 2, ... |
| 1, 1 | 4 | S * (4 * n + 4), n = 0, 1, 2, ... |

TABLE 14

| DAI, MSB, LSB | $V_{C-DAI}^{DL}$, c or $V_{T-DAI}^{DL}$ | Interpretation |
|---|---|---|
| 0, 0, 0 | 1 | S * (8 * n + 1), n = 0, 1, 2, ... |
| 0, 0, 1 | 2 | S * (8 * n + 2), n = 0, 1, 2, ... |
| 0, 1, 0 | 3 | S * (8 * n + 3), n = 0, 1, 2, ... |
| 0, 1, 1 | 4 | S * (8 * n + 4), n = 0, 1, 2, ... |
| 1, 0, 0 | 5 | S * (8 * n + 5), n = 0, 1, 2, ... |
| 1, 0, 1 | 6 | S * (8 * n + 6), n = 0, 1, 2, ... |
| 1, 1, 0 | 7 | S * (8 * n + 7), n = 0, 1, 2, ... |
| 1, 1, 1 | 8 | S * (8 * n + 8), n = 0, 1, 2, ... |

In Table 13 and Table 14, the subscript c indicates the index of the component carrier (or cell). That is, $V_{C-DAI,c}^{DL}$ is a counter-DAI value of component carrier C, and $V_{T-DAI}^{DL}$ is a total-DAI value. According to the signaling method of Table 13 and Table 14, when the total-DAI or counter-DAI value is A, the number of CBGs indicated by the corresponding DAI field is $S*(2^B+A)$. Here, B is a bit width of the counter-DAI or total-DAI. According to an embodiment of the present invention, the number S of CBGs included in one CBG group may be expressed as granularity with respect to the number of CBGs represented in the counter-DAI or the total-DAI.

According to an embodiment of the present invention, the number S of CBGs included in one CBG group may be determined by various methods. According to an embodiment, the value of S may be fixed to S=2. Preferably, S may be configured with a UE-specific RRC signal. According to another embodiment, S may be determined as a value of the greatest common divisor of the number of CBGs configured in each component carrier. For example, if 2 CBGs are configured in component carrier #0 and 6 CBGs are configured in component carrier #1, it may be set as S=2. In addition, if 4 CBGs are configured in component carrier #0 and 8 CBGs are configured in component carrier #1, it may be set as S=4.

According to yet another embodiment, in the case of a transmission mode in which one TB can be transmitted in one component carrier, the value of S may be fixed to S=2, and in the case of a transmission mode in which two TB can be transmitted in one component carrier, the value of S may be fixed to S=4. According to still another embodiment, when all component carriers are configured in a transmission mode in which only one TB can be transmitted, S may be determined as a value of the greatest common divisor of the number of CBGs configured in each component carrier. In addition, in a transmission mode in which two TBs can be transmitted in one component carrier, S may be determined as a value twice the greatest common divisor of the number of CBGs configured in each component carrier. For example, in a transmission mode in which two TBs can be transmitted in one component carrier, if 2 CBGs are configured in component carrier #0 and 6 CBGs are configured in component carrier #1, it may be set as S=4. In addition, if 4 CBGs are configured in component carrier #0 and 8 CBGs are configured in component carrier #1, it may be set as S=8.

The bit widths of the counter-DAI field and the total-DAI field expected by the user equipment may vary according to the number S of CBGs included in one CBG group. According to an embodiment, the bit widths of the counter-DAI field and the total-DAI field may be set to 2+ceil ($\log_2(X/S)$), respectively. In this case, X is the largest number among the number of CBGs of each component carrier configured to the user equipment. Here, ceil (a) represents the smallest number among integers greater than or equal to 'a'. For example, if two component carriers are configured to the user equipment, and the number of CBGs configured in component carrier #0 is 2 and the number of CBGs configured in component carrier #1 is 4, then S=2. In this case, the bit widths of the counter-DAI field and the total-DAI field may be set to 2+ceil ($\log_2(4/2)$)=3 bits, respectively. In addition, if two component carriers are configured in the user equipment, and the number of CBGs configured in component carrier #0 is 4 and the number of CBGs configured in component carrier #1 is 8, then S=4. In this case, the bit widths of the counter-DAI field and the total-DAI field may be set to 2+ceil ($\log_2(8/4)$)=3 bits, respectively.

Referring to FIG. 37, a PDSCH may be transmitted to a user equipment through component carriers #0, #1, #3, #4, #5, and #7. In this case, the number of CBGs transmitted through component carriers #0, #1, #3, #4, #5, and #7 may be 2, 4, 6, 8, 2, and 4, respectively. According to an embodiment of the present invention, the number S of CBGs included in one CBG group is set to 2, which is the greatest common divisor of the number of CBGs. Thus, the values of the (counter-DAI, total-DAI) fields of each PDCCH for component carriers #0, #1, #3, #4, #5, and #7 may be (0, 13), (1, 13), (3, 13), (6, 13), (10, 13) and (11, 13), respectively.

Figure 38:
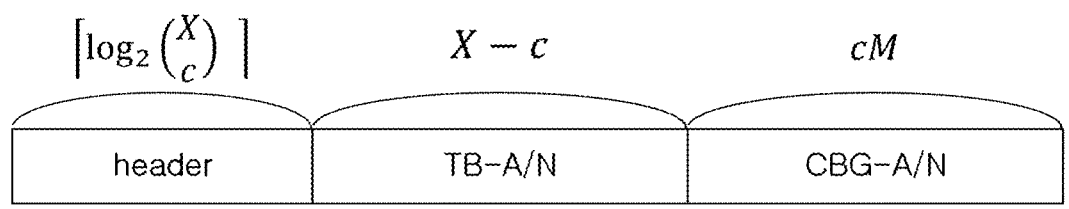
FIG. 38 illustrates a HARQ-ACK compression method according to an embodiment of the present invention.

FIG. 38 illustrates a HARQ-ACK compression method according to an embodiment of the present invention. If the length of the HARQ-ACK payload that the user equipment configured for CBG-based transmission should transmit exceeds the maximum transmission capacity of the PUCCH, the HARQ-ACK payload should be compressed to fit the maximum transmission capacity of the PUCCH.

According to an embodiment of the present invention, the user equipment may transmit a TB-based HARQ-ACK for some TBs (or PDSCHs) of the entire TBs, and transmit a CBG-based HARQ-ACK for the remaining TBs (or PDSCHs). Referring to FIG. 38, a HARQ-ACK payload of the user equipment may consist of 3 parts as follows. First, the 'header' part informs the method to interpret the following HARQ-ACK payload. More specifically, the 'header' may inform the indices of the TB (or PDSCH) in which the CBG-based HARQ-ACK is transmitted. Alternatively, the 'header' may inform the indices of the TB (or PDSCH) in which the TB-based HARQ-ACK is transmitted. Next, the 'TB-A/N' field includes TB-based HARQ-ACK for TBs (or PDSCHs) in which the 'header' indicates to transmit a TB-based HARQ-ACK. In this case, the order of the TB-based HARQ-ACK may be set in ascending order of the counter-DAI value of the TB (or PDSCH). Next, the 'CBG-A/N' field includes CBG-based HARQ-ACK for TBs (or PDSCHs) in which the 'header' indicates to transmit a CBG-based HARQ-ACK. In this case, the order of the CBG-based HARQ-ACK may be set in ascending order of the counter-DAI value of TB (or PDSCH). For reference, if the number of bits of the CBG-based HARQ-ACK for different TBs is different, NACK may be attached so that the length of the CBG-based HARQ-ACK payload for every TB to be equal to the bit length of the longest CBG-based HARQ-ACK among each CBG-base HARQ-ACK.

The 'header' part can be set as follows. When HARQ-ACK for a total of X TB s are transmitted, the user equipment may transmit CBG-based HARQ-ACK for c TB(s) among X and transmit TB-based HARQ for the remaining X-c TB(s). Here, the method of determining the value of c by the user equipment and the base station will be described later. The 'header' part represents information for selecting c out of X TB (s). The 'header' may consist of a bitmap with an X-bit length. Each bit may indicate information on whether a TB-based HARQ-ACK or a CBG-based HARQ-ACK is transmitted for each TB. In another embodiment, the number of cases of selecting c out of X TB(s) is $$\binom{X}{c}.$$

Here, $$\binom{n}{k} = n! / (k! (n-k)!)$$

is a binomial coefficient. Therefore, the number of bits required for the 'header' is $$\left\lceil \log_2 \binom{X}{c} \right\rceil.$$

The 'header' may indicate a value of $$0 \sim \binom{x}{c} - 1,$$

and the method to interpret the value is as follows. First, it may be assumed that the value of 'header' is 'i'. The i+1-st smallest (or largest) binary sequence can be obtained among binary sequences of length X in which the number of 1s is c and the number of 0s is X−c. In this case, among the binary sequence, it can be interpreted that the index in which 1 is located is the index of the TB (or PDSCH) in which the CBG-based HARQ-ACK is transmitted, and the index in which 0 is located is the index of the TB (or PDSCH) in which the TB-based HARQ-ACK is transmitted. For example, when X=4 and c=2, the 'header' may indicate a value of 0 to 5. If the value of the 'header' is any one of 0 to 5, it may match 0011, 0101, 0110, 1001, 1010, or 1100, respectively. If the value of 'header' is 2, it matches 0110, so the CBG-based HARQ-ACK may be transmitted for the second and the third TBs (or PDSCHs), and the TB-based HARQ-ACK may be transmitted for the first and the fourth TBs (or PDSCHs).

According to an embodiment of the present invention, the user equipment and the base station may determine the value of c in the following manner. The base station and the user equipment may know the maximum number of transmission bits that can be transmitted by the PUCCH for transmitting the HARQ-ACK. It is assumed that the maximum number of transmission bits is B. In addition, it is assumed that the length of the CBG-based HARQ-ACK payload is N. The user equipment and the base station may identify how many TBs (or PDSCHs) are scheduled for the entire component carriers through a total-DAI value. It is assumed that the total number of scheduled TBs (or PDSCHs) is X. In this case, c may be determined as the largest integer that satisfies Equation 1 below.

$$\left\lceil \log_2 \binom{X}{c} \right\rceil + X - c + cN \le B \qquad \text{[Equation 1]}$$

In Equation 1, since the values of X, N, and B are known to the user equipment and the base station, the user equipment and the base station may identify the value of c without error. For reference, when the value of c is determined, the length of the HARQ-ACK payload transmitted by the user equipment is $$\left\lceil \log_2 \binom{X}{c} \right\rceil + X - c + cN.$$

The base station may always expect a HARQ-ACK payload having the above length.

For example, when X=9, B=22 and N=4, then c=2 can be obtained according to Equation 1 above. Accordingly, when generating the HARQ-ACK, the user equipment may configure N-bit CBG-based HARQ-ACK for 2 TBs (or PDSCHs) out of a total of 9 TBs (or PDSCHs), and may configure 1-bit TB-based HARQ-ACK for the remaining 7 TBs (or PDSCHs). In this case, the base station always expects a 21-bit HARQ-ACK. When the 21-bit HARQ-ACK received by the base station is [001111101100011101010], the interpretation of the HARQ-ACK is as follows. In the HARQ-ACK, since the 'header' is $$\left\lceil \log_2 \binom{X}{c} \right\rceil = \left\lceil \log_2 \binom{9}{2} \right\rceil = 6,$$

the value of 'header' is [001111], that is, 15. Since the 16th smallest binary sequence among binary sequences of length 15 is [001000001], CBG-based HARQ-ACK is transmitted for the 3rd and 9th TBs (or PDSCHs), and TB-based HARQ-ACK is transmitted for the 1st, 2nd, 4th, 5th, 6th, 7th, and 8th TBs (or PDSCHs). The X−c=9−2=7 bits following the 'header' are a 'TB-A/N' field. The value [1011000] of the corresponding field indicates TB-based HARQ-ACK of the 1st, 2nd, 4th, 5th, 6th, 7th and 8th TBs (or PDSCHs). The c*N=2*4=8 bits following the 'TB-A/N' field are a 'CBG-A/N' field. The value [11101010] of the corresponding field indicates CBG-based HARQ-ACK of the 3rd and 9th TBs (or PDSCHs). That is, the CBG-based HARQ-ACK of the 3rd TB (or PDSCH) is 1110 and the CBG-based HARQ-ACK of the 9th TB (or PDSCH) is 1010.

Figures 39, 40:
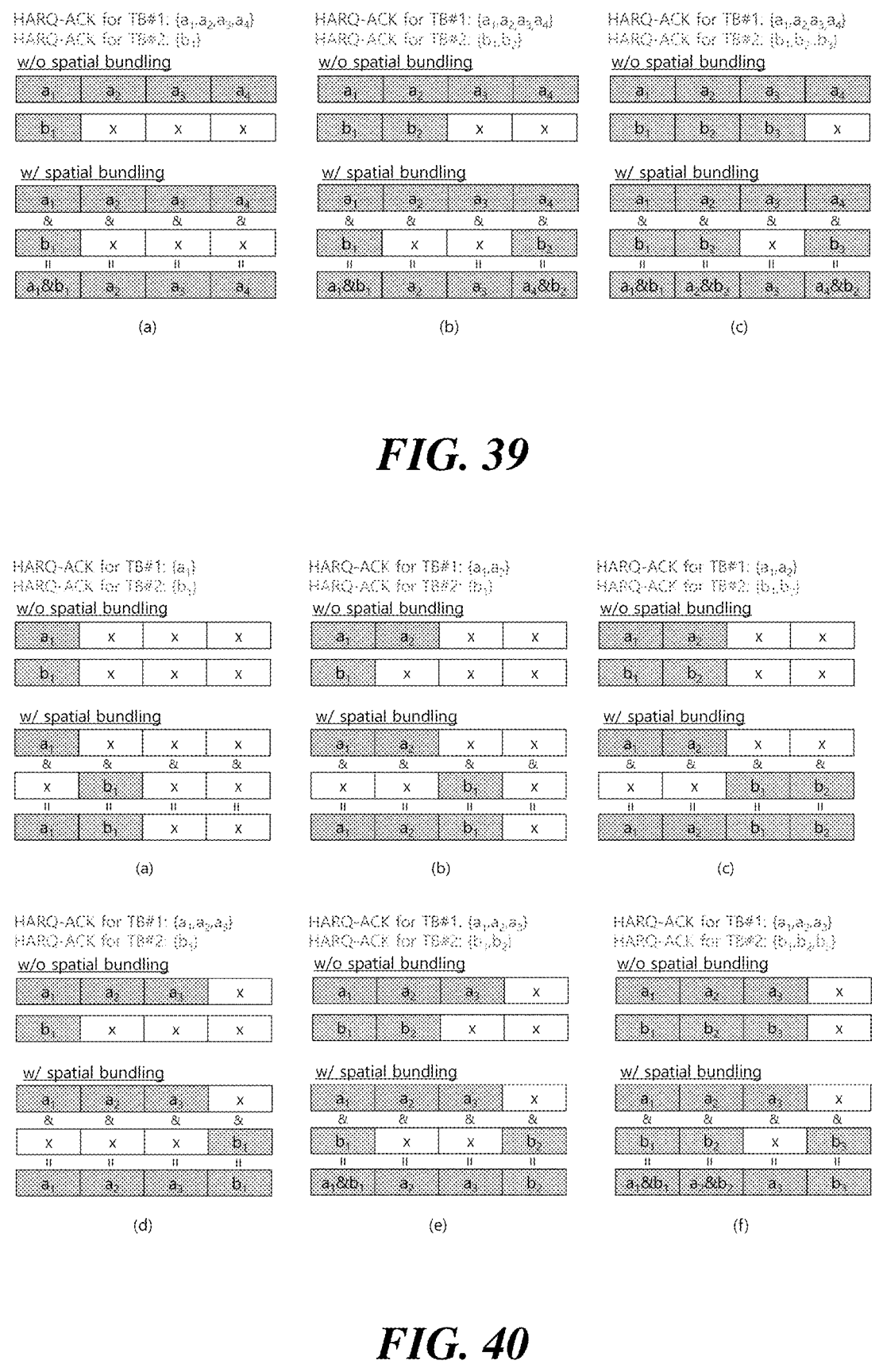

FIGS. 39 and 40 illustrate a method of performing spatial bundling of HARQ-ACK according to an embodiment of the present invention. When a user equipment configured with a transmission mode in which two TBs can be transmitted in one PDSCH and configured with CBG-based transmission performs spatial bundling, CBG-based HARQ-ACK for each TB should be bundled. In addition, the user equipment may be configured to spatially bundle the CBG-based HARQ-ACK transmitted through different slots. A method of performing a spatial bundling according to an embodiment of the present invention is as follows. For reference, a method of performing a spatial bundling is described, but the method may be used when HARQ-ACKs between two different TB s are bundled.

When the same number of maximum CBGs N are configured for each TB, it is assumed that the number of CBGs included in TB #1 is M1, the number of CBGs included in TB #2 is M2, and M1 is greater than or equal to M2. That is, it is assumed that TB #1 contains the same or more CBGs than TB #2. If TB #2 includes more CBGs than TB #1, the embodiments of the present invention may be applied by changing the indices of TB #1 and TB #2. If the user equipment is configured not to perform a bundling, the user equipment should transmit a total of 2*N-bit HARQ-ACK, with N bits per each TB. In this case, if M1<N, it can be expressed that the TB includes M1 CBG(s) and N−M1 virtual CBG(s). It is assumed that the N-bit HARQ-ACK for TB #1 is [$a_1, a_2, \ldots, a_{M1}, x, \ldots, x$], and the N-bit HARQ-ACK for TB #2 is [$b_1, b_2, \ldots, b_{M2}, x, \ldots, x$]. Here, x is a value filled with HARQ-ACK for the virtual CBG(s) in order to match the length of the HARQ-ACK payload, and may be mapped to NACK later.

First, FIG. 39 illustrates the first embodiment of performing spatial bundling of HARQ-ACK. More specifically, FIGS. 39(a) to 39(c) show respective embodiments of performing spatial bundling of HARQ-ACK when M1=N and M2=1 to 3. When M1=N, the index of the CBG in which the bundling is performed among the CBGs included in the two TBs may be selected such that the resource element to which the two CBGs are allocated overlaps as much as possible in the time-frequency domain. This is because the higher the overlap as much as possible in the time-frequency domain, the higher the correlation is expected. More specifically, when M1=N, the index of the CBG in which the bundling is performed among the CBGs included in the two TBs may follow the values in Table 15 according to the M1 value and the M2 value.

TABLE 15

|        | M1 = 2 | M1 = 4        |
|--------|--------|---------------|
| M2 = 1 | {1}    | {1}           |
| M2 = 2 | {1, 2} | {1, 4}        |
| M2 = 3 | —      | {1, 2, 4}     |
| M2 = 4 | —      | {1, 2, 3, 4}  |

Referring to Table 15, when M1=4 and M2=2, values of {1, 4} may be obtained as indices of CBG in which the bundling is performed. Therefore, referring to FIG. 39 (b), the first CBG of TB #2 may be bundled with the first CBG of TB #1, and the second CBG of TB #2 may be bundled with the fourth CBG of TB #1. In addition, when M1=4 and M2=3, values of {1, 2, 4} may be obtained as indices of the CBG in which the bundling is performed. Therefore, referring to FIG. 39 (c), the first CBG of TB #2 may be bundled with the first CBG of TB #1, the second CBG of TB #2 may be bundled with the second CBG of TB #1, and the third CBG of TB #2 may be bundled with the fourth CBG of TB #1.

Table 16 illustrates another method of performing spatial bundling according to the first embodiment described above. When M1=N, the index of the CBG in which the bundling is performed among the CBGs included in the two TBs may follow the values in Table 16 according to the M1 and M2 values.

TABLE 16

|        | M1 = 2 | M1 = 4        |
|--------|--------|---------------|
| M2 = 1 | {1}    | {1}           |
| M2 = 2 | {1, 2} | {1, 4}        |
| M2 = 3 | —      | {1, 3, 4}     |
| M2 = 4 | —      | {1, 2, 3, 4}  |

Referring to Table 16, when M1=4 and M2=3, a value of {1, 3, 4} may be obtained as an index of CBG in which a bundling is performed. Thus, the first CBG of TB #2 is tied to the first CBG of TB #1, the second CBG of TB #2 is tied to the third CBG of TB #1, and the third CBG of TB #2 is TB # It can be bound to 1's 4th CBG.

Next, FIG. 40 illustrates the second embodiment of performing a spatial bundling of HARQ-ACK. More specifically, FIGS. 40(a) to 40(f) show respective embodiments of performing spatial bundling of HARQ-ACK when M1<N. If M1<N, some HARQ-ACK bit(s) of TB #2 are preferentially mapped to HARQ-ACK bit(s) not used in TB #1 (or used for virtual CBG), and a bundling of the remaining HARQ-ACK bit(s) of TB #2 and the HARQ-ACK bit(s) of TB #1 may be performed. First, FIGS. 40(a) to 40(c) show embodiments in which M1<N and M1+M2 is less than or equal to N. In this case, the N-bit HARQ-ACK in which the spatial bundling is performed may consist of M1-bit HARQ-ACK of TB #1, M2-bit HARQ-ACK of TB #2, and NACK of N−(M1+M2)-bit. FIGS. 40(d) to 40(f) show embodiments in which M1<N and M1+M2 is greater than N and smaller than 2*N. In this case, M1+M2−N bit(s) among the N-bit HARQ-ACK on which the spatial bundling is performed may be configured by bundling (i.e., binary AND operation) M1+M2−N bit(s) among the HARQ-ACK of TB #1 and M1+M2−N bit(s) among the HARQ-ACK of TB #2. In addition, 2*N−(M1+M2) bit(s) among the N-bit HARQ-ACK on which the spatial bundling is performed may consist of the remaining N−M2 bit(s) among the HARQ-ACK of TB #1 and the remaining N−M1 bit(s) among the HARQ-ACK of TB #2.

In a more specific embodiment, $[b_1, b_2, \ldots, b_{M2}]$ can be divided into $[b_1, b_2, \ldots, b_{M2-k}]$ and $[b_{M2-k+1}, b_{M2-k+2}, b_{M2}]$. Here, k satisfies k=N−M1. In addition, a binary AND operation may be performed between $[b1, b_2, \ldots, b_{M2-k}]$ and $[a_1, a_2, \ldots, a_{M2-k}]$. The result thus obtained is $[c_1, c_2, \ldots, c_{M2-k}]$. The final bundled HARQ-ACK can be obtained by sequentially connecting $[c_1, c_2, \ldots, c_{M2-k}]$, $[a_{M2-k+1}, a_{M2-k+1}, \ldots, a_{M1}]$, $[b_{M2-k+1}, b_{M2-k+2}, \ldots, b_{M2}]$. According to an embodiment of the present invention, the connection order of HARQ-ACK can be changed. For reference, when the length of the connected HARQ-ACK is smaller than N-bit, x may be appended to the HARQ-ACK to adjust the length to N-bit. In this case, x may be mapped to NACK. Finally, when the HARQ-ACK on which the bundling is performed is $[o_1, o_2, \ldots, o_N]$, HARQ-ACK bit $o_i$ according to the value of the index i may be obtained as shown in Equation 2.

$$o_i = \begin{cases} a_i \& b_i & \text{if } i = 1, \ldots, M2-k \\ a_i & \text{if } i = M2-k+1, \ldots, M1 \\ b_{i-(N-M2)+\alpha} & \text{if } i = M1+1, \ldots, N-\alpha \\ x & \text{if } i = N-\alpha+1, \ldots, N \end{cases} \quad \text{[Equation 2]}$$

Here, & denotes binary AND operation. In addition, K=N−M1 and α=max {N−(M1+M2), 0}. In this case, max {s, t} returns the larger number between s and t. Here x may be mapped to NACK.

In another embodiment of the present invention, when the HARQ-ACK on which the bundling is finally performed is $[o_1, o_2, \ldots, o_N]$, HARQ-ACK bit $o_i$ according to the value of the index i may be obtained as shown in Equation 3.

[Equation 3]

if $M1 + M2 \leq N$, $$o_i = \begin{cases} a_i, & i = 1, 2, \ldots, M1, \\ b_{i-M1}, & i = M1+1, M1+1, \ldots, M1+M2, \\ x, & i = M1+M2+1, M1+M2+2, \ldots, N \end{cases}$$

if $N < M1 + M2 < 2 \times N$, $$o_i = \begin{cases} a_i \& b_i, & i = 1, 2, \ldots, \lambda, \\ a_i & i = \lambda+1, \lambda+2, \ldots, M1, \\ b_{i-M1+\lambda}, & i = M1+1, M1+1, \ldots, N \end{cases}$$

if $M1 + M2 = 2 \times N$, $o_i = \{a_i \& b_i, i = 1, 2, \ldots, N\}$.

Here, λ is M1+M2−N. In addition, x may be mapped to NACK.

Referring to Equation 2, Equation 3, and FIG. 40, the final bundled HARQ-ACK according to HARQ-ACKs for the two TBs are as follows. Referring to FIG. 40(a), if HARQ-ACKs for two TBs are $[a_1, x, x, x]$ and $[b_1, x, x, x]$, the final bundled HARQ-ACK is $[a_1, b_1, x, x]$. Referring to FIG. 40(b), if HARQ-ACKs for two TBs are $[a_1, a_2, x, x]$ and $[b_1, x, x, x]$, the final bundled HARQ-ACK is $[a_1, a_2, b_1, x]$. Referring to FIG. 40(c), if HARQ-ACKs for two TBs are $[a_1, a_2, x, x]$ and $[b_1, b_2, x, x]$, the final bundled HARQ-ACK is $[a_1, a_2, b_1, b_2]$. Referring to FIG. 40(d), if HARQ-ACKs for two TBs are $[a_1, a_2, a_3, x]$ and $[b_1, x, x, x]$, the final bundled HARQ-ACK is $[a_1, a_2, a_3, b_1]$. Referring to FIG. 40(e), if HARQ-ACKs for two TBs are $[a_1, a_2, a_3, x]$ and $[b_1, b_2, x, x]$, the final bundled HARQ-ACK is $[a_1\&b_1, a_2, a_3, b_2]$. Here, & is a binary AND operation. Referring to FIG. 40(f), if HARQ-ACKs for two TBs are $[a_1, a_2, a_3, x]$ and $[b_1, b_2, b_3, x]$, the final bundled HARQ-ACK is $[a_1\&b_1, a_2\&b_2, a_3, b_3]$. Further, if HARQ-ACKs for two TBs are $[a_1, a_2, a_3, a_4]$ and $[b_1, b_2, b_3, x]$, the final bundled HARQ-ACK is $[a_1\&b_1, a_2\&b_2, a_3\&b_3, a_4]$.

Figures 41, 42:
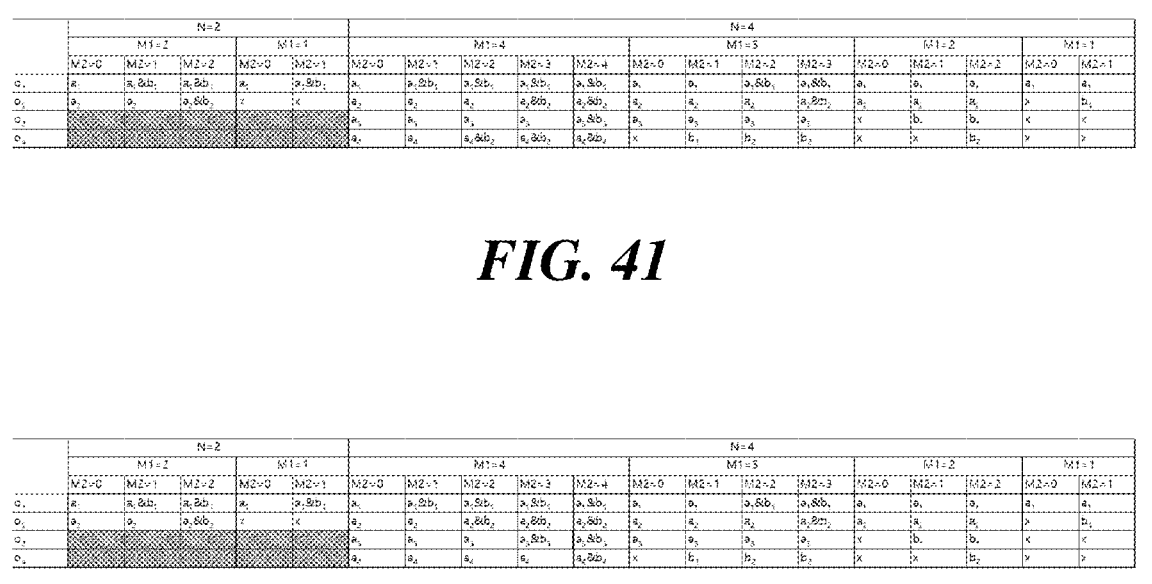

FIGS. 41 and 42 more specifically illustrate a method of performing a spatial bundling of HARQ-ACK according to an embodiment of the present invention. In FIGS. 41 and 42, N is the maximum number of CBGs per TB configured by the RRC signal, M1 is the number of CBG(s) included in TB #1, and M2 is the number of CBG(s) included in TB #2. In addition, the HARQ-ACK bit for the i-th CBG of TB #1 is $a_i$ and the HARQ-ACK bit for the i-th CBG of TB #2 is $b_i$. In this case, & denotes a binary AND operation. In addition, x may be mapped to NACK.

According to an embodiment of the present invention, DCI for a user equipment configured with a transmission mode in which two TBs can be transmitted in one PDSCH and configured with CBG-based transmission may be set as follows. First, it may be assumed that N CBGs are configured per one TB. If the user equipment is configured not to perform spatial bundling, in order to indicate which CBG is transmitted for each TB, there is an N-bit CBG transmission information (CBGTI) field for each TB in the DCI of the user equipment. In addition, there are a modulation and coding scheme (MCS), a redundancy version (RV), and a new data indicator (NDI) for each TB. If the CBGTI is all 0 for one TB, it may be indicated that the TB is not transmitted. In addition, if the CBGTI is all 0 for one TB and the values of MCS and RV are specific values, it may be indicated that the TB is not transmitted. The specific value of the MCS may be 0 and the specific value of the RV may be 1.

According to another embodiment of the present invention, if at least one virtual CBG exists in two TBs for performing the bundling, the bundling may be performed as follows. First, NACK may be mapped to HARQ-ACK 'x' for a virtual CBG. In addition, it may be defined that Q=min (M1, M2). For reference, it is assumed that M1=1 when TB #1 is TB-based transmission, and M2=1 when TB #2 is TB-based transmission. ACK is 1 and NACK is 0. When generating a HARQ-ACK bundled from HARQ-ACKs for two TBs, a binary AND operation may be performed on the first through Q-th HARQ-ACK bits, and a binary OR operation may be performed on the Q+1-th through N-th HARQ-ACK bits. If TB #1 contains 4 CBGs (i.e., M1=4) and the number of configured CBGs is 4 (i.e., N=4), and TB #2 contains 2 CBGs (i.e., M2=2) and the number of configured CBGs is 4 (i.e., N=4), then the HARQ-ACK for TB #1 is $[a_1, a_2, a_3, a_4]$, and the HARQ-ACK for TB #2 is $[b_1, b_2, 0, 0]$. In addition, Q=2. Thus, a binary AND operation is performed on the first two bits, and a binary OR operation is performed on the following two bits (i.e., as N−Q). Accordingly, the HARQ-ACK in which the bundling is performed is $[a_1\&b_1, a_2\&b_2, a_3|0, a_4|0]$. Here, & is a binary AND operation, and | is a binary OR operation. For reference, such a bundling method may be used in a spatial bundling or may be used only in a bundling among other TBs except for a spatial bundling.

According to another embodiment of the present invention, if at least one virtual CBG exists in two TBs performing the bundling, the bundling may be performed as follows. First, HARQ-ACK for the virtual CBG is represented by 'x', and NACK is mapped to 'x' after the bundling. When generating a HARQ-ACK bundled from HARQ-ACKs for two TBs, a ternary AND operation may be performed on the two HARQ-ACKs. In this case, the truth table of the ternary AND operation is shown in Table 17. After the bundling, x may be mapped to NACK. If TB #1 contains 4 CBGs (i.e., M1=4) and the number of configured CBGs is 4 (i.e., N=4), and TB #2 contains 2 CBGs (i.e., M2=2) and the number of configured CBGs is 4 (that is, N=4), then the HARQ-ACK for TB #1 is [a1, a2, a3, a4], and the HARQ-ACK for TB #2 is [b1, b2, x, x]. Therefore, the HARQ-ACK in which the bundling is performed is [a1b1, a2b2, a3x, a4x]. Where operator is shown in Table 17. For reference, such a bundling method may be used in a spatial bundling or may be used only in a bundling among other TBs except for a spatial bundling.

TABLE 17

| A | B | A*B |
|---|---|---|
| 0 | 0 | 0 |
| 0 | 1 | 0 |
| 1 | 0 | 0 |
| 1 | 1 | 1 |
| 0 | X | 0 |
| X | 0 | 0 |
| 1 | X | 1 |
| X | 1 | 1 |
| X | X | X |

On the other hand, if the user equipment is configured to perform a spatial bundling, there is one N-bit CBGTI field in the DCI of the user equipment. In addition, there are MCS, RV, and NDI for each TB. The process of determining which CBG the user equipment has received is as follows. The user equipment may identify whether the corresponding TB is transmitted through the values of MCS and RV of each TB. Herein, if the MCS and RV are specific values, it represents that the corresponding TB has not been transmitted. For example, the specific value of the MCS may be 0 and the specific value of the RV may be 1. If there is one transmitted TB, the user equipment may interpret that the N-bit CBGTI indicates which CBG of that TB has been transmitted. That is, if the n-th bit of the N-bit CBGTI is 1 (where it is assumed that the value 1 represents transmission), the user equipment may identify that the n-th CBG is transmitted. When there are two transmitted TB s, the user equipment may identify which CBG is transmitted among each TB through the N-bit CBGTI in the same manner as the method of performing spatial bundling on the HARQ-ACK. For example, if the i-th HARQ-ACK bit on which the spatial bundling is performed is calculated by binary AND operation of the HARQ-ACK bit for the k-th CBG of TB #1 and the HARQ-ACK bit for the j-th CBG of TB #2, when the i-th bit of the N-bit CBGTI of DCI is 1, it may indicate that the k-th CBG of TB #1 is transmitted and the j-th CBG of TB #2 is transmitted. As an embodiment of the present invention, assuming that M1<N and spatial bundling in the same manner as in Equation 4 is performed, when the i-th bit among N-bit CBGTI $[d_1, d_2, \ldots, d_N]$ is 1, it can be identified that the following CBG is transmitted.

[Equation 4]

if $M1 + M2 \leq N$, $$d_i = 1: \begin{cases} CBG_i^{(1)} \text{ is scheduled}, & i = 1, 2, \ldots, M1, \\ CBG_{i-M1}^{(1)} \text{ is scheduled}, & i = M1+1, M1+1, \ldots, M1+M2 \end{cases},$$

if $N < M1 + M2 < 2 \times N$, $$d_i = 1: \begin{cases} CBG_i^{(1)} \text{ and } CBG_i^{(2)} \text{ are scheduled}, & i = 1, 2, \ldots, \lambda, \\ CBG_i^{(1)} \text{ is scheduled} & i = \lambda+1, \lambda+2, \ldots, M1, \\ CBG_{i-M1+\lambda}^{(2)} \text{ is scheduled}, & i = M1+1, M1+1, \ldots, N \end{cases}$$

if $M1 + M2 = 2 \times N$, $d_i = 1: \{CBG_i^{(1)} \text{ and } CBG_i^{(2)} \text{ are scheduled}, i = 1, 2, \ldots, N.$ Here, $CBG^{(1)}_i$ represents the i-th CBG of TB #1, and $CBG^{(2)}_i$ represents the i-th CBG of TB #2. M1 and M2 are the number of CBGs scheduled in TB #1 and TB #2, respectively, and can be identified from the MCS value of each TB of DCI.

Figure 43:
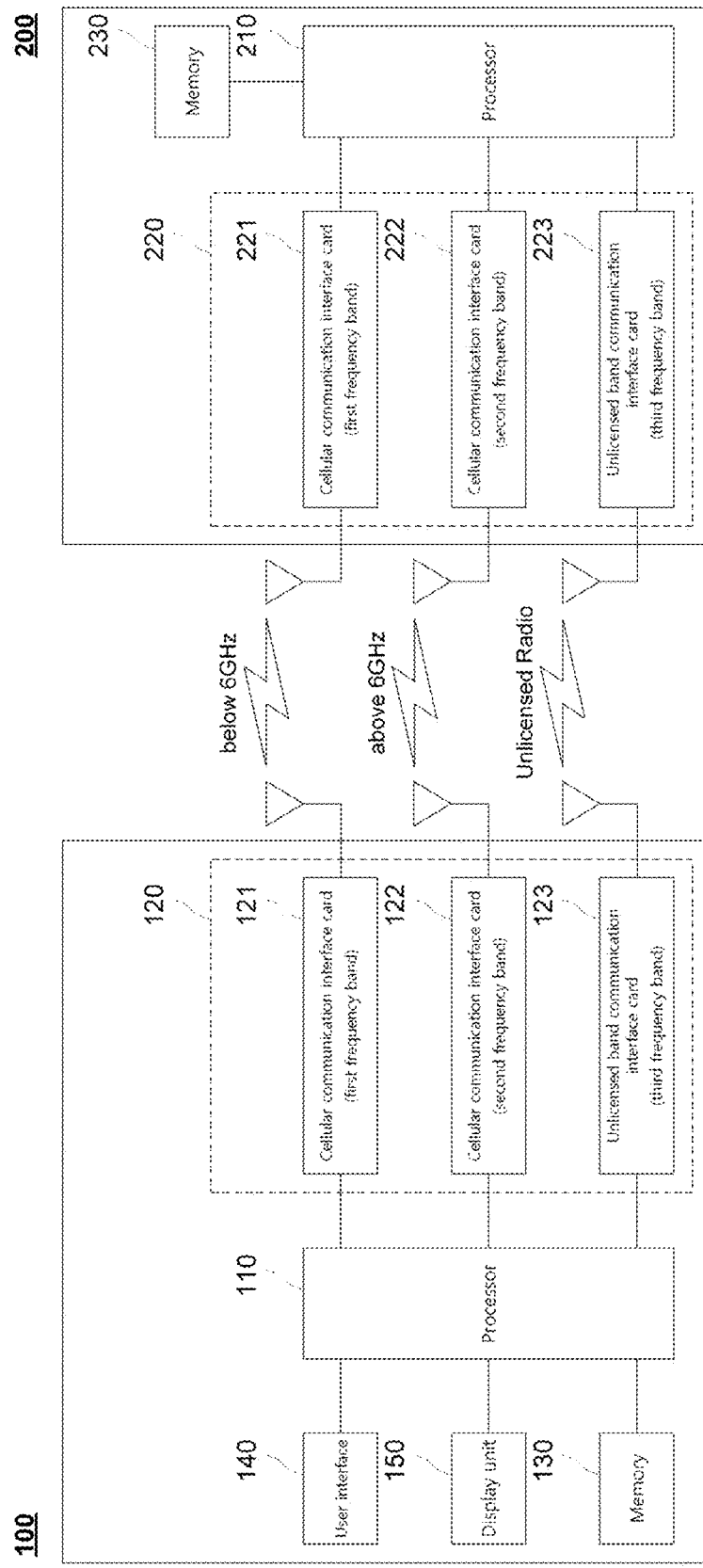
FIG. 43 is a block diagram illustrating a configuration of a terminal and a base station according to an embodiment of the present invention.

FIG. 43 is a block diagram illustrating a configuration of a terminal and a base station, respectively, according to an embodiment of the present invention. In an embodiment of the present invention, the terminal may be implemented as various types of wireless communication devices or computing devices that are guaranteed to be portable and mobile. The terminal may be referred to as a user equipment (UE), a station (STA), a mobile subscriber (MS), or the like. In addition, in the embodiment of the present invention, the base station controls and manages a cell (e.g., a macro cell, a femto cell, a pico cell, etc.) corresponding to a service area, and may perform functions such as transmitting signals, assigning channels, monitoring channels, self-diagnosis, relay, etc. The base station may be referred to as next generation nodeB (gNB) or access point (AP).

As illustrated, the user equipment 100 according to an embodiment of the present invention may include a processor 110, a communication module 120, a memory 130, a user interface unit 140, and a display unit 150.

First, the processor 110 may execute various commands or programs and process internal data of the user equipment 100. In addition, the processor 100 may control an overall operation including each unit of the user equipment 100 and control data transmission and reception between the units. In this case, the processor 110 may be configured to perform an operation according to the embodiment described in the present invention. For example, the processor 110 may receive slot configuration information, determine a slot configuration based on the slot configuration information, and perform communication according to the determined slot configuration.

Next, the communication module 120 may be an integrated module that performs wireless communication using a wireless communication network and wireless LAN access using a wireless LAN. To this end, the communication module 120 may include a plurality of network interface cards (NICs) such as the cellular communication interface cards 121 and 122 and the unlicensed band communication interface card 123 in an internal or external form. Although the communication module 120 is illustrated as an integrated module in the drawing, each network interface card may be independently arranged according to a circuit configuration or a purpose, unlike the drawing.

The cellular communication interface card 121 may transmit and receive a wireless signal with at least one of the base station 200, an external device, and a server by using a mobile communication network, and may provide the cellular communication service thorough the first frequency band based on a command of the processor 110. According to an embodiment, the cellular communication interface card 121 may include at least one NIC module using a frequency band below 6 GHz. The at least one NIC module of the cellular communication interface card 121 may independently perform cellular communication with at least one of the base station 200, an external device, and a server according to a cellular communication standard or protocol of the frequency band below 6 GHz supported by the corresponding NIC module.

The cellular communication interface card 122 may transmit and receive a wireless signal with at least one of the base station 200, an external device, and a server by using a mobile communication network, and may provide the cellular communication service through the second frequency band based on a command of the processor 110. According to an embodiment, the cellular communication interface card 122 may include at least one NIC module using a frequency band above 6 GHz. The at least one NIC module of the cellular communication interface card 122 may independently perform cellular communication with at least one of the base station 200, an external device, and a server according to a cellular communication standard or protocol of the frequency band above 6 GHz supported by the corresponding NIC module.

The unlicensed band communication interface card 123 transmits and receives a wireless signal with at least one of the base station 200, an external device, and a server by using the third frequency band which is an unlicensed band, and provides a unlicensed band communication service by the second frequency band based on a command of the processor 110. The unlicensed band communication interface card 123 may include at least one NIC module using an unlicensed band. For example, the unlicensed band may be a band of 2.4 GHz or 5 GHz. The at least one NIC module of the unlicensed band communication interface card 123 may independently perform wireless communication with at least one of the base station 200, an external device, and a server according to a unlicensed band communication standard or protocol of a frequency band supported by the corresponding NIC module.

Next, the memory 130 stores a control program used in the user equipment 100 and various data according thereto. Such a control program may include a predetermined program necessary for the user equipment 100 to perform wireless communication with at least one of the base station 200, an external device, and a server.

Next, the user interface 140 includes various types of input/output means provided in the user equipment 100. That is, the user interface 140 may receive a user input using various input means, and the processor 110 may control the user equipment 100 based on the received user input. In addition, the user interface 140 may perform an output based on a command of the processor 110 using various output means.

Next, the display unit 150 outputs various images on the display screen. The display unit 150 may output various display objects such as a content executed by the processor 110 or a user interface based on a control command of the processor 110.

In addition, the base station 200 according to an embodiment of the present invention may include a processor 210, a communication module 220, and a memory 230.

First, the processor 210 may execute various commands or programs and process internal data of the base station 200. In addition, the processor 210 may control an overall operation including each unit of the base station 200 and control data transmission and reception between the units. In this case, the processor 210 may be configured to perform an operation according to the embodiment described in the present invention. For example, the processor 210 may signal slot configuration information and perform communication according to the signaled slot configuration.

Next, the communication module 220 may be an integrated module that performs wireless communication using a wireless communication network and wireless LAN access using a wireless LAN. To this end, the communication module 120 may include a plurality of network interface cards such as the cellular communication interface cards 221 and 222 and the unlicensed band communication interface card 223 in an internal or external form. Although the communication module 220 is illustrated as an integrated module in the drawing, each network interface card may be independently arranged according to a circuit configuration or a purpose, unlike the drawing.

The cellular communication interface card 221 may transmit and receive a wireless signal with at least one of above-described user equipment 100, an external device, and a server by using a mobile communication network, and may provide the cellular communication service thorough the first frequency band based on a command of the processor 210. According to an embodiment, the cellular communication interface card 221 may include at least one NIC module using a frequency band below 6 GHz. The at least one NIC module of the cellular communication interface card 221 may independently perform cellular communication with at least one of user equipment 100, an external device, and a server according to a cellular communication standard or protocol of a frequency band below 6 GHz supported by the corresponding NIC module.

The cellular communication interface card 222 may transmit and receive a wireless signal with at least one of the user equipment 100, an external device, and a server by using a mobile communication network, and may provide the cellular communication service through the second frequency band based on a command of the processor 210. According to an embodiment, the cellular communication interface card 222 may include at least one NIC module using a frequency band above 6 GHz. The at least one NIC module of the cellular communication interface card 222 may independently perform cellular communication with at least one of the user equipment 100, an external device, and a server according to a cellular communication standard or protocol of a frequency band above 6 GHz supported by the corresponding NIC module.

The unlicensed band communication interface card 223 transmits and receives a wireless signal with at least one of the user equipment 100, an external device, and a server by using the third frequency band which is an unlicensed band, and provides a unlicensed band communication service based on a command of the processor 210. The unlicensed band communication interface card 223 may include at least one NIC module using an unlicensed band. For example, the unlicensed band may be a band of 2.4 GHz or 5 GHz. The at least one NIC module of the unlicensed band communication interface card 223 may independently or dependently perform wireless communication with at least one of the user equipment 100, an external device, and a server according to an unlicensed band communication standard or protocol of a frequency band supported by the corresponding NIC module.

The user equipment 100 and the base station 200 illustrated in FIG. 43 are block diagrams according to an embodiment of the present invention, in which blocks shown separately represent logically distinguishing elements of a device. Therefore, the elements of the above-described device may be mounted in one chip or in a plurality of chips according to the design of the device. In addition, some components of the user equipment 100, for example, the user interface 140, the display unit 150, and the like, may be selectively provided in the user equipment 100. In addition, the user interface 140, the display unit 150, and the like, may be additionally provided in the base station 200 as necessary.

The foregoing description of the present invention is intended for exemplifications, and it will be understood by those skilled in the art that the present invention may be easily modified in other specific forms without changing the technical idea and or essential features of the present invention. Therefore, it should be understood that the embodiments described above are exemplary in all aspects and not restrictive. For example, each component described as a single type may be implemented in a distributed manner, and similarly, components described as distributed may be implemented in a combined form.

The scope of the present invention is shown by the following claims rather than the above description, and all changes or modifications derived from the meaning and scope of the claims and their equivalents should be construed as being included in the scope of the present invention.

The invention claimed is:

1. A user equipment of a wireless communication system, comprising:
    a communication module; and
    a processor configured to control the communication module,
    wherein the processor is configured to:
    receive downlink control information (DCI) through a physical downlink control channel (PDCCH) indicating physical downlink shared channel (PDSCH) scheduling information of a respective cell in two or more cells,
    wherein a code block group (CBG)-based transmission is configured in at least one cell among the two or more cells,
    wherein a transport block(TB)-based transmission is configured in cell(s) other than the at least one cell configured as the CBG-based transmission among the two or more cells, and
    wherein the DCI includes a counter DAI(downlink assignment index) and a total DAI separately applied according to a transmission scheme,
    for the at least one cell configured with the CBG-based transmission, identify the transmission scheme in a cell among the two or more cells based on a DCI format of the DCI,
    wherein the transmission scheme is either a transport block (TB)-based transmission or the CBG-based transmission,
    receive a PDSCH of in the two or more cells based on the scheduling information of the PDCCH,
    generate a hybrid automatic repeat request acknowledgment (HARQ-ACK) bit sequence for the two or more cells in response to the PDSCH by combining a first HARQ-ACK bit sequence for the TB-based transmission and a second HARQ-ACK bit sequence for the CBG-based transmission,
    wherein each of the first HARQ-ACK bit sequence for the TB-based transmission and the second HARQ-ACK bit sequence for the CBG-based transmission is generated by separately applying each of the counter DAI and the total DAI according to the transmission scheme, and
    transmit the HARQ-ACK bit sequence.

2. The user equipment of claim 1,
    wherein one HARQ-ACK bit is generated per one transport block in the first HARQ-ACK bit sequence for the TB-based transmission, and
    wherein N HARQ-ACK bit(s) are generated in the second HARQ-ACK bit sequence for the CBG-based transmission, and the N is determined based on a maximum number of CBGs configured to the user equipment.

3. The user equipment of claim 2,
    wherein when the number M of CBG(s) transmitted through a particular cell to which the CBG-based transmission is configured in the two or more cells is less than the N, HARQ-ACK bit(s) for the particular cell consist of M HARQ-ACK bit(s) for the transmitted CBG(s) and N-M NACK(s).

4. The user equipment of claim 1,
    wherein the counter DAI is associated with an accumulated number of PDSCH(s) scheduled up to a current cell, and
    wherein the total DAI is associated with a total number of PDSCHs scheduled for entire cells.

5. The user equipment of claim 1,
    wherein the second HARQ-ACK bit sequence for the CBG-based transmission is appended to the HARQ-ACK bit sequence for the TB-based transmission.

6. The user equipment of claim 1,
    wherein the HARQ-ACK bit sequence is configured to exclude a HARQ-ACK bit sequence for a specific transmission scheme among the TB-based transmission or the CBG-based transmission when the total DAI applied to the specific transmission scheme indicates a predetermined value and no PDCCH scheduling the specific transmission scheme is received.

7. A wireless communication method in a wireless communication system, comprising:
    receiving downlink control information (DCI) through a physical downlink control channel (PDCCH) indicating physical downlink shared channel (PDSCH) scheduling information of a respective cell in two or more cells,
    wherein a code block group (CBG)-based transmission is configured in at least one cell among the two or more cells, and
    wherein a transport block(TB)-based transmission is configured in cell(s) other than the at least one cell configured as the CBG-based transmission among the two or more cells, and
    wherein the DCI includes a counter DAI(downlink assignment index) and a total DAI separately applied according to a transmission scheme;

for the at least one cell configured with the CBG-based transmission, identifying the transmission scheme in a cell among the two or more cells based on a DCI format of the DCI, wherein the transmission scheme is either a transport block (TB)-based transmission or the CBG-based transmission;

receiving a PDSCH in the two or more cells based on the scheduling information of the PDCCH;

generating a hybrid automatic repeat request acknowledgment (HARQ-ACK) bit sequence for the two or more cells in response to the PDSCH by combining a first HARQ-ACK bit sequence for the TB-based transmission and a second HARQ-AC bit sequence for the CBG-based transmission, wherein each of the first HARQ-ACK bit sequence for the TB-based transmission and the second HARQ-ACK bit sequence for the CBG-based transmission is generated by separately applying each of the counter DAI and the total DAI according to the transmission scheme, and transmitting the HARQ-ACK bit sequence.

8. A user equipment of a wireless communication system, comprising:

a communication module; and a processor configured to control the communication module, wherein the processor is configured to:

receive a physical downlink control channel (PDCCH) indicating physical downlink shared channel (PDSCH) scheduling information of a respective cell in two or more cell(s), wherein it is configured that a code block group (CBG)-based transmission is available in at least one cell among the two or more cells, obtain a counter DAI(downlink assignment index) and a total DAI for a transmission scheme, from the PDCCH carrying a DCI format corresponding to the transmission scheme, which are separately applied according to the transmission scheme, receive PDSCH in the two or more cells based on the scheduling information of the PDCCH, generate a hybrid automatic repeat request acknowledgment (HARQ-ACK) bit sequence for the two or more cells in response to the PDSCH by combining a first HARQ-ACK bit sequence for the TB-based transmission and a second HARQ-ACK bit sequence for the CBG-based transmission, wherein the counter DAI and the total DAI according to the transmission scheme are separately applied to the first HARQ-ACK bit sequence for the TB-based transmission and the second HARQ-ACK bit sequence for the CBG-based transmission, transmit the HARQ-ACK bit sequence.

9. The user equipment of claim 8, wherein the HARQ-ACK bit sequence is generated based on the identified transmission scheme of the cell, and the transmission scheme of the cell is either the TB-based transmission or the CBG-based transmission.

10. The user equipment of claim 9,
wherein the transmission scheme of the cell is identified based on a DCI format of the DCI,
wherein the counter DAI is associated with an accumulated number of PDSCH(s) scheduled up to a current cell, and
wherein the total DAI is associated with a total number of PDSCHs scheduled for entire cells.

11. The user equipment of claim 8,
wherein one HARQ-ACK bit is generated per one transport block in the first HARQ-ACK bit sequence for the TB-based transmission, and
wherein N HARQ-ACK bit(s) are generated in the second HARQ-ACK bit sequence for the CBG-based transmission, and the N is determined based on a maximum number of CBGs configured to the user equipment.

12. The user equipment of claim 11,
wherein when the number M of CBG(s) transmitted through a particular cell to which the CBG-based transmission is configured in the two or more cells is less than the N, HARQ-ACK bit(s) for the particular cell consist of M HARQ-ACK bit(s) for the transmitted CBG(s) and N-M NACK(s).

13. The user equipment of claim 8,
wherein, within the HARQ-ACK bit sequence, the second HARQ-ACK bit sequence for the CBG-based transmission is appended to the first HARQ-ACK bit sequence for the TB-based transmission.

14. The user equipment of claim 8,
wherein when the total-DAI applied to the TB-based transmission indicates a predetermined value and no PDCCH scheduling the TB-based transmission is received, the HARQ-ACK bit sequence is configured to exclude the HARQ-ACK bit sequence for the TB-based transmission, and
wherein when the total-DAI applied to the CBG-based transmission indicates a predetermined value and no PDCCH scheduling the CBG-based transmission is received, the HARQ-ACK bit sequence is configured to exclude the HARQ-ACK bit sequence for the CBG-based transmission.

15. The user equipment of claim 14,
wherein the predetermined value is a binary '11'.

16. The user equipment of claim 14,
wherein the HARQ-ACK bit sequence is transmitted through a physical uplink shared channel (PUSCH).

17. A wireless communication method in a wireless communication system, comprising:

receiving a physical downlink control channel (PDCCH) indicating physical downlink shared channel (PDSCH) scheduling information of a respective cell in two or more cells, wherein a code block group (CBG)-based transmission is configured in at least one cell among the two or more cells;

obtain a counter DAI(downlink assignment index) and a total DAI for a transmission scheme, from the PDCCH carrying a DCI format corresponding to the transmission scheme, which are separately applied according to the transmission scheme;

receiving PDSCH in the two or more cells based on the scheduling information of the PDCCH;

generating a hybrid automatic repeat request acknowledgment (HARQ-ACK) bit sequence for the two or more cells in response to the PDSCH by combining a first HARQ-ACK bit sequence for the TB-based transmission and a second HARQ-ACK bit sequence for the CBG-based transmission, wherein the counter DAI and the total DAI according to the transmission scheme are separately applied to the first HARQ-ACK bit sequence for the TB-based transmission and the second HARQ-ACK bit sequence for the CBG-based transmission; and transmitting the HARQ-ACK bit sequence.

* * * * *